(12) United States Patent
Young

(10) Patent No.: US 10,895,914 B2
(45) Date of Patent: *Jan. 19, 2021

(54) METHODS, DEVICES, AND METHODS FOR CREATING CONTROL SIGNALS

(71) Applicant: Joshua Michael Young, Manuka (AU)

(72) Inventor: Joshua Michael Young, Manuka (AU)

(*) Notice: Subject to any disclaimer, the term of this patent is extended or adjusted under 35 U.S.C. 154(b) by 77 days.

This patent is subject to a terminal disclaimer.

(21) Appl. No.: 16/037,927

(22) Filed: Jul. 17, 2018

(65) Prior Publication Data

US 2019/0011987 A1 Jan. 10, 2019

Related U.S. Application Data

(63) Continuation of application No. 13/880,355, filed as application No. PCT/AU2011/001341 on Oct. 21, 2011, now Pat. No. 10,055,017.

(Continued)

(30) Foreign Application Priority Data

Oct. 22, 2010 (AU) .................... 2010001409
Dec. 23, 2010 (AU) .................... 2010905630
Dec. 23, 2010 (AU) .................... 2010905631

(51) Int. Cl.
*G06F 3/01* (2006.01)
*A63F 13/245* (2014.01)
(Continued)

(52) U.S. Cl.
CPC ............ *G06F 3/014* (2013.01); *A63F 13/212* (2014.09); *A63F 13/245* (2014.09); *G10H 1/053* (2013.01); *G10H 1/34* (2013.01); *A63F 2300/105* (2013.01); *A63F 2300/1012* (2013.01); *A63F 2300/8047* (2013.01); *G06F 3/017* (2013.01);
(Continued)

(58) Field of Classification Search
USPC .......................................................... 702/141
See application file for complete search history.

(56) References Cited

U.S. PATENT DOCUMENTS 3,270,119 A 8/1966 Griffith
3,935,669 A 2/1976 Potrzuski et al.
(Continued)

FOREIGN PATENT DOCUMENTS

FR 2547093 A1 1/1986
JP H01315791 A 12/1989
(Continued)

OTHER PUBLICATIONS

Tage Skotvold, TaGlove—a New Interface for Musical Expression (NIME), Aug. 28, 2007, https://musictechnology.files.wordpress.com/2009/10/project_report_final_28th_aug_07.pdf.
(Continued)

*Primary Examiner* — Paul D Lee
(74) *Attorney, Agent, or Firm* — Jones Day

(57) ABSTRACT

A interface comprising a hand operated input device with a series of activation points activated by the digits (fingers and/or thumb) of a user; a sensor component measuring a current motion, orientation, and/or position of the input device and a output component interconnected to the activation points and the sensor component for outputting in a series the currently active activation points and the current motion, orientation, and/or position of the input device.

20 Claims, 32 Drawing Sheets

Related U.S. Application Data

(60) Provisional application No. 61/478,278, filed on Apr. 22, 2011.

(51) Int. Cl.
    *A63F 13/212* (2014.01)
    *G10H 1/053* (2006.01)
    *G10H 1/34* (2006.01)
    G10H 1/32 (2006.01)
    G06F 3/0346 (2013.01)
    G10H 1/00 (2006.01)
    H01H 9/02 (2006.01)

(52) U.S. Cl.
    CPC .......... *G06F 3/0346* (2013.01); *G10H 1/0008* (2013.01); *G10H 1/32* (2013.01); *G10H 2220/326* (2013.01); *G10H 2220/391* (2013.01); *G10H 2220/395* (2013.01); *H01H 2009/0221* (2013.01)

(56) References Cited

U.S. PATENT DOCUMENTS

| | | |
|---|---|---|
| 4,241,636 A | 12/1980 | Long |
| 4,245,539 A | 1/1981 | Jones |
| 4,301,704 A | 11/1981 | Nagai et al. |
| 4,414,537 A | 11/1983 | Grimes |
| 4,542,291 A | 9/1985 | Zimmerman |
| 4,557,275 A | 12/1985 | Dempsey |
| 4,627,324 A | 12/1986 | Zwosta |
| 4,658,690 A | 4/1987 | Aitken et al. |
| 4,662,260 A | 5/1987 | Rumsey et al. |
| 4,667,685 A | 5/1987 | Fine |
| 4,776,253 A | 10/1988 | Downes |
| 4,794,838 A | 1/1989 | Corrigau |
| 4,962,688 A | 10/1990 | Suzuki et al. |
| 4,968,877 A | 11/1990 | McAvinney et al. |
| 4,980,519 A | 12/1990 | Mathews |
| 4,998,457 A | 3/1991 | Suzuki et al. |
| 5,005,460 A | 4/1991 | Suzuki et al. |
| 5,027,688 A | 7/1991 | Suzuki et al. |
| 5,046,394 A | 9/1991 | Suzuki et al. |
| 5,058,480 A | 10/1991 | Suzuki et al. |
| 5,062,341 A | 11/1991 | Reiling et al. |
| 5,081,896 A | 1/1992 | Hiyoshi et al. |
| 5,105,708 A | 4/1992 | Suzuki et al. |
| 5,119,709 A | 6/1992 | Suzuki et al. |
| 5,125,313 A | 6/1992 | Hiyoshi et al. |
| 5,127,301 A | 7/1992 | Suzuki et al. |
| 5,147,969 A | 9/1992 | Hiyoshi et al. |
| 5,151,553 A | 9/1992 | Suzuki et al. |
| 5,157,213 A | 10/1992 | Kashio et al. |
| 5,166,462 A | 11/1992 | Suzuki et al. |
| 5,166,463 A | 11/1992 | Weber |
| 5,170,002 A | 12/1992 | Suzuki et al. |
| 5,177,311 A | 1/1993 | Suzuki et al. |
| 5,192,823 A | 3/1993 | Suzuki et al. |
| 5,265,516 A | 11/1993 | Usa et al. |
| 5,290,964 A | 3/1994 | Hiyoshi et al. |
| 5,313,010 A | 5/1994 | Matsushima |
| 5,316,017 A | 5/1994 | Edwards et al. |
| 5,338,891 A | 8/1994 | Masubuchi et al. |
| 5,340,941 A | 8/1994 | Okamoto et al. |
| 5,350,881 A | 9/1994 | Kashio et al. |
| 5,373,096 A | 12/1994 | Suzuki et al. |
| 5,430,240 A | 7/1995 | Okamoto |
| 5,432,510 A | 7/1995 | Matthews |
| 5,440,070 A | 8/1995 | Okamoto et al. |
| 5,448,008 A | 9/1995 | Okamoto et al. |
| 5,541,358 A | 7/1996 | Wheaton et al. |
| D376,365 S | 12/1996 | Kawada |
| 5,648,626 A | 7/1997 | Okamoto |
| 5,796,354 A | 8/1998 | Cartabiano et al. |
| 5,832,296 A | 11/1998 | Wang et al. |
| 5,841,052 A | 11/1998 | Stanton |
| 5,855,483 A | 1/1999 | Collins et al. |
| 5,880,418 A | 3/1999 | Livesay |
| 5,973,256 A | 10/1999 | Martinez |
| 6,150,947 A | 11/2000 | Shima |
| 6,262,355 B1 | 7/2001 | Koch |
| 6,429,854 B1 | 8/2002 | McKown |
| 6,512,511 B2 | 1/2003 | Willner et al. |
| 6,595,424 B1 | 7/2003 | Harrison |
| 6,765,502 B2 | 7/2004 | Boldy et al. |
| 6,897,779 B2 | 5/2005 | Nishitani et al. |
| 6,952,173 B2 | 10/2005 | Miller et al. |
| 7,135,637 B2 | 11/2006 | Nishitani et al. |
| 7,183,477 B2 | 2/2007 | Nishitani et al. |
| 7,379,052 B2 | 5/2008 | Dellenger |
| 7,381,884 B1 | 6/2008 | Atakhanian |
| 7,569,762 B2 | 8/2009 | Baum et al. |
| 7,674,969 B2 | 3/2010 | Xu et al. |
| 7,711,505 B2 | 5/2010 | Ohta |
| 7,723,603 B2 | 5/2010 | Moffatt |
| 7,774,155 B2 | 8/2010 | Sato et al. |
| 7,781,666 B2 | 8/2010 | Nishitani et al. |
| 8,222,507 B1 | 7/2012 | Salazar et al. |
| 8,292,833 B2 | 10/2012 | Son et al. |
| 8,466,811 B2 | 6/2013 | Kang et al. |
| 8,797,260 B2 | 8/2014 | Mao et al. |
| 9,498,709 B2 | 11/2016 | Ikeda |
| 9,498,728 B2 | 11/2016 | Ikeda |
| 2001/0028430 A1 | 10/2001 | Mailman |
| 2002/0126026 A1 | 9/2002 | Lee et al. |
| 2003/0026170 A1 | 2/2003 | Yang |
| 2003/0146898 A1 | 8/2003 | Kawasaki |
| 2003/0184452 A1 | 10/2003 | Goodgoll |
| 2003/0196542 A1 | 10/2003 | Harrison |
| 2004/0012557 A1 | 1/2004 | Daniel |
| 2004/0065187 A1 | 4/2004 | Ludwig |
| 2005/0156895 A1 | 7/2005 | Ho |
| 2005/0264522 A1 | 12/2005 | Abe et al. |
| 2007/0063992 A1 | 3/2007 | Lundquist |
| 2009/0212979 A1 | 8/2009 | Catchings et al. |
| 2010/0110032 A1 | 5/2010 | Kim et al. |
| 2011/0118028 A1 | 5/2011 | Sobel et al. |
| 2011/0234483 A1 | 9/2011 | Lan et al. |
| 2011/0287806 A1 | 11/2011 | Vasudevan et al. |
| 2011/0294579 A1 | 12/2011 | Marks et al. |
| 2012/0103173 A1 | 5/2012 | Dury |
| 2013/0169420 A1 | 7/2013 | Blount |
| 2014/0028538 A1 | 1/2014 | Shin et al. |
| 2014/0266812 A1 | 9/2014 | Rajkowski |

FOREIGN PATENT DOCUMENTS

| | | |
|---|---|---|
| JP | H05150771 A | 6/1993 |
| JP | H05181481 A | 7/1993 |
| JP | H04352195 A | 5/1996 |
| JP | 2508186 B2 | 6/1996 |
| JP | H05100668 A | 2/1998 |
| JP | H05282095 A | 8/2001 |
| JP | H06175653 A | 7/2003 |
| WO | WO2004066261 A2 | 8/2004 |

OTHER PUBLICATIONS

Power Glove, Wikipedia, https://en.wikipedia.org/wiki/Power_Glove, created on Jul. 31, 2004.
Wired glove, Wikipedia, https://en.wikipedia.org/wiki/Wired_glove, created on Sep. 15, 2005.
Miburi, Wikipedia, https://en.wikipedia.org/wiki/Miburi, created on Feb. 12, 2010.
Joystick, Wikipedia, https://en.wikipedia.org/wiki/Joystick, created on Oct. 18, 2001.
Leap Motion, Wikipedia, https://en.wikipedia.org/wiki/Leap_Motion, created on May 23, 2012.
Kinect, Wikipedia, https://en.wikipedia.org/wiki/Kinect, created on Jun. 1, 2009.

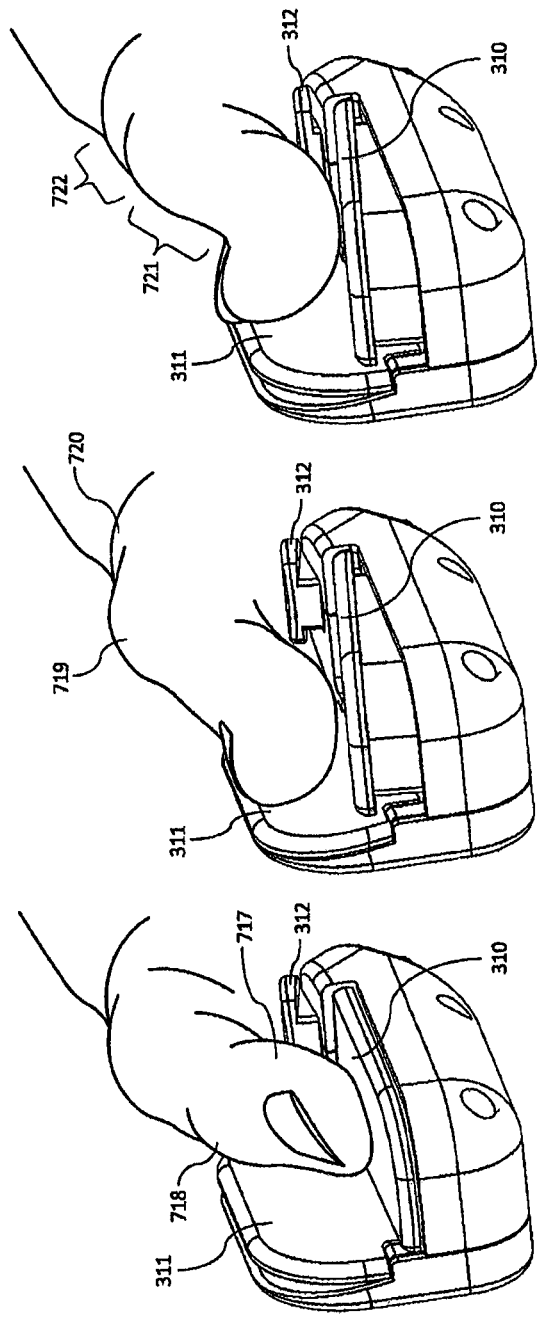

|          | Thumb       | Index          | Middle         | Ring           | Little         |
|----------|-------------|----------------|----------------|----------------|----------------|
| Distal   | C           | C#             | D              | D#             | E              |
| Medial   | A#          | B              | C (+1 octave)  | C# (+1 octave) | D (+1 octave)  |
| Proximal | F           | F#             | G              | G#             | A              |

Fig. 12A

|          | Thumb          | Index          | Middle         | Ring           | Little         |
|----------|----------------|----------------|----------------|----------------|----------------|
| Distal   | C              | D              | E              | F              | G              |
| Medial   | F (+1 octave)  | G (+1 octave)  | A (+1 octave)  | B (+1 octave)  | C (+2 octaves) |
| Proximal | A              | B              | C (+1 octave)  | D (+1 octave)  | E (+1 octave)  |

Fig. 12B

METHODS, DEVICES, AND METHODS FOR CREATING CONTROL SIGNALS

CROSS-REFERENCE TO RELATED APPLICATIONS

This application is a continuation of U.S. application Ser. No. 13/880,355, filed Apr. 18, 2013, which claims priority to International Application No. PCT/AU2011/001341 filed on Oct. 21, 2011, Australian Application No. 2010/001409, filed Oct. 22, 2010, Australian Provisional Application No. 2010905630, filed on Dec. 23, 2010, Australian Provisional Application No. 2010905631, filed on Dec. 23, 2010, and U.S. Provisional Application No. 61/478,278, filed on Apr. 22, 2011. This application is also related to Australian Provisional Application No. 2009905136 filed on Oct. 22, 2009. Each of these applications are herein incorporated by reference in their entirety.

FIELD

This disclosure generally relates to machine interfaces, and, more particularly, to methods, devices and/or systems for creating control signals in response to a user's actions such as the coordinated or independent movement of one or more of the user's digits (fingers/thumb), hand(s), and/or arm(s).

BACKGROUND

There are devices that utilize certain degrees of movement freedom available to the human arm and hand to create useful control signals for the creation of music. For example, certain body-actuated interfaces act to control a separate sound-generation unit by using digit touch sensors to trigger discrete musical tones as well as wrist flexion, elbow flexion, and shoulder abduction to control continuous-value output events that in turn control the intensity of modulatory sound effects.

Another known interface attempts to create control signals using linear or rotational velocity, acceleration, or the time-derivative of acceleration to control electronic musical sounds.

Another known interface which is utilized for the purpose of playing musical video games uses accelerometers and gyroscopes in data input and includes buttons that can be used to elicit binary (on-off) control signals.

Another known interface generates control signals via two digit touch sensors assigned to each digit. The two touch sensors assigned to a digit are each actuated by contact with a different area of the digit.

However, none of these known interfaces include rapid, substantially concurrent, and/or temporally-precise access to a broad range of discrete output events (e.g., musical pitches), combined with a motion, orientation, and/or position tracking system that captures movements and postures of a user's hand and/or arm in a way that is intuitive, high-resolution, and easy to learn. Accordingly, it would be desirable to provide machine interfaces, and methods, devices and/or systems for creating control signals in response to a user's actions to address one or more other problems in the art and/or provide one or more advantages.

SUMMARY

Exemplary embodiments relate to machine interfaces and/or methods, devices and/or systems for creating control signals in response to a user's actions. In exemplary embodiments, these actions may include, without limitation, the coordinated or independent movement of one or more of the user's digits (fingers/thumb), hand(s), and/or arm(s).

Exemplary embodiments of the methods, devices and/or systems may be used to control audio and visual information and/or outputs.

Exemplary embodiments may provide rapid, substantially concurrent, and/or temporally-precise access to a wide range of discrete output events. In exemplary embodiments the output events may be used, for example, to produce melodic, harmonic, and/or rhythmic outcomes. In exemplary embodiments, a hand-held device may provide at least 1, 2, 3, 4, 5, 6, 7, 8, 9, 10, 11, 12, 13, 14, and/or 15 finger/thumb operated buttons or activation points. In exemplary embodiments, the device may be capable of providing access to at least 1, 2, 3, 4, 5, 6, 7, 8, 9, 10, 11, 12, 13, 14, and/or 15 discrete output events.

In exemplary embodiments of a device or interface with 15 finger/thumb operated buttons or "digit buttons", the duration of time needed to play C major scale (e.g., C4, D4, E4, F4, G4, A4, B4, C5) may be measured. In exemplary embodiments, the time may start from when the first tone (C4) is triggered and end when the last tone (C5) is triggered. Multiple conditions may be tested, for example, tone pitch may be assigned to the digit buttons chromatically (e.g., as illustrated in FIG. 12, upper panel) or diatonically (e.g., as illustrated in FIG. 12, lower panel). In exemplary embodiments, users with an intermediate level of experience (approximately 40 hours total practice time over about 3 months) may be able to complete the C major scale in approximately 1 second (e.g., about 0.75, 0.8, 0.85, 0.9, 0.95, 1.05, 1.1, 1.15, 1.2, or 1.25 seconds) in the chromatic configuration and in approximately 0.8 seconds (e.g., about 0.6, 0.65, 0.7, 0.75, 0.85, 0.9, 0.95, 1.05, or 1.1 seconds) in the diatonic configuration. For users with a beginner level of experience (approximately 10 minutes total practice time) it is expected that they could complete the C major scale in approximately 4.6 seconds (e.g., about 4, 4.1, 4.2, 4.3, 4.4, 4.5, 4.7, 4.8, 4.9, or 5 seconds) in the chromatic configuration and in approximately 3.2 seconds (e.g., about 2.8, 2.9, 3, 3.1, 3.3, 3.4, 3.5, 3.6, 3.7, or 3.8 seconds) in the diatonic configuration. For users with an expert level of experience (approximately 500 hours total practice time over 24 months) it is expected that they could complete the C major scale in approximately 0.8 seconds (e.g., about 0.6, 0.65, 0.7, 0.75, 0.85, 0.9, 0.95, 1.05, or 1.1 seconds) in the chromatic configuration and in approximately 0.6 seconds (e.g., about 0.4, 0.45, 0.5, 0.55, 0.65, 0.7, 0.75, 0.85, 0.9, 0.95, or 1 seconds) in the diatonic configuration.

In exemplary embodiments, a similar test may be performed measuring the duration of time needed to play the pitches of a chromatic scale starting at C (e.g., C4, Db4, D4, Eb4, E4, F4, Gb4, G4, Ab4, A4, Bb4, B4, and C5) with the time starting from when the first tone (C4) is triggered to when the last tone (C5) is triggered. For this test a chromatic assignment of pitches to the digit buttons may be used (e.g., as illustrated in FIG. 12, upper panel). For users with an intermediate level of experience using an exemplary embodiment (approximately 40 hours total practice time over about 3 months) it is expected that they could complete the chromatic scale in approximately 1.7 seconds (e.g., about 1, 1.1, 1.2, 1.3, 1.4, 1.5, 1.6, 1.8, 1.9, 2, 2.1, 2.2, 2.3, 2.4, or 2.5 seconds). For users with a beginner level of experience using an exemplary embodiment (approximately 10 minutes total practice time) it is expected that they could complete the chromatic scale in approximately 7 seconds (e.g., about 5, 5.5, 6, 6.5, 7.5, 8, 8.5, 9, or 10 seconds). For users with an expert level of experience using an exemplary embodiment (approximately 500 hours total practice time over about 24 months) it is expected that they could complete the chromatic scale in approximately 1.3 seconds (e.g., about 0.9, 1, 1.1, 1.2, 1.4, 1.5, 1.6, 1.8, 1.9, or 2 seconds).

Tests may also assess the concurrent access to discrete output events provided by exemplary embodiments, that is, having more than one discrete output in a "triggered" state at a time. This may be assessed by measuring the duration of time a user requires to activate a harmonic set of musical tones (also referred to as a "chord"). For example, after a start signal is presented to a user the test may measure how long it takes to trigger the tones of a chord (without deactivating any of those tones). In this test a chromatic assignment of pitches to the digit buttons may be used (e.g., as illustrated in FIG. 12, upper panel). For users with an intermediate level of experience using an exemplary embodiment (approximately 40 hours total practice time over about 3 months) it is expected that they could produce these chords (after a start signal) in the following approximate times: C4, E4, and G4: 0.4 second (e.g., about 0.2, 0.3, 0.5, or 0.6 seconds); D4, F4, and A4: 0.3 seconds (e.g., about 0.1, 0.2, 0.4, or 0.5 seconds); F4, A4, and C5: 0.3 seconds (e.g., about 0.1, 0.2, 0.4, or 0.5 seconds). For users with a beginner level of experience using an exemplary embodiment (approximately 10 minutes total practice time) it is expected that they could produce these chords (after a start signal) in the following approximate times: C4, E4, and G4: 1.5 seconds (e.g., 1, 1.1, 1.2, 1.3, 1.4, 1.6, 1.7, 1.8, 1.9, or 2 seconds); D4, F4, and A4: 0.5 seconds (e.g., about 0.2, 0.3, 0.4, 0.6, 0.7, 0.8, 0.9, or 1 seconds); F4, A4, and C5: 0.4 seconds (e.g., about 0.1, 0.2, 0.3, 0.5, 0.6, 0.7, 0.8 seconds). For users with an expert level of experience using an exemplary embodiment (approximately 500 hours total practice time over 24 months) it is expected that they could produce these chords (after a start signal) in the following approximate times: C4, E4, and G4: 0.3 seconds (e.g., about 0.1, 0.2, 0.4, or 0.5 seconds); D4, F4, and A4: 0.2 seconds (e.g., about 0.1, 0.3, 0.4, or 0.5 seconds); F4, A4, and C5: 0.2 seconds (e.g., about 0.1, 0.3, 0.4, or 0.5 seconds).

Tests may also assess the temporal-precision with which discrete output events can be triggered by exemplary embodiments. This may be assessed by measuring, for example, how accurately a user can reproduce a rhythm using the onsets of musical sounds triggered using exemplary embodiments. For example, a test rhythm of 4 beats per measure (or "bar") at a tempo of 100 beats per minute may be made audible to a user, and the user may be required to emulate this rhythm while it is playing by repeatedly triggering a musical sound via a single digit button on an exemplary embodiment. Continuing this example, the time interval between each sound in a test rhythm may be 0.6 seconds, and the time interval between each sound triggered by the user may be measured and subtracted from 0.6 seconds to determine how close on average the user is to producing the test rhythm. The resulting average value may be divided by the test interval of 0.6 seconds and then multiplied by 100 to give a percentage error. For users with an intermediate level of experience using an exemplary embodiment (approximately 40 hours total practice time of about 3 months) it is expected that they could produce, on the following example digit buttons, the following approximate average time differences from the test interval of 0.6 seconds: Distal button—thumb: 0.013 seconds (e.g., about 2%, 3%, or 4% error); Proximal button—middle finger: 0.016 seconds (e.g., about 2%, 3%, or 4% error); Distal button—middle finger: 0.022 seconds (e.g., about 3%, 4%, or 5% error). For users with a beginner level of experience using an exemplary embodiment (approximately 10 minutes total practice time) it is expected that they could produce, on the following example digit buttons, the following approximate average time differences from the test interval of 0.6 sec: Distal button—thumb: 0.025 seconds (e.g., about 3%, 4%, or 5% error); Proximal button—middle finger: 0.032 seconds (e.g., about 4%, 5%, or 6% error); Distal button—middle finger: 0.046 seconds (e.g., about 7%, 8%, or 9% error). For users with an expert level of experience using an exemplary embodiment (approximately 500 hours total practice time over 24 months) it is expected that they could produce, on the following example digit buttons, the following approximate average time differences from the test interval of 0.6 sec: Distal button—thumb: 0.008 seconds (e.g., about 1%, 2%, 3%, or 4% error); Proximal button—middle finger: 0.011 seconds (e.g., about 2%, 3%, or 4% error); Distal button—middle finger: 0.015 seconds (e.g., about 2%, 3%, or 4% error).

Tests may also assess how intuitive the interface is to use by measuring the ease with which a user can learn to use it to perform particular tasks. For example, the interface may be used to control an emulation of a sustained-tone instrument like a saxophone, whereby notes are triggered using the digit buttons and controlling the rate of rotation of the interface around its vertical (yaw) axis is used to emulate the effect of blowing intensity (i.e., the force of blowing into a saxophone) on these tones. The user may be required to use the digit buttons to ascend melodically through the C major scale, and while keeping each new note actuated the interface may be swung in a plane approximately horizontal to the ground (from left to right or vice versa) in order to provide that note with a "fully voiced" tone. In other words the user actuates the next note in the scale approximately prior to each horizontal swing, with each swing moving in the direction opposite to the preceding swing. Multiple conditions might be tested, for example, notes may be assigned to the digit buttons chromatically (e.g., as illustrated in FIG. 12, upper panel) or diatonically (e.g., as illustrated in FIG. 12, lower panel). For users who are using an exemplary embodiment similar to that illustrated in FIG. 1 for the first time, it is estimated that the learning time they will require to play a C major scale in the manner prescribed above will be approximately less than 15 minutes (e.g., less than 10, 12, 14, 16, 18, or 20 minutes) in the diatonic configuration and less than 20 minutes (e.g., less than 15, 17, 19, 22, 24, or 26 minutes) in the chromatic configuration.

Tests may also assess the overall convenience of using exemplary embodiments. For example, the duration of time required to fasten an exemplary embodiment to a user's hand may be measured. In such a test a start signal may be given, after which a user must fasten an exemplary embodiment to their hand and actuate a single digit button. For intermediate and expert level users (as defined above) it is expected that they could fasten an exemplary embodiment to their hand and actuate a single digit button in approximately 8 seconds (e.g., about 5, 6, 7, 9, or 10 sec). For beginner level users it may expected that they could fasten an exemplary embodiment to their hand and actuate a single digit button in approximately less than 15 seconds (e.g., about 12, 13, 14, 16, 17, 18, 19, or 20 seconds). Other factors impacting on the overall convenience of exemplary embodiments may include their weight. Exemplary embodiments are anticipated to weigh 200-300 grams (e.g., about 175, 200, 225, 250, 275, 300, or 325 grams). Exemplary embodiments may also be used without interfering with conventional clothing worn by a user.

Exemplary embodiments may include a device with 15 finger operated buttons which gives the user rapid, substantially concurrent, and temporally-precise access to 15 discrete output events. Exemplary embodiments may include a device with 3, 5, 7, 8, 12, 13, 14, or 15 finger/thumb operated buttons which gives the user rapid, substantially concurrent, and temporally-precise access to 3, 5, 7, 8, 12, 13, 14, or 15 discrete output events. In exemplary embodiments, the interface may include at least 3, 5, 7, 8, 12, 13, 14, or 15 finger/thumb operated buttons. In exemplary embodiments, the user may be provided with access to at least 3, 5, 7, 8, 12, 13, 14, or 15 discrete output events. In exemplary embodiments, the buttons may be operated individually and/or in combination to create a harmonic arrangement of triggered notes. In exemplary embodiments, the device may be configured to allow the user to move between octaves by changing the orientation of the device around its lateral axis.

Exemplary embodiments may provide for a combination of melodic, harmonic, and/or rhythmic capacities with motion, orientation, and/or position sensing that is more precise, repeatable, intuitive, convenient, easy to learn, is less costly or combinations thereof.

Exemplary embodiments may provide for a hand-operated device that combines motion, orientation, and/or position sensing with digit (finger and thumb) buttons. In exemplary embodiments, the device may include multiple buttons (e.g., 3, 5, 7, 8, 12, 13, 14, or 15 buttons). In exemplary embodiments, one or more of the buttons may be designed to be actuated only by the end segments of the digits or by other parts of the digits as well. Exemplary embodiments may include a device with motion, orientation, and/or position sensing and no finger operated buttons or activation points.

In exemplary embodiments, the motion, orientation, and/or position sensing technology may be embodied in numerous ways. For example, in exemplary embodiments, the device may use any combination of acceleration sensing, angular rotation rate sensing, magnetic field sensing, video motion capture, ultrasound, time of flight cameras, etc.

In exemplary embodiments the device may combine motion, orientation, and/or position sensing with a "multi-phalangeal" interface. For example, in exemplary embodiments, the device may have multiple buttons (for example 3, 5, 7, 8, 12, 13, 14, or 15 buttons) some of which are positioned to be actuated by phalanges other than the distal phalanx (tip of finger).

In exemplary embodiments the device may combine motion and/or orientation sensing with a multi-phalangeal interface that has at least 3 touch sensors per finger or at least 3 touch sensors per digit (fingers and thumb). In exemplary embodiments the device may combine motion and/or orientation sensing with a multi-phalangeal interface that has at least 4 touch sensors per finger or at least 4 touch sensors per digit (fingers and thumb). In exemplary embodiments the device may combine motion and/or orientation sensing with a multi-phalangeal interface that has at least 2 touch sensors per finger or at least 2 touch sensors per digit (fingers and thumb). In exemplary embodiments the device may combine motion and/or orientation sensing with a multi-phalangeal interface that has at least 1, 2, 3, 4 or 5 touch sensors per finger or at least 1, 2, 3, 4 or 5 touch sensors per digit (fingers and thumb). Certain embodiments may have different combinations of touch sensors per finger or touch sensors per digit (fingers and thumb). For example at least one digit may have 4 touch sensors and at least one digit may have 2 sensors. Other combinations are also contemplated.

In exemplary embodiments, there may be provided a hand operated input device including a series of activation points activated by the fingers and/or a thumb of a user; a positioning component measuring a current motion, orientation, and/or position of the device, and a processor interconnected to the activation points and the positioning component for outputting a series of currently active activation points and the current motion, orientation, and/or position of the input device. In exemplary embodiments, there may be provided a hand operated input device including a series of activation points activated by the fingers and/or a thumb of a user; a positioning component measuring a current motion, orientation, and/or position of the device, and a processor interconnected to the activation points and the positioning component for outputting a series of currently active activation points and the current motion, orientation, and/or position of the input device.

In exemplary embodiments, the number of activation points per finger and/or thumb may be at least 2. In exemplary embodiments, the activation points may be spaced apart from one another for interaction with different portions of a user's finger and/or thumb.

In exemplary embodiments, the number of activation points per finger may be at least 3. In exemplary embodiments a series (e.g., at least 2 or 3) of activation points may also be accommodated for the thumb.

In exemplary embodiments, the positioning component may include one or more orientation sensors for sensing the rotational orientation of the device. For example, in exemplary embodiments, orientation sensors may output a roll, pitch and/or yaw angle of the device. In exemplary embodiments, the positioning component may include one or more angular rate sensors for sensing the rate of angular rotational of the device. Further, in exemplary embodiments, the positioning component may include position sensors either internal or external to the device which sense the position of the device.

In exemplary embodiments, the device may include a weighted elongated portion counterbalancing the activation points when in use by a user. In exemplary embodiments, the relative position of the activation points may be adjustable for each finger. In exemplary embodiments, the activation points may be formed from switches that can be actuated by a finger or thumb. In exemplary embodiments, the processor may be interconnected to a wireless transmitter for wireless transmission of the output. In exemplary embodiments, the interconnection may also be a wired connection or an infrared connection. In exemplary embodiments, the activation points may be actuated either individually or in combination with other activation points. For example, the distal, medial or proximal activation points assigned to different fingers may be actuated at the same time or at substantially the same time. In addition, in exemplary embodiments, the distal and proximal activation points assigned to the same finger may be actuated at substantially the same time, or the distal and medial activation points assigned to the same finger may be actuated at substantially the same time.

In exemplary embodiments, the systems, devices, and methods may be utilized as a music input device. For example, the activation points may be mapped to notes on a chromatic or diatonic scale, one axis of the orientation of the device can be mapped to a series of zones that control the octave of a note's pitch, one axis of the orientation of the device can be used to control gradated pitch, one axis of the orientation of the device can be used to control one or more sound effects, one axis of the orientation of the device can be used to control the rate of playback of audio or video samples, and one axis of the orientation of the device can be used to control audio volume.

In exemplary embodiments, at least two hand operated input devices may be provided. In exemplary embodiments, each device may include a series of activation points activated by the fingers of a user; a positioning component measuring a current motion, orientation, and/or position of the device and a processor interconnected to the activation points and the motion sensors for the orientation of the input device. In exemplary embodiments, at least one additional processor may be interconnected to the processor of each device for calculating a differential output between at least two hand-operated input devices.

Exemplary embodiments may relate to a hand operated input device comprising a plurality of modules, each module being configured for operation by a digit (finger or thumb) of a user; a plurality of activation points configured to be activated by the digits of the user; at least one positioning component sensor for measuring a motion, position, or orientation value of the input device; and a processor interconnected to the activation points and the positioning component sensor for outputting a series of currently active activation points and the motion, position, or orientation value of the input device. In exemplary embodiments each of the plurality of modules comprises at least one activation point capable of being modulated by a distal portion of a finger, a medial portion of a finger, or a proximal portion of a finger; and the activation points are mapped to musical notes. Certain embodiments may have various combinations of modules and activation points.

DESCRIPTION OF THE DRAWINGS

Exemplary embodiments will now be described, by way of example only, with reference to the accompanying drawings in which:

FIG. 7B, FIG. 7C, and FIG. 7D illustrate an exemplary embodiment of a thumb digit array in isolation from a lower left rotated perspective and methods of actuating thumb digit buttons using a thumb, wherein the independent actuation of the distal thumb, medial thumb, and proximal thumb buttons are illustrated in FIG. 7B, FIG. 7C, and FIG. 7D respectively;

FIG. 12A and FIG. 12B illustrates exemplary assignments of tone pitches to interface digit buttons;

DESCRIPTION OF EXEMPLARY EMBODIMENTS

Figure 1:
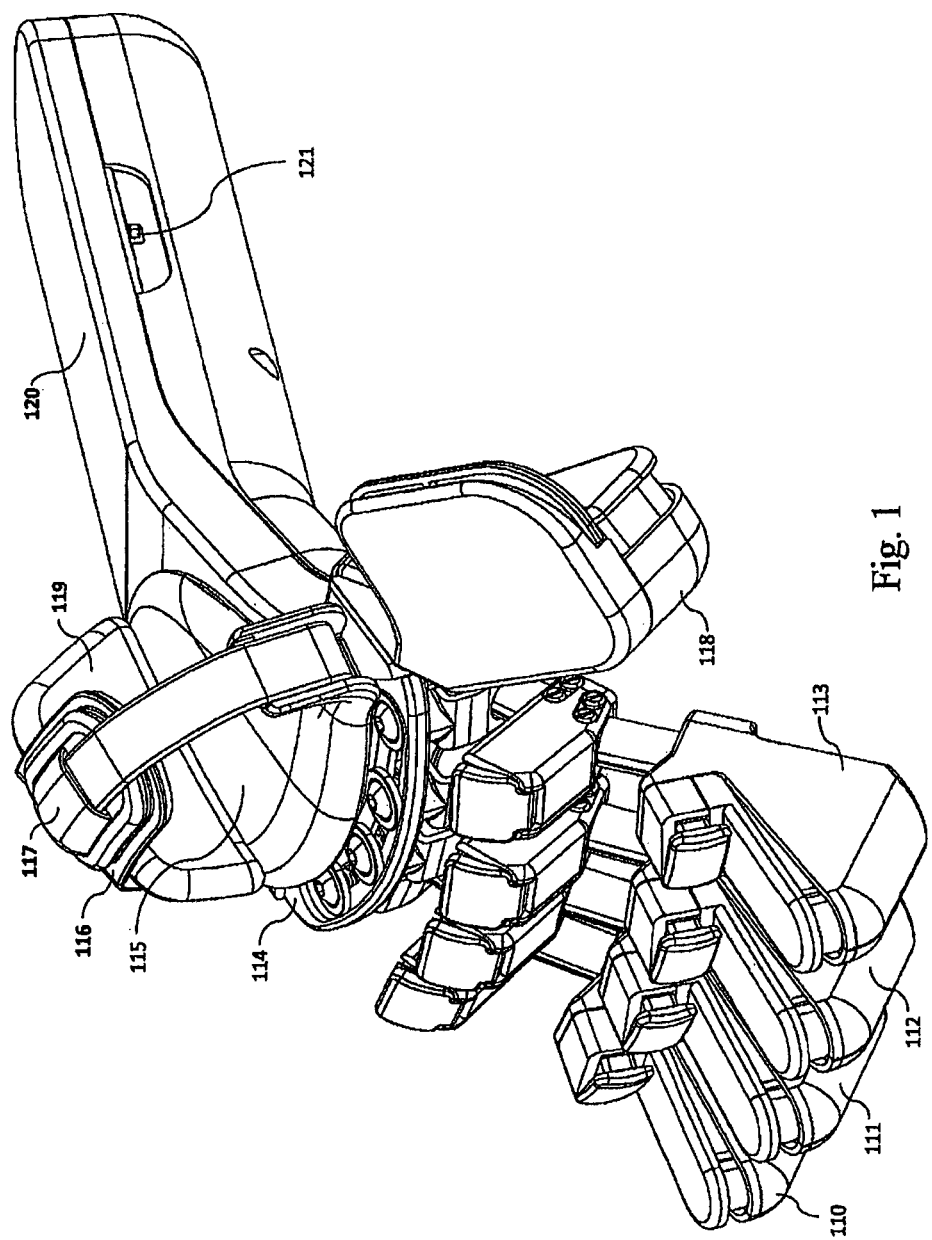
FIG. 1 illustrates an exemplary embodiment of an interface from a front left perspective.

Exemplary embodiments may include a device with 15 digit operated buttons which gives the user rapid and rhythmically-precise access to 15 notes. In exemplary embodiments, the buttons may be operated individually and/or in combination (thereby creating melody and/or harmony). In exemplary embodiments, the device may be configured to allow the user to move between octaves by changing the orientation of the device around its lateral axis. Exemplary embodiments may provide for a combination of melodic, harmonic, and/or rhythmic capacities with a motion and/or orientation sensing that is more precise, repeatable, intuitive, convenient, and easier to learn.

Access to at least 13 pitches means the user may be able to play through all, or substantially all, the notes of standard divisions of an octave, for example the "western" chromatic scale. Thus a user can access most or all the diatonic scales derived from the chromatic scale (e.g., major and minor scales) without needing to change the assignment of notes to the interface. Due to this consistency, combined with the temporal-precision and repeatability of note-triggering, exemplary embodiments provide a highly effective and easy to learn musical controller system.

In general, locations on the human hand and arm mentioned in the following description refer to an anatomical position of the right arm in which the upper arm hangs parallel to the upright body with the elbow bent and with the forearm and hand horizontal to the ground and pointing forwards. In this position the forearm is pronated such that the palm of the right hand is facing the ground at a slight angle (i.e., with the palm lifted up slightly towards the user's body). A variety of angles may be used, and for this exemplary embodiment an angle of approximately 25 degrees from the ground plane is prescribed. As used herein, this anatomical position will be referred to as the "neutral operating position". Other exemplary embodiments may use pronation angles of −30, −15, 0, 15, 30, 45, 60, 75, or 90 (thumb pointing up), 105, 120, or 135 degrees.

Furthermore, as used herein, the device's axes of roll, pitch, and yaw are defined approximately relative to the user's hand: With fingers outstretched in the same plane as the palm, rotating the hand and forearm around the axis of the middle finger is defined as rotating within the roll plane (i.e., rotating around the longitudinal axis). Bending at the elbow is defined as rotating within the pitch plane (i.e., rotating around the lateral axis). Perpendicular to both the roll and the pitch planes is the yaw plane (i.e., the vertical axis). In this description the term "pitch" may be used in the sense of the pitch of a sound as it is perceived by a listener, rather than as a strict reference to the fundamental frequency of a sound. In the sense used in this description the term pitch is largely synonymous with the term "note" (for example, a pitch of C is meant to refer to the note C in any octave). Scientific pitch notation may also be used to describe both pitch and octave. For example, the pitch A4 refers to the note A in octave number 4. In this description the term continuous may be used in reference to sensor measurements, and is intended to describe sensor values that have more one than one value over time and are substantially gradated in character.

Exemplary embodiments of a hand operated device are illustrated in FIG. 1 to FIG. 12. These exemplary embodiments are designed to interact with the right hand of the user, and the terms "left" and "right" used in this description are also defined relative to the user. However, it should be readily understood that the embodiments described herein are not limited to right hand devices. Methods, devices and systems described herein may also be used with the left hand or with both hands. In exemplary embodiments, the device may be constructed to be used interchangeably with the left and right hands.

FIG. 1 illustrates an exemplary interface from a front-left perspective. At the front of the interface are four modules (110, 111, 112, and 113), each of which is referred to as a "finger digit array". These finger digit arrays are positioned for operation by the little finger (110), ring finger (111), middle finger (112), and index finger (113) of the user's right hand respectively. Each finger digit array is connected to the rest of the structure by a rail or track 114 (the "digit array track"). This track is connected to a region of the structure, referred to as the "palm enclosure" 115, which is designed to sit under the palm of the user's hand. Also connected to the palm enclosure 115 is a module, referred to as the "thumb digit array" 118, which is positioned for operation by the thumb.

Attached to the right-hand side of the palm enclosure 115 of this exemplary embodiment and reaching over the top of the user's hand is a "palm clasp" 116. Attached to the left-hand side of the palm enclosure 115 and reaching over the top of the user's hand is a "hand strap" 117. In exemplary embodiments, the section of the hand strap attached to the palm enclosure may be flexible and elastic. The lower surface of the opposite end of the hand strap attaches to the upper surface the palm clasp 116. As those skilled in the art would be aware, a variety of different mechanisms may be used to attach the hand strap to the palm clasp, including means like press studs or buckles, etc. A hook and loop mechanism may be used, and, in exemplary embodiments, the areas of the hand strap and palm clasp covered by the hook and loop mechanism may be made be sufficiently large to allow the attachment position to be varied while maintaining a secure attachment. In exemplary embodiments, this variation may allow the tightness of the attachment of the interface to the hand to be adjusted, however additional tightness adjustment means may also be used.

Sitting inside the palm clasp of this exemplary embodiment is a soft detachable cushioning section 119, referred to as the "hand clasp spacer". Located behind the palm enclosure 115 is the "rear enclosure" 120. In exemplary embodiments, a power switch 121 for turning the electronics of the interface on and off may be located on the rear enclosure. In exemplary embodiments, the rear enclosure may be angled slightly downwards away from the plane formed by the top of the palm enclosure which may assist in preventing the rear enclosure from colliding with the user's forearm if the wrist is flexed. As it descends from the palm enclosure, the rear enclosure may also fall slightly rightwards (relative to the palm enclosure). In exemplary embodiments, this angle may be such that when the hand and arm are in the neutral operating position, the rear enclosure of the interface lies beneath (rather than to the left or right) of the forearm.

Figure 2:
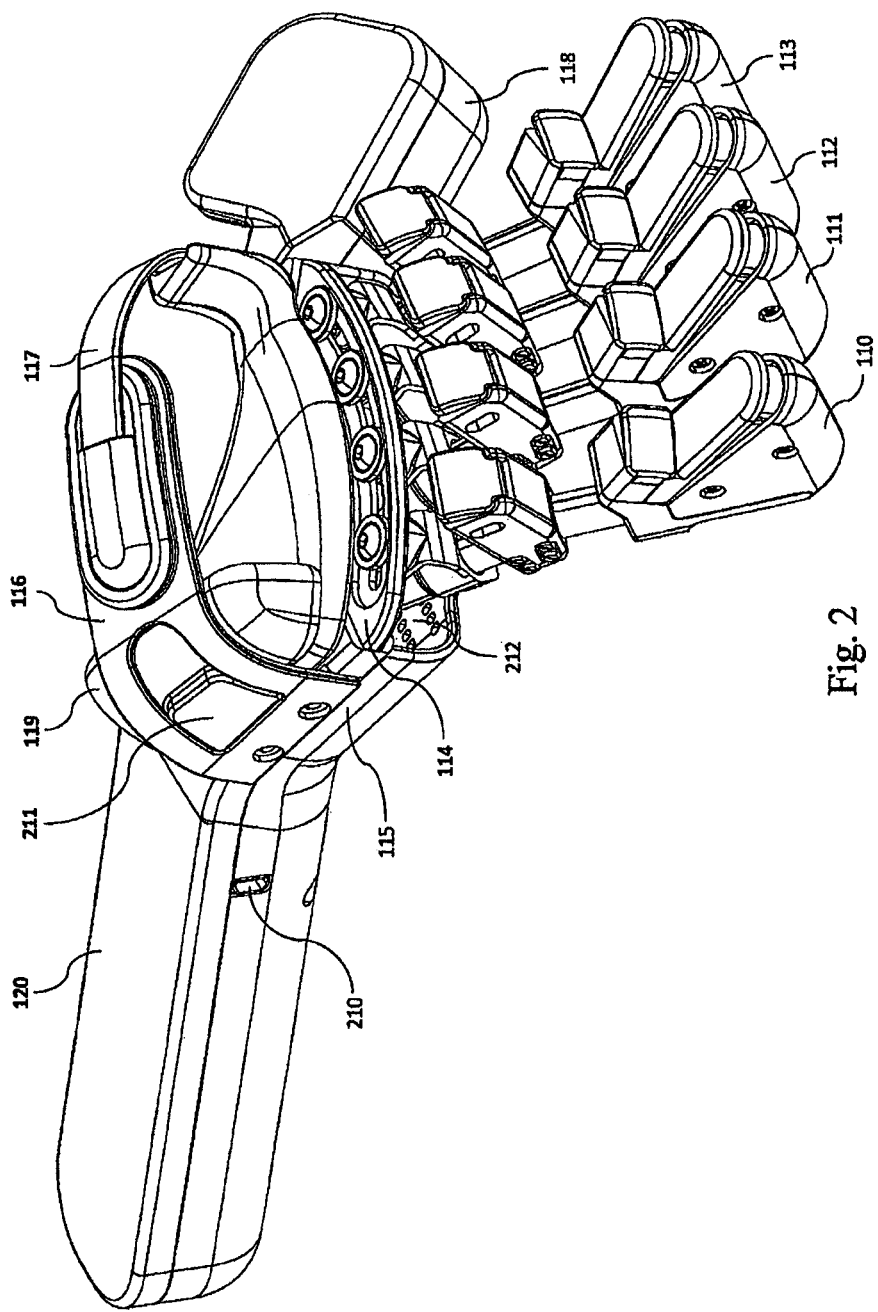
FIG. 2 illustrates an exemplary embodiment of an interface from the front right perspective.

FIG. 2 illustrates an exemplary embodiment of an interface from a front-right perspective. In exemplary embodiments a data cable port 210 (e.g., USB, MIDI, Firewire, Thunderbolt, or another suitable connector type) may be located on the rear-enclosure 120. As illustrated in this figure, the hand clasp spacer 119 may be held in place by a protrusion 211 which projects into a frame formed by the hand clasp 116. In exemplary embodiments, the hand clasp spacer may be swapped-out for a different-sized spacer that projects more or less leftwards into the area above the palm enclosure 115, or the spacer may be removed entirely. In addition an opening 212 at the front of the palm enclosure may act as a recess for the rear-most sections of the finger digit arrays (110, 111, 112, and 113).

Figure 3:
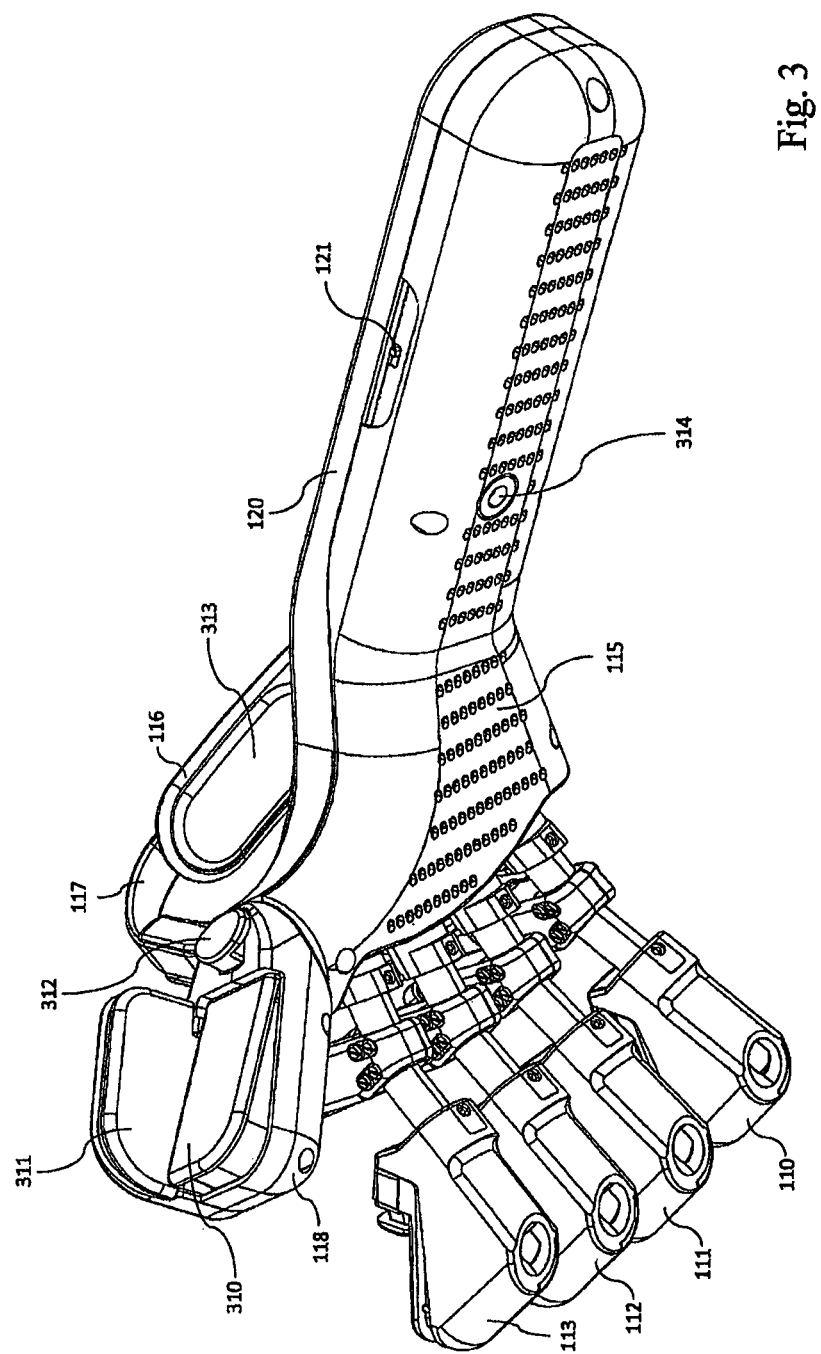
FIG. 3 illustrates an exemplary embodiment of an interface from a lower left side perspective.

FIG. 3 shows an exemplary embodiment of an interface from a lower-left side perspective. Three buttons may be located on the thumb digit array 118; a "distal" thumb button 310, a "medial" thumb button 311, and a "proximal" thumb button 312. On the underside of the hand clasp 116 (the side that rests against the back of the user's hand) soft padding 313 may be included. Additionally, in exemplary embodiments, the underside of the rear enclosure 120 may include a socket for receiving a power cable 314.

Figure 4A:
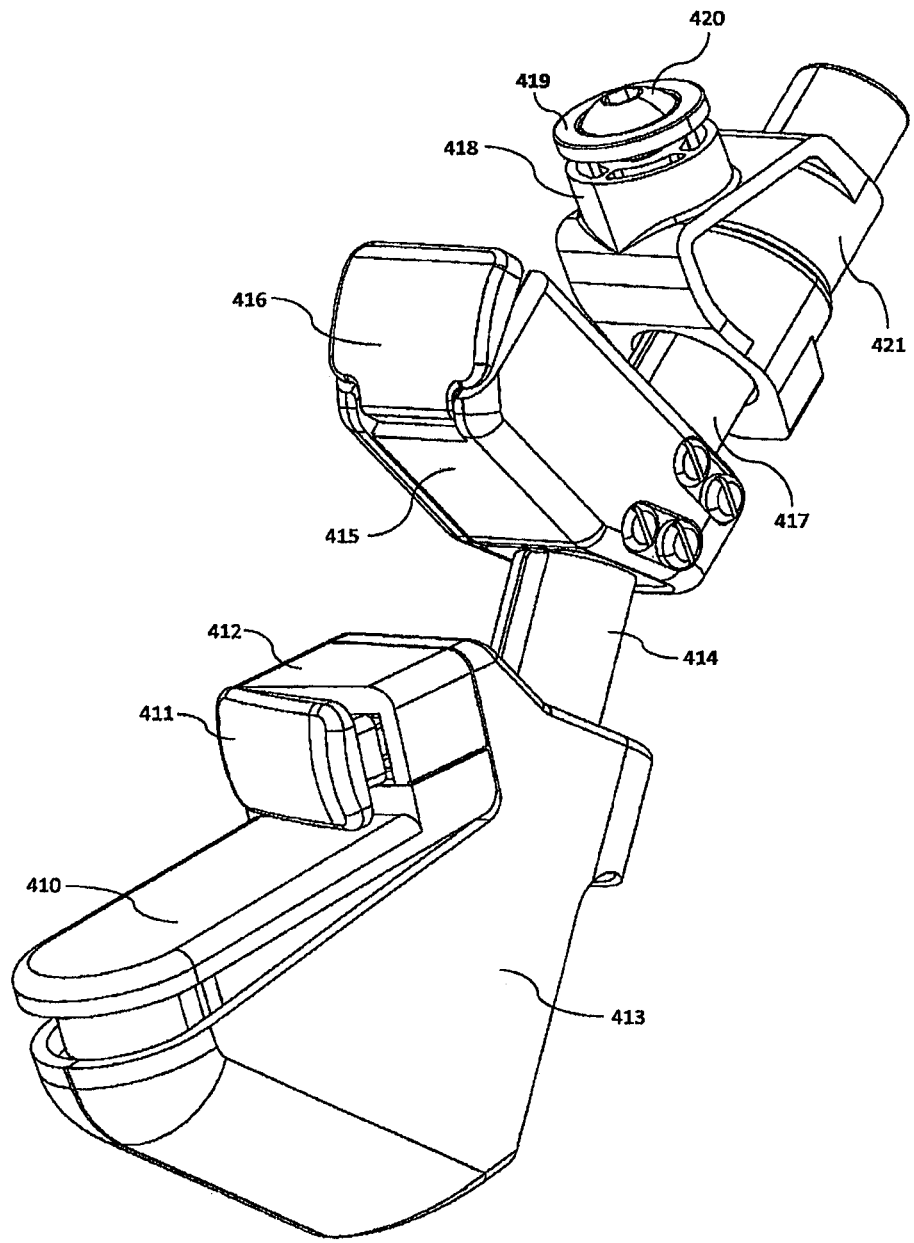
FIG. 4A illustrates an exemplary embodiment of a single finger digit array from a front left perspective in isolation.

Illustrated in FIG. 4A is an embodiment of a finger digit array, from a front-left perspective, in isolation from the rest of the exemplary interface. In exemplary embodiments some or all of the finger digit arrays may be identical in design and similar to the thumb digit array. The finger digit array may include a distal finger button 410, a medial finger button 411, and a proximal finger button 416. The medial finger button may be mounted in a combined structure formed by a "medial" enclosure 412 and the rear portion of the distal finger button 410. The distal finger button may be mounted in a "distal" enclosure 413. In exemplary embodiments, some or all of the finger digit arrays may not be identical. For example, they may be different sizes and/or include different buttons. For both the fingers and thumb, each button (distal, medial, proximal, etc.) may be referred to as a "digit button", and may include a "digit button sensor" or "button sensor".

In exemplary embodiments the distal enclosure may be mounted on a "distal" shaft 414, such that the distal enclosure can slide up and down, as well as around, the distal shaft. The distal shaft may be connected to a "proximal" enclosure 415, and the proximal enclosure may also be the structure in which the proximal finger button 416 is mounted. The proximal enclosure may be connected to a "proximal" shaft 417. The exposed rear portion of the proximal shaft may be mounted in a "digit array track connector" 421, such that the proximal shaft can slide in and out of, as well as rotate within, the digit array track connector. On the upper portion of the digit array track connector may be a cylindrical "digit array track connector clamp" 418. Threaded into this clamp may be a "connector bolt" 420 and under the head of the bolt may be a washer 419. In exemplary embodiments, it is contemplated that the upper end of the connector bolt may interface with, and can be tightened/loosened by, an appropriate sized Allen or Hex key. However, a variety of methods for tightening and loosening the connector bolt may be used, including, for example, an outward protruding key head on the bolt that is accessible to, and can be manipulated by, the user's fingers, or conventional screws, etc.

Figure 5:
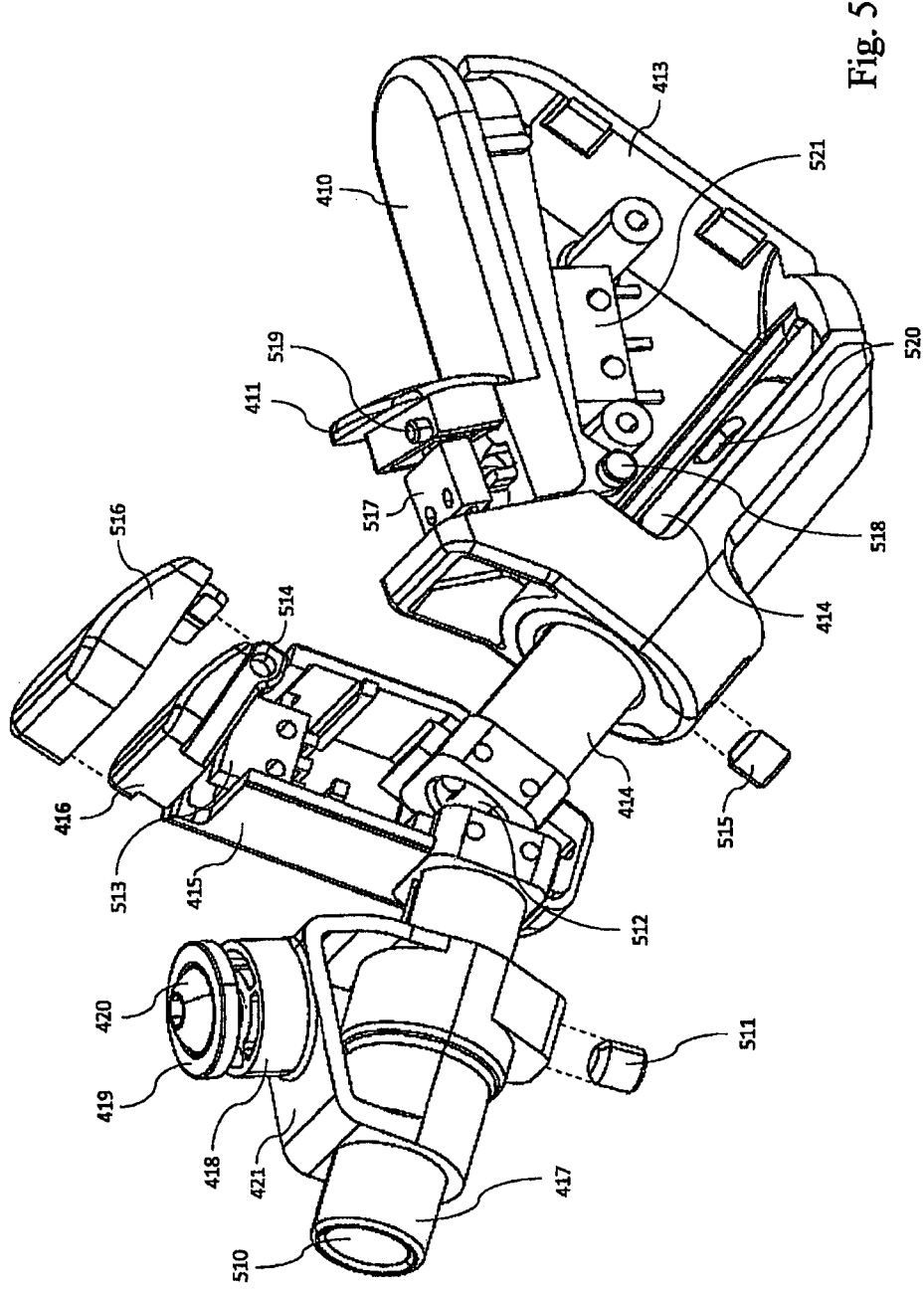
FIG. 5 illustrates an exemplary embodiment of a single finger digit array from the rear right side perspective in isolation with the side panels of the proximal and distal enclosures removed, and the top section of the medial enclosure removed.

FIG. 5 illustrates an exemplary embodiment of a finger digit array in isolation from a rear right side perspective, with side sections of the proximal and distal enclosures removed, as well as the top section of the medial enclosure removed. In exemplary embodiments, the proximal shaft 417 and the distal shaft 414 may both be hollow, allowing electrical wiring to enter the digit array at the rear-end 510 of the proximal shaft and exit at a portal 512 within the proximal enclosure or a portal 520 in the distal enclosure.

Also illustrated in FIG. 5 is a threaded bolt 511 that may extend through the underside of the tubular section of the digit array track connector 421 (bolt thread not shown in figure). At the upper end of this bolt a rubber plug may be attached that makes contact with the proximal shaft, thus screwing the bolt inwards may act to immobilize the proximal shaft relative to the digit array track connector. In a similar fashion a threaded bolt 515 may extend through the underside of the distal enclosure 413 (bolt thread not shown in figure), and screwing the bolt inwards may act to immobilize the distal enclosure relative to the distal shaft. In exemplary embodiments, it is contemplated that the lower end of each of these bolts may interface with, and can be tightened/loosened by, an appropriate sized Allen or Hex key. However, a variety of methods for tightening and loosening these bolts may be used, including, for example, a large outward protruding key head on the bolt that is accessible to, and can be manipulated by, the user's fingers, or conventional screws, etc.

A "proximal" microswitch 513 may be positioned for actuation by the proximal finger button 416. The microswitch may be used to provide operating and/or return force for the button, and/or haptic feedback indicating the trigger point has been reached. In exemplary embodiments, this may be the case for all (or at least some) of the microswitches and their respective buttons used in the finger and thumb digit arrays. Axle protrusions from the proximal enclosure housing may be inserted into an axle cavity 514 and its matching axle cavity on the other side of the proximal finger button. These components would form an axle mechanism around which the proximal finger button rotates during its actuation. In exemplary embodiments, a method of reducing the relative force transmitted to the axle mechanism by the actuating finger may be used. For example, as can be seen in FIG. 5, the height of the proximal button above the axle cavity 514 is reduced relative to the rear portion of the button. As a result, more of the force of the actuating finger may be translated into the rear of the button than the front axle area, thereby making the button easier to actuate. The overall height of the button can also be adjusted with a removable "button cover" 516. This cover may slide over the top of the proximal finger button and be kept in place using standard methods (e.g., by friction between the cover and the button resulting from a tight fit, or a clipping mechanism formed by overhanging sections of the cover, etc.). Once in place, the cover may allow normal operation of the button, but with the contact surface now being closer to the actuating finger.

A "medial" microswitch 517 may be positioned for actuation by the medial finger button 411. The medial finger button axle protrusion 519 and its matching axle protrusion on the lower side of the medial finger button may insert into axle cavities in the medial enclosure housing and the top of the distal button 410. These components would form an axle mechanism around which the medial finger button rotates during its actuation. In exemplary embodiments the medial finger button may use the force-to-axle reduction method described for the proximal finger button above.

A "distal" microswitch 521 may be positioned for actuation by the distal finger button 410. The distal finger button axle protrusion 518 and its matching axle protrusion on the other side of the distal finger button may insert into axle cavities in the distal enclosure housing. In exemplary embodiments, these components may form an axle mechanism around which the distal finger button rotates during its actuation. In exemplary embodiments where the medial enclosure and its respective microswitch and button are mounted on top of the distal finger button, actuation of the distal finger button would also rotate the medial enclosure and it's components around the distal finger button's axle mechanism. In exemplary embodiments, the medial finger button's finger-contact area may be relatively thin (as measured between its top and bottom edges) and/or rounded. Additionally, in exemplary embodiments, the finger-contact area of the distal finger button may be relatively long, as measured from its axle mechanism to its front edge. In exemplary embodiments, the three microswitches on the finger digit array may be orientated in such a way that their hinges are positioned towards the axles of their respective buttons, thus the microswitch levers would actuate in the same arc as their respective buttons.

In exemplary embodiments, the positive, ground, and signal wires from the medial microswitch 517 may descend through a cavity in the distal finger button into the distal enclosure 413. The positive and ground connections of the medial and distal microswitches may be combined, and the positive, ground, and two signal wires may enter the distal shaft via a wiring portal 520. The signal wires from the distal and medial microswitches may extend back through the distal and proximal shafts to the wiring portal 510. The positive and ground connections of some or all three microswitches may be combined in the proximal enclosure and, combined with the signal wire of the proximal microswitch, extend back through the proximal shaft to the wiring portal 510.

Figure 6:
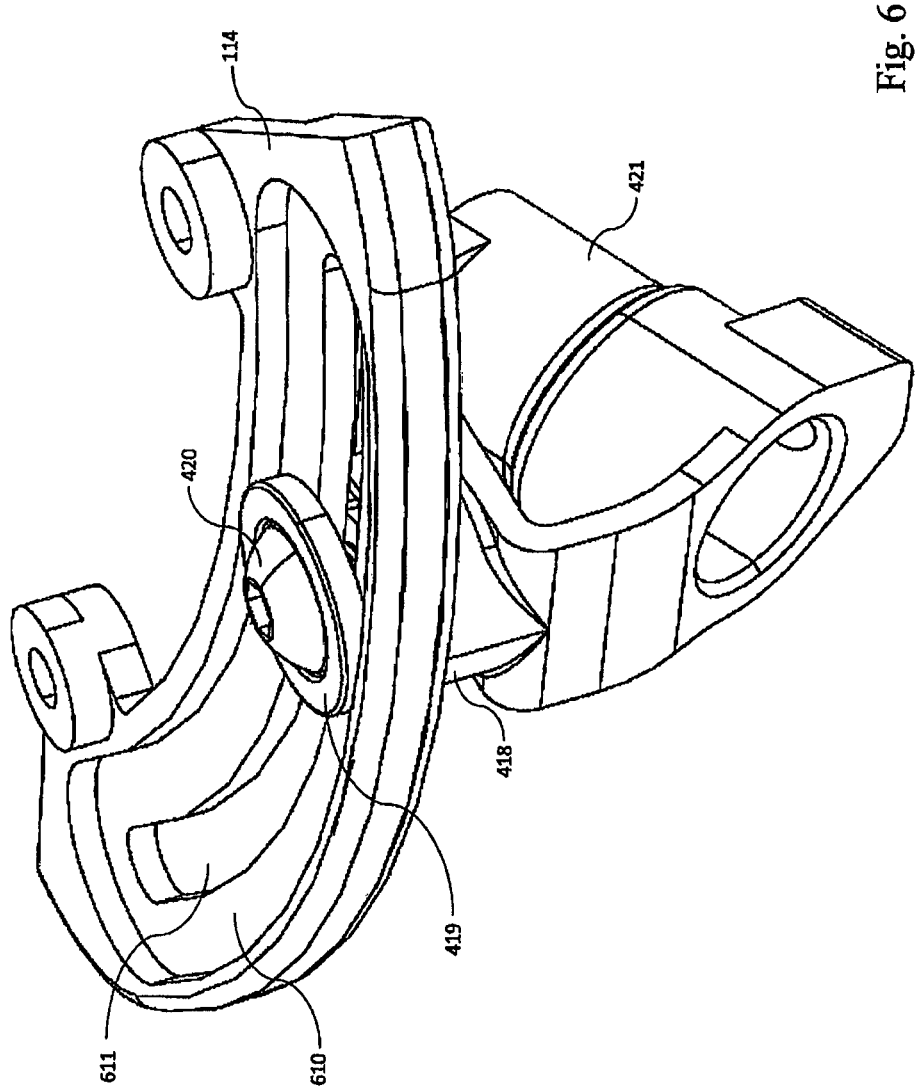
FIG. 6 illustrates an exemplary embodiment of a digit array track and a digit array track connector in isolation from a front-left perspective.

FIG. 6 illustrates an exemplary embodiment of the digit array track 114 and a digit array track connector 421 in isolation from a front-left perspective. In exemplary embodiments, there may be a recessed fin section 610 within the digit array track against which the lower face of the connector bolt washer 419 and the upper face of the connector clamp 418 press. The connector bolt 420 may pass through a channel 611 running between the fin parts on either side. Tightening the connector bolt would press the washer and the connector clamp against the fin parts 610, effectively immobilizing the digit array track connector's location and orientation on the digit array track.

Figure 7A:
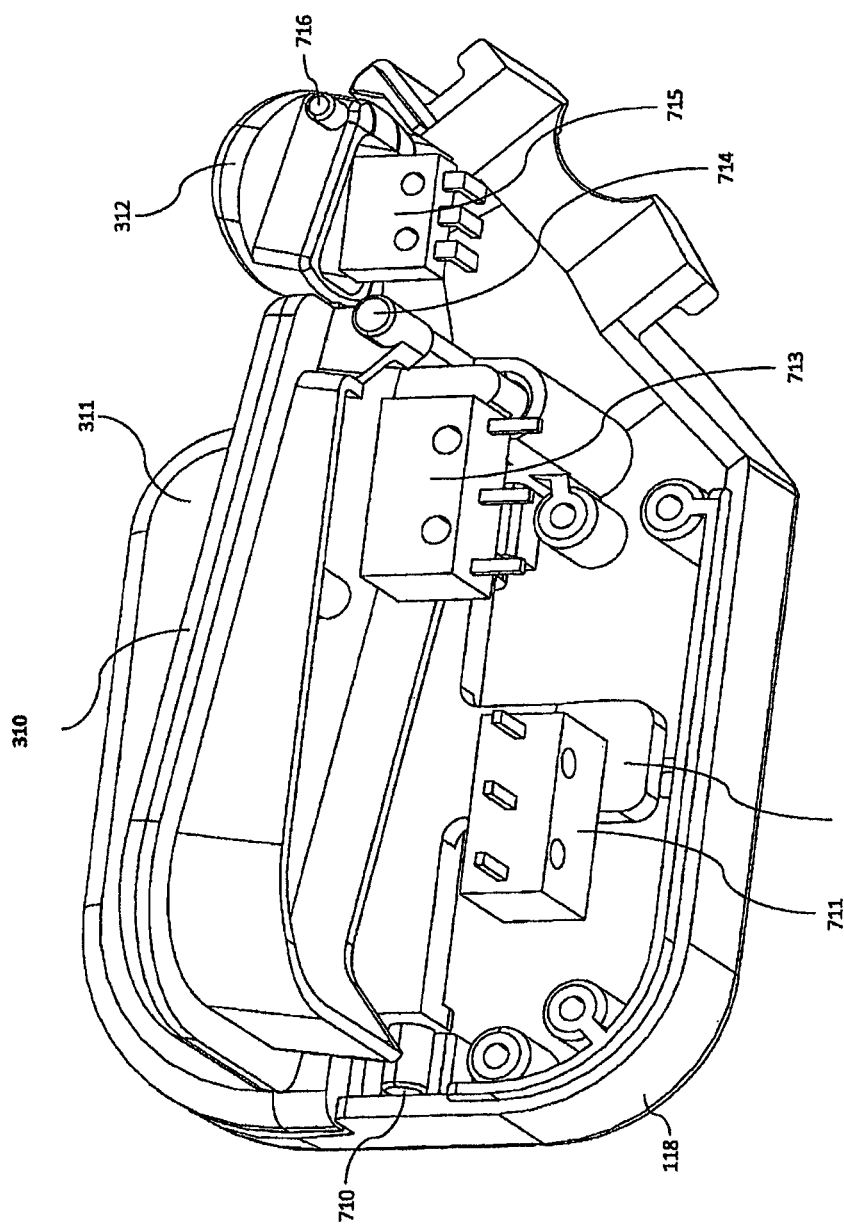
FIG. 7A illustrates an exemplary embodiment of a thumb digit array in isolation from a lower left perspective with the lower portion of the thumb digit array's enclosure housing removed.

FIG. 7A illustrates an embodiment of the thumb digit array in isolation from below, with the lower portion of the thumb digit array's enclosure housing removed. In exemplary embodiments, the medial thumb button 311 may have an axle protrusion 710. This protrusion, and its matching axle protrusion on the other side of the medial thumb button, would insert into axle cavities in the thumb digit array enclosure housing. These components would form an axle mechanism around which the medial thumb button rotates during its actuation. A "medial" thumb microswitch 711 may be positioned for actuation by an extension 712 of the medial thumb button. The extension is on the opposite side of the medial thumb button's axle mechanism, thus actuating (depressing) the medial thumb button would rotate the extension towards the medial thumb microswitch. In exemplary embodiments, the microswitch may be oriented such that the tip of its lever makes contact with the extension and the hinge of the microswitch is positioned towards the left of the interface (which in FIG. 7A is also towards the left of the figure), thus the microswitch lever would actuate in an arc orthogonal to that of the extension.

A "distal" thumb microswitch 713 may be positioned for actuation by the distal thumb button 310. The distal thumb button axle protrusion 714, and its matching axle protrusion on the other side of the distal thumb button, may insert into axle cavities in the thumb digit array enclosure housing. These components would form an axle mechanism around which the distal thumb button rotates during its actuation. The distal thumb microswitch is orientated in such a way that its hinge may be positioned towards the axle of the distal thumb button (i.e., towards the right of FIG. 7A), thus the microswitch lever would actuate in the same arc as the distal thumb button.

A "proximal" thumb microswitch 715 may be positioned for actuation by the proximal thumb button 312. The proximal thumb button axle protrusion 716 and its matching axle protrusion on the other side of the proximal thumb button 312 may insert into axle cavities in the thumb digit array enclosure housing. These components would form an axle mechanism around which the proximal thumb button rotates during its actuation. The proximal thumb microswitch may be orientated in such a way that its hinge is positioned towards the axle of the proximal thumb button (i.e., towards the right of FIG. 7A), thus the microswitch lever would actuate in the same arc as the proximal thumb button. In exemplary embodiments, the proximal thumb button may use the force-to-axle reduction method described for the proximal finger and medial finger buttons above. While not illustrated in FIG. 7A, this button may also incorporate a removable button cover (as described for the proximal finger button above) to adjust the distance of the contact surface of the button from the thumb.

In the exemplary embodiment described in FIG. 1, the rear enclosure 120 is designed to house electronics and to use the weight of these electronics and its own structure to act as a counterweight against the weight of the interface's sections that are positioned in front of the user's wrist. This counterweight effect can be used to modify or eliminate the muscular activity required by the user wearing the interface to keep their wrist straight in the neutral operating position (as defined earlier). Where the balance point (the place where the interface can be suspended from and remain in balance) between the front and the rear of the interface lies will depend on a variety of factors including the weight of materials used in construction, the length of the rear enclosure, and the placement of components within the rear enclosure. A wide range of balance points may be utilized. However, in exemplary embodiments, it is contemplated that the balance point may lie approximately at the middle of the user's palm (i.e., approximately the middle of the palm enclosure 115). In exemplary embodiments that have no rear enclosure (see FIG. 13A) or a relatively short rear enclosure (see FIG. 13B) the balance point may be closer to the front of the interface. For uses in which it is desirable to move the balance point back (further reducing the muscular activity required to keep the wrist straight in the neutral operating position), exemplary embodiments may include additional weight in the rear enclosure and/or distance weight in the rear enclosure further away from the wrist, possibly by extending the rear enclosure.

In exemplary embodiments, some or all of the additional electronics may be located in the rear enclosure. In exemplary embodiments, some or all of the additional electronics may be located elsewhere in the interface or not be located in the interface at all. In each of these alternatives however, the electronics may perform the following tasks. One task may be to convert the signals coming from the digit buttons into a single digital data stream that can be passed on to another device in a useful form. Another task may be to measure the interface's motion, orientation, and/or position and pass these measurements on to another device in a useable form.

Figure 8:
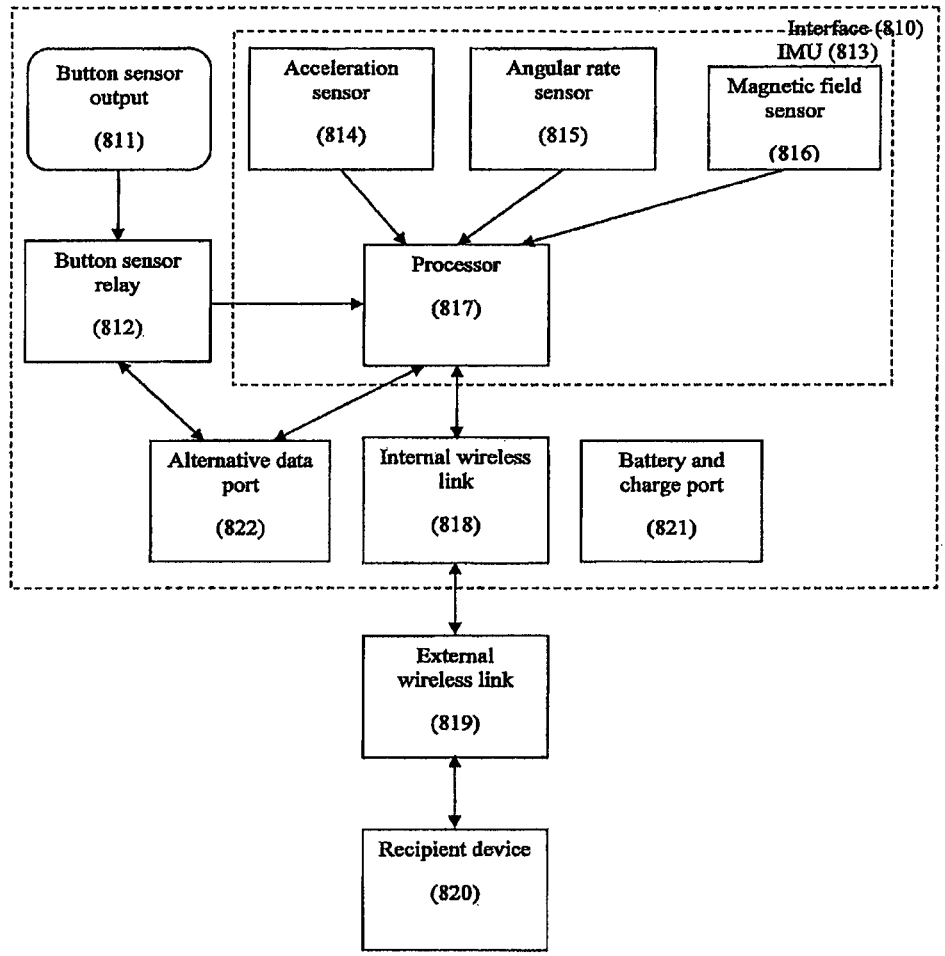
FIG. 8 illustrates in block diagram form an exemplary embodiment of an interface's electronics.
Figure 9:
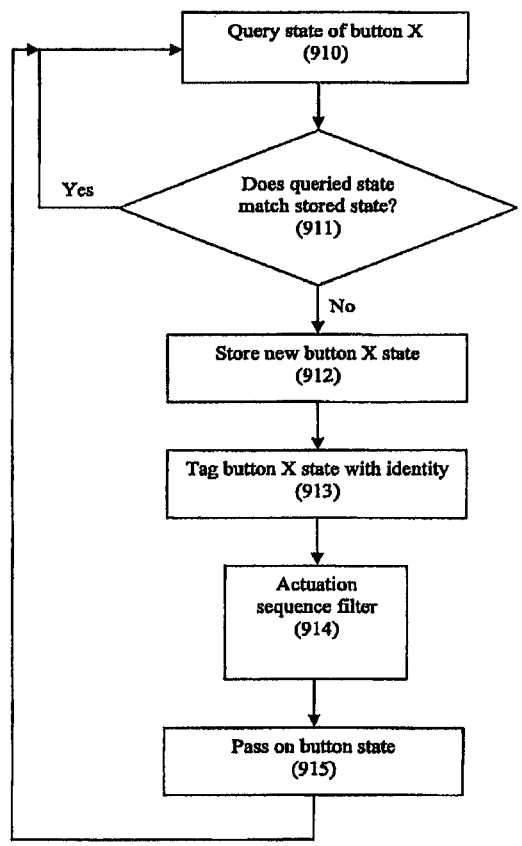
FIG. 9 illustrates in block diagram form an exemplary embodiment of a program that may be used by the digit button sensor relay component of the electronics.

FIG. 8 illustrates a functional block diagram of an exemplary embodiment of electronics that may be used in conjunction with the structure described herein. For example, as illustrated in FIG. 8, signals from the digit button sensors 811 may be passed on to a relay 812 that has multiple input channels. This relay may convert these multiple input signals into a single digital data stream which is passed on to a processor 817. As would be clear to those skilled in the art a variety of devices may perform the functions required of this relay, including a microcontroller. For digit button sensors in the form of microswitches, the button sensor relay may supply the required positive and ground connections as well as the required signal. The button sensor relay may also be able to pass on the collected digit button data via an output port (e.g., a TX pin). An example of the type of algorithm that may be employed by the button sensor relay to perform its task is illustrated in FIG. 9 and described below.

Also illustrated in FIG. 8 are the electronics of this exemplary embodiment that may be used to measure the interface's motion and orientation. These components include three types of sensors: (1) a sensor that measures the interface's dynamic and static gravity acceleration in one, two, or three dimensions 814 (e.g., an accelerometer), (2) a sensor that measures the angular rate of the interface's rotation around at least one of the pitch (lateral), yaw (vertical), and roll (longitudinal) axes 815 (e.g., a gyroscope), and (3) a sensor that measures magnetic fields around the interface in one, two, or three dimensions 816 (e.g., a magnetometer). The data from these three sensor types may then be passed on to the processor 817 that can convert the data into a form that is appropriate for transmitting to an internal wireless link 818. As would be understood by those skilled in the art, a variety of devices for performing the functions of these sensors (814, 815, and 816) and the processor 817 are available. For example, in an exemplary embodiment an integrated inertial measurement unit 813 comprising a microcontroller, one or more accelerometers, one or more gyroscopes, and one or more magnetometers may be suitable. The unit may be able to receive data from the button sensor relay 812 via a input serial port (RX pin). This unit may also able to process and pass its accelerometer/gyroscope/magnetometer data along with the digit button data on to the internal wireless link 818 via an output port (e.g., a TX pin). If it assists in optimizing (or at least improving) the performance of the motion and/or orientation sensors they can be housed within the rear enclosure with a specific orientation. For example, these sensors (or an entire inertial measurement unit as described above) may be oriented within the rear enclosure such that they are approximately horizontal to the ground when the interface is in its neutral operating position.

Although FIG. 8 shows sensors 814, 815, and 816, in exemplary embodiments, various combinations of these sensors may be present. For example, in exemplary embodiments, only sensor 814 or 815 or 816 may be present. In exemplary embodiments sensors 814 and 815 may be present or 814 and 816 may be present, or 815 and 816 may be present.

FIG. 8 illustrates the wireless link 818 internal to the interface 810. This internal wireless link may be configured to wirelessly transmit the combined digit button and motion/orientation/position sensor data to a wireless link 819 that is external to the interface. This external wireless link may then transfer the data it has received to a recipient device 820. As those skilled in the art would be well aware, any number of wireless systems would be suitable for acting as the internal and external wireless links. In exemplary embodiments, additional standard components may be utilized to pass data to and from these wireless links in an appropriate form. In exemplary embodiments, the wireless link components 818 and 819 may be made additionally capable of transferring data from the recipient device to the interface. This may allow, for example, program change commands to be sent to the button sensor relay 812 and/or processor 817. As would be understood by those skilled in the art, such an arrangement may require additional electronics to manage the bi-directional communication of the internal wireless link with the button sensor relay 812 and/or the processor 817.

Data from the interface may be used by any number of devices, and in exemplary embodiments the recipient device 820 shown in FIG. 8 may be a computer or mobile computing device. In such embodiments the recipient device may receive the interface's data via a cabled connection (e.g., USB, MIDI, Firewire, or Thunderbolt) from the external wireless link 819, and may be running music software. The data received from the interface may be used to control aspects of this software, the playing of software-based musical sounds being but one example. This software may be one of the many commercially-available music software programs on the market, or it may be a program provided specifically for use with the interface. The external wireless link may perform whatever conversion is required to make the interface's data useable by the computer. For example, in exemplary embodiments, the external wireless link may act as a MIDI or OSC device that converts the interface's data to MIDI or OSC data that may then be used by the recipient device's software using standard methods. Alternatively the external wireless link may provide the data in another format (e.g., using the cabled connection as a serial port) and an additional program may be installed on the recipient device for accessing this data and providing it to be used by other programs on the recipient device.

In exemplary embodiments, the user may also have the option of using a left-handed version of the interface (which may be essentially a mirror image of the right-handed version) or using right- and left-handed interface versions simultaneously. In this latter instance the data from the two interfaces may be passed on to the recipient device 820 (see FIG. 8) via a substantially similar external wireless link 819. Aside from the additional interface data coming from the left-handed version, an extra type of data may also be generated through a comparison of the actions of the two interfaces. In this scenario, algorithms for processing such comparative data may be included in a program running on the recipient device, or by an additional processing component included on the external wireless link. Examples of data comparisons include differences in orientation on the lateral, longitudinal, and/or vertical axes of each interface (i.e., pitch, roll, and yaw) or differences in rates of rotation on these axes; differences in choice and timing of button actuation; or differences in relative position (in exemplary embodiments that measure relative position). In exemplary embodiments the two interfaces may communicate with each other directly via wireless link, allowing them to directly compare their data. Direct communication may be especially useful for interfaces that produce their own sound or provide the user with haptic feedback, and in these exemplary embodiments such a data comparison may be used to control or modulate the output of these features.

Also illustrated in FIG. 8 is a battery 821 that may provide some or all the electricity required by the interface's electronics, the supply of which might be gated by a power switch 121 (see FIG. 1). Depending on the battery's voltage, standard methods of voltage conversion may be required for supplying an appropriate voltage to the interface's components. While a variety of battery types can be used, in exemplary embodiments the battery may be a rechargeable lithium polymer type, which can be charged by a standard charging device (using conventional methods of power supply) that is connected to the external power socket 314 (see FIG. 3). Alternatively a replaceable battery system may be used, with a standard apparatus for swapping the battery/batteries in and out of the rear enclosure.

Also illustrated in FIG. 8 is an external port 822 that may be incorporated in exemplary embodiments of the interface. This port, which may connect to an external data cable, may be used for data communication with, and updating the software of, the processor 817 and/or the button sensor relay 812. As would be understood by those skilled in the art number of devices can achieve this function, including components that convert USB signals to serial port signals. As shown in FIG. 2, in exemplary embodiments a USB connector 210 may act as the connector for port 822, however, other connector types may be used including MIDI, Firewire, Thunderbolt, or another suitable connector type. In exemplary embodiments, a cable connected to the port 822 can act as the communication link to the recipient device 820 and perform the task of the wireless components 818 and 819. This cable can also supply power to the interface from the recipient device, to power the interface's electronics and/or to charge its battery. Thus in exemplary embodiments, a cable-dependent interface requiring no onboard battery and/or wireless link system may be implemented.

An exemplary embodiment of an algorithm that may be performed by a button sensor relay 812 (see FIG. 8) is illustrated in FIG. 9. In exemplary embodiments, this algorithm may be utilized to collate the signals from the multiple digit button sensor inputs to the relay, and report digit button sensor state changes to the processor 817 via a single data-channel. In exemplary embodiments, the algorithm may be performed as a program which continuously cycles through some or all the iterations required to query the state of each button sensor, where X=1, 2, . . . Xtotal, and Xtotal is the total number of button sensors. After querying the state of button sensor X (910), this state is compared to the previous state of button sensor X (911) stored in memory from the previous cycle through X. If the state is the same the program iterates to X+1 and returns to step 910. If the queried X state does not match the stored X state, the queried state becomes the stored X state (912). Then a value or value set is created that represents the X state and identifies this state as being associated with button sensor X (913). This identification can be achieved in a variety of ways, including representing each button sensor with one of two possible unique values. For example, in exemplary embodiments, button 1 may be represented as unactuated with a value of 0 and actuated with a value of 15, while button 2 may be represented as un-actuated with a value of 1 and actuated with a value of 16, and so on. A filtering step 914 then takes place which will be described in detail in the next section. Depending on the actions of the filter, the new tagged state value of button X is then passed on (915) to the next component, which in this embodiment is the processor 817 (see FIG. 8). The program then iterates to X+1 and returns to step 910.

The forms and positioning of the distal finger button 410 and proximal finger button 416 (see FIG. 4A) belonging to the same digit array may allow their assigned finger to actuate them either individually or in combination with each other. This is also the case for the distal finger button and medial finger button 411 belonging to the same digit array. In exemplary embodiments, the actuation sequence filter 914 shown in FIG. 9 may allow the output events assigned to the medial and proximal finger buttons of a digit array to be used in combination with each other through specific sequences of button actuation. By doing so, every, or a substantial number of, possible combination of simultaneous "on" signals among a finger digit array's three buttons becomes possible. A detailed description of how this functionality can be used is provided herein. The actuation sequence filter can also be applied to signals originating from the thumb digit array, but in exemplary embodiments, this may be less necessary as thumb button combinations can be achieved manually by some or all users.

Figure 10:
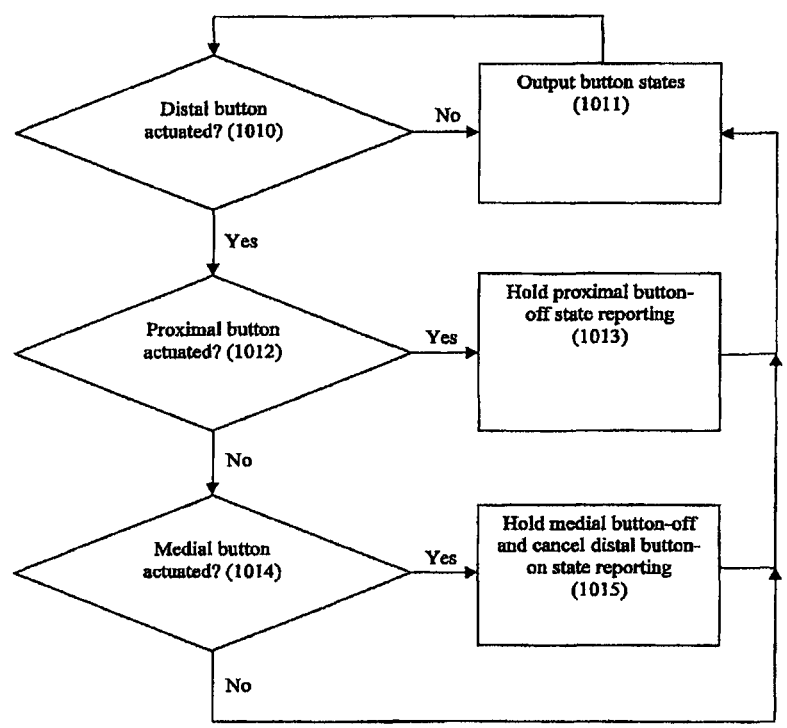
FIG. 10 illustrates in block diagram form an exemplary embodiment of the actuation sequence filter subroutine referred to in FIG. 9.

This actuation sequence filter subroutine may be achieved via a variety of methods, and an exemplary embodiment is illustrated in FIG. 10. The subroutine begins when a new button state is received and it checks whether the new state belongs to any of the distal finger buttons (1010). If not, the new data is passed out of the subroutine (1011), without filtering, to the next stage of the program (915) illustrated in FIG. 9. If the new state was triggered by a distal button the subroutine checks whether the stored state of the proximal button belonging to the same digit array is as actuated (1012). If yes, the filter will "hold" the report of the proximal button changing to an unactuated state, but will pass on the most recent such "held" report when the distal button of that digit array is unactuated (1013). Meanwhile, the actuated state of the distal button is passed out of the subroutine (1011). If the proximal button is not actuated, the subroutine checks whether the stored state of the medial button belonging to the same digit array is as actuated (1014). If yes, the filter will hold the report of the medial button changing to an unactuated state, but will pass on the most recent such "held" report when the distal button of that digit array is unactuated (1015). In addition, this report of the distal button being actuated will not be passed on and no reports of its actuation will be passed on until the distal and medial buttons are unactuated (1015). After the distal and medial buttons are unactuated, subsequent reports of distal button actuation will be allowed through the filter. If the answer at step 1014 is no, the distal button actuation report is passed out of the subroutine (1011), without filtering, to the next stage of the program (915) illustrated in FIG. 9. The use of this subroutine can be made optional, with its activation being controlled using physical controls on the interface or via commands sent from the recipient device 820 via the wireless link system (see FIG. 8).

In exemplary embodiments the accelerometer, gyroscope, magnetometer data, or combinations thereof may be used to estimate the interface's orientation in at least one of the pitch, roll, and yaw axes. This task may be performed by software running on a processor 817 (see FIG. 8). As is well understood by those skilled in the art, there are a variety of techniques that can be used to combine the output of these different sensor types to produce orientation estimates (pitch, roll, and yaw). For example, in exemplary embodiments a technique that utilizes a "direction cosine matrix" may be used, with a program structure like that described in FIG. 11.

Figure 11:
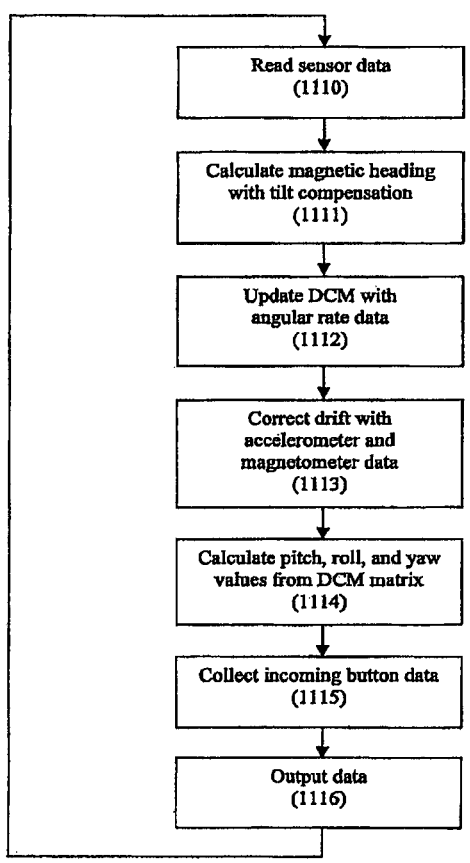
FIG. 11 illustrates in block diagram form an exemplary embodiment of a program that may be used by the processor component of the electronics.

As illustrated in FIG. 11 the initial step in this program is to read the accelerometer, gyroscope, and magnetometer data from the relevant sensors (1110). The current estimates for pitch and roll (provided by the previous iteration or initialized at program start) are then used to compensate for the effect on magnetometer readings of the magnetometer not being orthogonal to the ground, and then a heading is calculated relative to the Earth's magnetic field (1111). Angular rate (i.e., gyroscope sensor) values are then used to update the direction cosine matrix (DCM) values (1112). Corrections are then made to ensure that the estimated reference axes (x, y, and z) for the interface remain orthogonal to each other, then the accelerometer and magnetometer data are used to correct errors that have developed over time in the angular rate-based direction cosine matrix values (1113). The direction cosine matrix values are then translated into estimates of pitch, roll, and yaw (1114). The button states, provided by the button relay 812 (see FIG. 8), are then collected (1115). Then the button and motion/orientation/position data is outputted (1116) to the internal wireless link 818 (see FIG. 8). A variety of motion/orientation/position data combinations may be outputted to the internal wireless link. For example, in exemplary embodiments the combination may include; button state values, pitch, roll, and yaw orientation values, as well as angular rate of rotation (gyroscope) and acceleration (accelerometer) values in the three measurement axes.

In exemplary embodiments, there may be fifteen touch-activated buttons located on the interface and three buttons may be assigned to each digit (the fingers and thumb). Each of these groups of three buttons, referred to as a "digit array", may be ergonomically positioned along the main plane of flexion of a single digit. As described above, each button (distal, medial, proximal, etc.) may be referred to as a "digit button". As part of the normal operation of the interface, each digit may only be required to interact with one digit array of digit buttons. In exemplary embodiments, the term "digit button" may refer to any substantially switch-like mechanism that can be actuated through interaction with one or more of a user's digits, to produce either a binary (on/off) or graduated (i.e., variable beyond two values) output. Exemplary embodiments may employ button mechanisms including but not limited to microswitches (or other electromechanical switches), capacitance and resistance touch switches, photo sensor-based switches, dome and other membrane switches, or Hall effect sensor switches, etc., or combinations thereof.

Figure 14A:
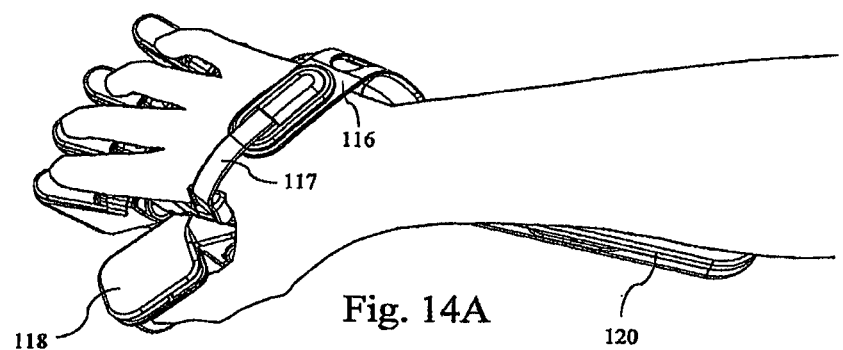
FIG. 14A illustrates an exemplary embodiment of an interface from an upper perspective illustrating a strap and clasp hand fastening mechanism.

As is evident in exemplary embodiments illustrated in FIG. 1, FIG. 2, and FIG. 14A the user's right hand may be placed between the palm enclosure 115 and the hand clasp 116 and the hand strap 117 may be attached to the upper surface of the hand clasp at a position that causes the interface to remain firmly but comfortably attached to the hand despite the arm and hand being moved around in space. The palm may be positioned such that the user's little, ring, middle, and index fingers can comfortably access the buttons on the finger digit arrays 110, 111, 112, and 113, respectively. The user's thumb may be positioned so it can comfortably access the buttons on the thumb digit array 118. To provide a close fit to the user's hand the hand clasp spacer 119 may be swapped for one of a different size or removed entirely.

Figure 4B:
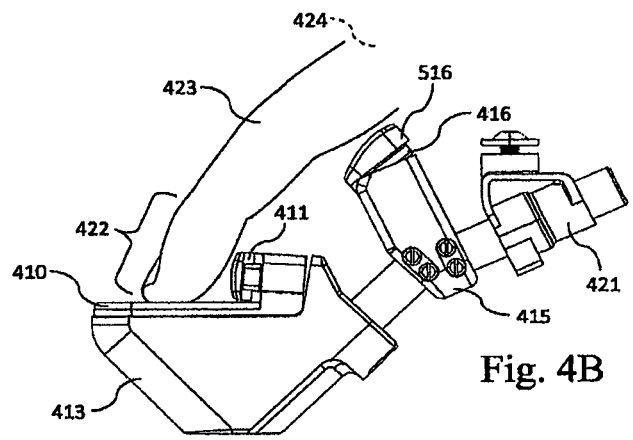
FIG. 4B, FIG. 4C, and FIG. 4D illustrate an exemplary embodiment of a single finger digit array from a left perspective in isolation and methods of actuating finger digit buttons using a finger.
Figure 4C:
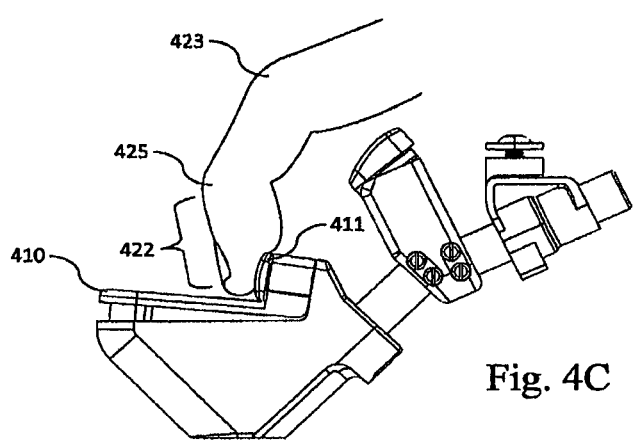
Figure 4D:
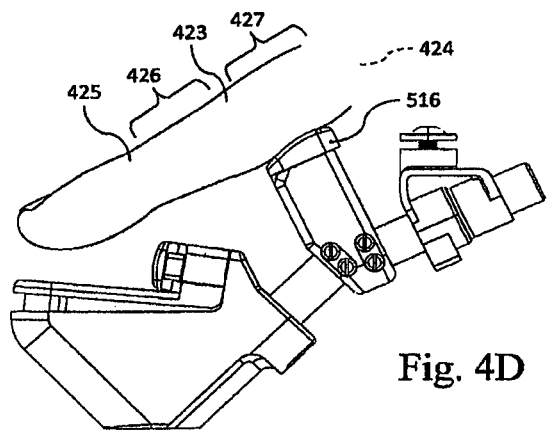

As can be seen in FIG. 4B and FIG. 4C, in exemplary embodiments the distal finger button 410 and medial finger button 411 may be positioned to be actuated independently or concurrently through contact with the finger's tip segment 422 (distal phalanx). As illustrated in FIG. 4B, actuation of the distal finger button may be achieved mainly through flexion at the finger's middle knuckle 423 (proximal interphalangeal joint) and/or base knuckle 424 (metacarpophalangeal joint). As shown in FIG. 4C, actuation of the medial finger button 411 may be achieved by curling the finger, mainly via flexion at the top knuckle 425 (distal interphalangeal joint) and middle knuckle 423. As illustrated in FIG. 4D, the proximal finger button (obscured in this image by a "proximal finger button cover" 516—see FIG. 5) may be positioned to be actuated by the middle segment 426 (intermediate phalanx) and/or base segment 427 (proximal phalanx) of the finger. Actuation of the proximal finger button may be achieved mainly via flexion at the base knuckle 424 and may include extension at the middle knuckle 423 and/or the top knuckle 425. In exemplary embodiments, the operation of each finger digit array for some or all four fingers may be more or less identical or at least substantially identical. In other exemplary embodiments, the operation of one or more finger digit arrays for 2, 3, or 4 fingers may be more or less identical or at least substantially identical.

As illustrated in FIG. 7B and FIG. 7C, in exemplary embodiments the distal thumb button 310 and medial thumb button 311 may be positioned to be actuated independently or concurrently by contact with the thumb, or more specifically, mainly by contact with the thumb's tip segment 717 (distal phalanx). As illustrated in FIG. 7B, independent actuation of the distal thumb button may be achieved mainly through flexion at the top knuckle 718 (distal interphalangeal joint). As shown in FIG. 7C, the medial thumb button 311 may be independently actuated mainly through movement (adduction) of the thumb towards the hand, which may occur mainly through flexion at the base knuckle 719 (metacarpophalangeal joint) and/or the joint connecting the thumb to the hand 720 (carpometacarpal joint). As illustrated in FIG. 7D proximal thumb button 312 may be positioned to be actuated mainly through contact with the lower surface of the base segment 721 (proximal phalanx) and/or palmar segment 722 (metacarpal) of the thumb. As shown in FIG. 7D, independent actuation of the proximal thumb button 312 may be achieved mainly through flexion at the thumb's base knuckle 719 and/or the joint connecting the thumb to the hand 720, and may also involve extension at the thumb's top knuckle 718. An advantage of this exemplary arrangement of buttons on the thumb digit array may be that any combination of simultaneous actuation of these buttons is possible through operation with the user's thumb alone.

In exemplary embodiments, in order for the user to be able to comfortably and effectively operate the digit buttons on the interface a variety of mechanisms may be present for adjusting the locations and orientations of these buttons. To accommodate a range of hand widths, the location of each finger digit array on the digit array track may be adjustable. As is illustrated in FIG. 6 this may be achieved by unscrewing the connector bolt 420 until pressure of the washer 419 and the connector clamp 418 against the channel fin parts 610 is reduced enough for the position of the digit array track connector 421 (and the rest of the digit array) along the length of the available track 114 to be altered. Loosening the connector bolt in this way may also allow the rotation of the digit array track connector, relative to the digit array track, to be adjusted. When the desired location and rotation of the track connector is achieved the track connector can be immobilized again by re-screwing the connector bolt.

As shown in FIG. 5, in exemplary embodiments further adjustment of the locations and orientations of a finger's digit buttons may be made possible, whereby the user can unscrew the proximal shaft bolt 511 and/or the distal shaft bolt 515. By unscrewing the proximal shaft bolt 511, pressure on the rubber pad lying against the proximal shaft 417 is relieved, and the proximal shaft is able to slide forwards and rearwards within the tubular section of the digit array track connector 421. In so far as may be possible without colliding with the neighboring finger digit arrays, rotation of the proximal shaft within the digit array track connector can also take place. By unscrewing the distal shaft bolt 515 the distal enclosure 413 is able to slide up and down the distal shaft 414. Rotation of the distal enclosure can also take place, but the presence of wiring at the distal shaft wiring portal 520 restricts the range of that rotation. Screwing the bolts 511 and 515 back into position will immobilize the digit array sections in their new adjustment positions. An additional form of adjustment available to the user is varying the distance of the contact surface of the finger and thumb digit array proximal buttons from their actuating digits through the use of button covers, as is illustrated by the proximal finger button cover 516 in FIG. 5.

As described elsewhere in this specification, the forms and positioning of the distal and medial buttons belonging to the same digit array may allow these buttons to be actuated either individually or in combination with each other by a single digit. In a musical application of the interface where the buttons are used to trigger musical tones, such combinations would allow specific harmonies to occur, thereby extending the range of harmonies that can be produced beyond that of combinations of buttons belonging to separate digit arrays. In the case of the finger digit arrays (see FIG. 4A), the reason for this is that the contact surface of the medial finger button 411 is curved and relatively thin (measured between its top and bottom edges) and mounted on top of the distal finger button 410. As a result the user can, while maintaining actuation of the medial finger button, push down (on the distal and/or medial finger button) and actuate the distal finger button. Vice versa, the user can, while maintaining actuation of the distal finger button, pull their finger back and actuate the medial finger button.

The distal and proximal finger buttons belonging to the same digit array can also be actuated either individually or in combination with each other by a single digit. The distal button's length means that the user can actuate it with either a partially curled or outstretched finger. In the latter case the lower pad of the finger's distal segment (distal phalanx) may make contact at the front end of the button. This posture makes it easier for the user to maintain actuation of the distal button while actuating the proximal button and vice versa.

In exemplary embodiments, to allow the outputs of the medial and proximal finger buttons to be used together, the user may have the option of having each digit array's sequence of button activation algorithmically interpreted in real-time, or substantially in real-time, to selectively allow the combination of the medial and proximal button output events to occur. This may be achieved using an actuation sequence filter subroutine 914 (see FIG. 9 and FIG. 10). In exemplary embodiments of the filter, maintaining actuation of the proximal button while actuating the distal button allows the output signal of the proximal button to be sustained despite the proximal button being released (steps 1010, 1012, and 1013 in FIG. 10). While the distal button remains actuated the output signals of the distal and proximal buttons will be sustained concurrently. While keeping the distal button actuated, the user can then actuate the medial button, thereby causing the output signals of the distal, medial and proximal buttons to be sustained concurrently. Another feature of exemplary embodiments of the filter, is that if the distal button is actuated after the medial button is actuated (while the medial button's actuation is maintained) then the distal button's output signal will not trigger a response (steps 1010, 1014, and 1015). If the medial button is then released while actuation of the distal button is maintained, then the output signal of the medial button will continue uninterrupted. The user can then actuate the proximal button, while keeping the distal button actuated, thereby allowing the output signals of the medial and proximal buttons to be sustained concurrently.

In exemplary embodiments the proximal, medial, and distal buttons of the finger digit arrays and thumb digit array may have the principal function of providing discrete on and off signals that can be translated by the recipient device 820 (see FIG. 8) into sounds, such as musical tones or sounds. For example, each of the fifteen digit buttons may be assigned to one of the twelve tones of the chromatic scale, with the remaining three buttons assigned to notes above or below the chosen scale. Alternatively, two octaves of a diatonic scale may be assigned to the fifteen digit buttons. Examples of such arrangements are shown in FIG. 12. The upper table illustrates an example of a chromatic arrangement: Starting at a C note on the distal thumb button, the notes ascend first through the distal buttons, then through the proximal buttons, then through the medial buttons, finally reaching a D note (in the octave above) on the medial button of the little finger digit array. The lower table shows an example of a diatonic arrangement (a C major scale): Starting again at a C note on the distal thumb button, the notes ascend first through the distal buttons, then through the proximal buttons, then through the medial buttons, finally reaching a C note (two octaves up) on the medial button of the little finger digit array. Any number of note assignments to the digit buttons is possible (including note assignments derived scales other than the "western" chromatic scale) and are not limited to those described herein. Exemplary embodiments may provide the user with a configuration whereby single digit buttons may trigger more than one note, and the notes that are triggered by a digit button may have harmonic interval relationships. For example, actuating the distal thumb button may trigger the notes C, E, and G.

Exemplary embodiments similar to those illustrated in FIG. 1 may include 12, 13, or 14 digit buttons. Exemplary embodiments with 13 or 12 buttons may be sufficient to allow the user to play a chromatic scale from the tonic note to the tonic note an octave higher (13 buttons) or from the tonic note to the note one below the octave-higher tonic note (12 buttons). Exemplary embodiments with 14 buttons may also be used to play chromatic scales, but may also allow the user to play 2 octaves of a diatonic scale (without employing an octave selection feature) from the tonic note to the note one below a tonic note that is 2 octaves higher.

In exemplary embodiments the interface may provide the user with a variety of options with regard to how the interface's angular rate of rotation, orientation (pitch, roll, and yaw), other acceleration data, and/or position data are utilized by the recipient device 820 (see FIG. 8). In exemplary embodiments this may include using these data to modulate the recipient device's processing of input from the interface's buttons. One option, for example, is where the recipient device responds to digit button input by producing tones or sounds resembling those of a sustained-tone instrument (e.g., cello, violin, saxophone, flute, organ, lead synthesizer sound, etc), and the angular rate of interface rotation around the vertical (yaw) and/or lateral (pitch) axes is used to emulate the effect of bowing or blowing intensity on these tones. In this example the user may be generating changes in the rate of angular rotation in the yaw plane by swinging the interface from side to side (from the neutral operating position), mainly by rotation at the shoulder joint and bending at the elbow. In exemplary embodiments where the output of one or more rotational sensors is in use, a compound movement of the interface (e.g., involving rotational and translational motion) may provide usable control output as long as that compound movement includes rotation around the axis or axes of measurement. Indeed, in exemplary embodiments, when rotation of an exemplary interface around an axis is referred to it is assumed that the user's motion includes, but is not necessarily restricted to, rotational motion around the axis in question. Should the user wish to use a right- and left-handed version of an exemplary interface simultaneously, they may also be provided with a variety of options for utilizing the comparative data of the two interfaces. For example, actuation of a digit button on one interface may select the starting pitch of a tone and actuation of a digit button on the other may select the end pitch of the tone, and reducing the orientation difference between the two interface's (for example, in the lateral axis) may slide the pitch of the tone from the start pitch to the end pitch. Exemplary embodiments may utilize interface-based portamento control and/or vibrato control to modulate the pitch of musical tones, in a manner similar to that described elsewhere in this specification. As would be understood by a person skilled in the art, a large variety of additional alternative effects on musical sounds may be configured to be controlled via an interface, and this should not be considered a complete list.

Exemplary embodiments may allow the user to exert "contextual control" via an interface whereby one form of control is used to modulate another form of control. For example, in a configuration where the actuation of at least one digit button elicits the sound of a musical tone, the orientation of the interface around the lateral axis (pitch axis) at the moment of said actuation may be recorded by the system, and changes in the lateral axis orientation relative to said recorded orientation may be used to control a modulatory sound effect on the musical tone. In this example, increasing the lateral axis orientation after digit button actuation (i.e. raising the front of the interface upwards) may be used to increase the rate and/or amplitude of a vibrato effect on the elicited musical tone. However, in a contextual control configuration similar to the example described above a variety of alternative interface outputs (including motion, orientation, position, digit button actuation, and so on) may be used to control a variety of other effects.

In another example of contextual control, exemplary embodiments may also provide the user with an "octave selection" option based on interface orientation. This option may control the octave value of the tones triggered by the digit buttons. In this option the user may choose one of the orientation axes, for example the lateral axis (pitch axis), to be divided into multiple zones. If a total of three angle zones around the lateral axis were chosen (e.g., down, middle, and up) then the lateral axis angle of the interface relative to these zones would determine the octave values of the notes triggered by the digit buttons. An example of the borders between these three zones might be (assuming 0 degrees as horizontal) −40 degrees and 40 degrees, whereby the down zone is −40 degrees and below, the middle zone is greater than −40 degrees and less than 40 degrees, and the up zone is 40 degrees and above. For each note triggered, three tones in three adjacent octaves may be produced simultaneously, but their respective volumes may be determined by the interface's lateral axis angle relative to the down, middle, and up zones at the time of triggering. For example, actuating a digit button corresponding to the note C while the interface is in the down zone might be set up to trigger the notes C3, C4, and C5, but only C3 would have an audible volume. The user may be given the option of attributing crossfaded volumes to the borders of these zones, such that actuating the C digit button near the border of the down and middle zones would again trigger the C tone in all three octaves but both the C3 and C4 tones would have an audible volume. The user may also be given the option of using this octave selection in a dynamic or constant mode. In the dynamic mode maintaining activation of the C digit button while moving the interface from the down zone to the middle zone would dynamically crossfade the volumes of the C3 and C4 tones, such that the former would fade and the latter would increase. In the constant mode, tones may retain the zone-based volume level assigned at the time they were triggered, thus actuation of the C digit button in the down zone followed by moving the interface to the middle zone would result in the volume of the C3 tone being maintained at the same level throughout the movement (while possibly being subject to volume-modulation by other aspects of the system). In this example of the constant mode, effectively only one of the notes (in this case C3) in the octave group (in this case C3, C4, and C5) is triggered at a time, and the selection of which note is triggered is dependent on the zone the interface is in at the time of triggering. The processing required to perform the octave selection described above may be performed by a variety of components including the processor 817 (see FIG. 8), a processing component added to the external wireless link 819, or an additional program installed on the recipient device 820.

In the above octave selection example an axis of orientation may be used to select from a range of options (a range of octaves in this instance). Similarly, exemplary embodiments may use directions of translational and/or rotational motion to select from different options. For example, zones of interface rotation direction may be configured such that rotating the interface in a specific direction may select a specific option from a range of options. In this example, rotating the interface in a specific direction (e.g. rotating an interface rightwards around the vertical axis) may be used to select a specific frequency of oscillation for a sound effect on a musical tone (e.g. a modulating volume gate or frequency filter, etc.). The phase of these oscillations may also be synched to external events, the tempo of a piece of music being but one example. For example, an oscillation that lasts for one musical bar may be synched to "start" (e.g. cross zero into the positive phase of the oscillation) on the first beat of the bar. As would be understood by those skilled in the art, these forms of "directional control" may be used to control a variety of options and parameters.

In exemplary embodiments, the recipient device may be a device on which the user may play a video game (e.g., the Microsoft Xbox, Sony Playstation, Nintendo Wii, or a personal computer/mobile computing device, etc.) where the user may participate in the game through their operation of the interface. In exemplary embodiments equipment that is designed to generate musical sounds in response to external commands (e.g., MIDI messages) may act as the recipient device, with hardware synthesizers being but one example. In exemplary embodiments the recipient device may be a lighting system, whereby a user's operation of the interface may control the actions of the lighting system. For example, the recipient device may be a lighting system at a live performance venue. In exemplary embodiments the recipient device may be a system that may be remotely controlled by a user's operation of the interface, for example a vehicle or robot.

In exemplary embodiments a recipient device 820 may act as a data-entry device (e.g., a personal computer or mobile computing device, etc.), where the range of different discrete output signals the interface can produce may be mapped to a specific data set (e.g., letters, numbers, etc.). In exemplary embodiments the range of different output signals the interface can produce may be expanded beyond what can be achieved by actuating individual digit buttons by making the events triggered by digit button actuation dependent on the interface's orientation and/or motion (in a similar way to the octave selection option described above). In exemplary embodiments, additional specific events may be triggered through specific combinations of digit button actuation. For example, in the case of an interface with 15 digit buttons, these buttons may be assigned event 1, event 2, event 3, and so on through to event 15. However, pairs of buttons actuated substantially at the same time may be configured to trigger more events beyond the initial 15. For example, actuating the distal thumb and distal index finger buttons at substantially the same time may trigger event 16, and the distal index and distal middle finger buttons together may trigger event 17, and so on. Combinations of more than two buttons may also be employed. In this example the events may be musical tones with specific pitches, or characters from an alphabet, etc. Such a "combinatorial configuration" may be utilized for a variety of exemplary embodiments including interfaces with different amounts of buttons and different button configurations.

Figure 17:
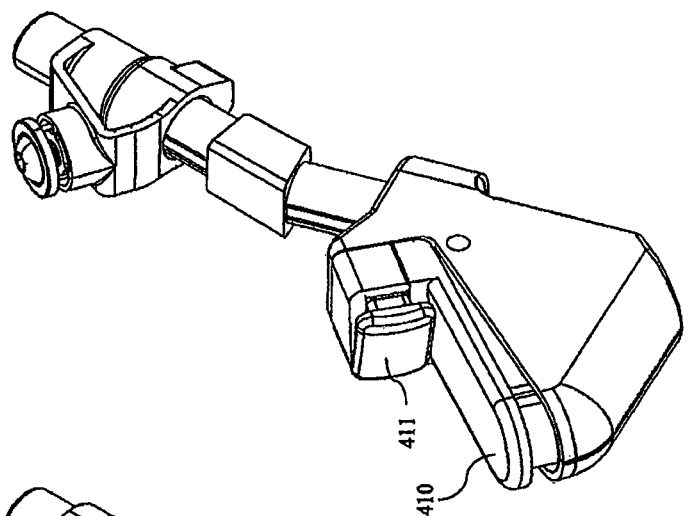
FIG. 17 illustrates an exemplary embodiment of a single finger digit array from a front left perspective in isolation without a proximal button.
Figure 16:
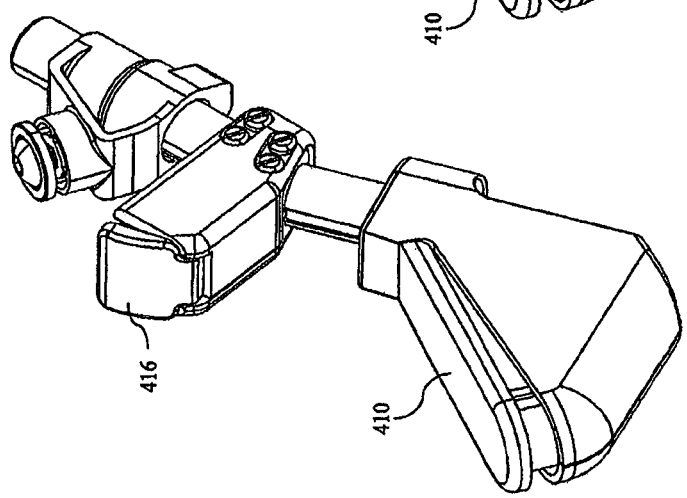
FIG. 16 illustrates an exemplary embodiment of a single finger digit array from a front left perspective in isolation without a medial button.
Figure 15:
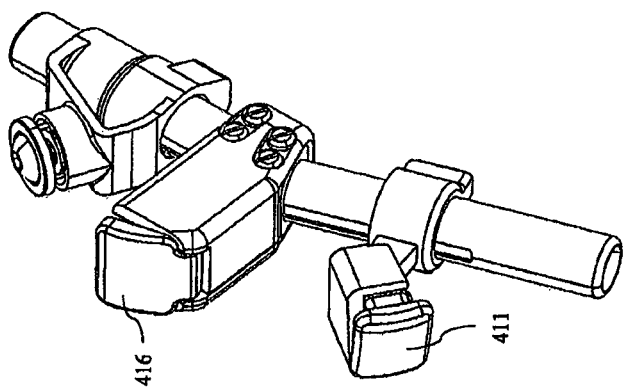
FIG. 15 illustrates an exemplary embodiment of a single finger digit array from a front left perspective in isolation without a distal button.
Figure 18:
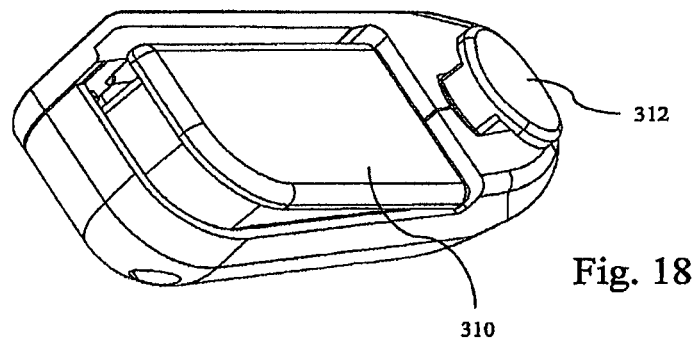
FIG. 18 illustrates an exemplary embodiment of a thumb digit array from a left perspective in isolation without a medial button.
Figure 19:
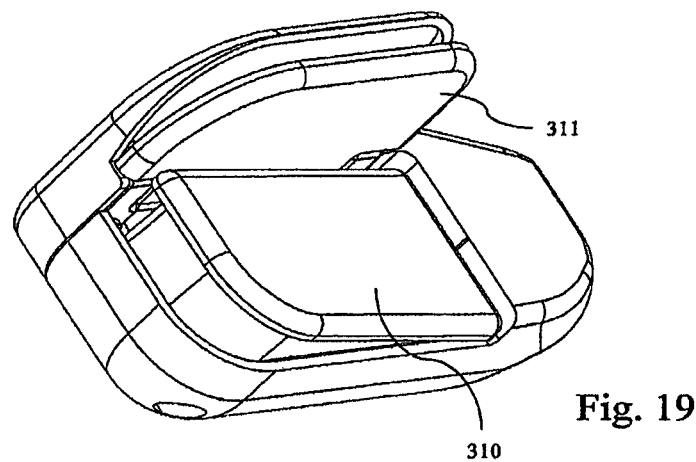
FIG. 19 illustrates an exemplary embodiment of a thumb digit array from a left perspective in isolation without a proximal button.
Figure 20:
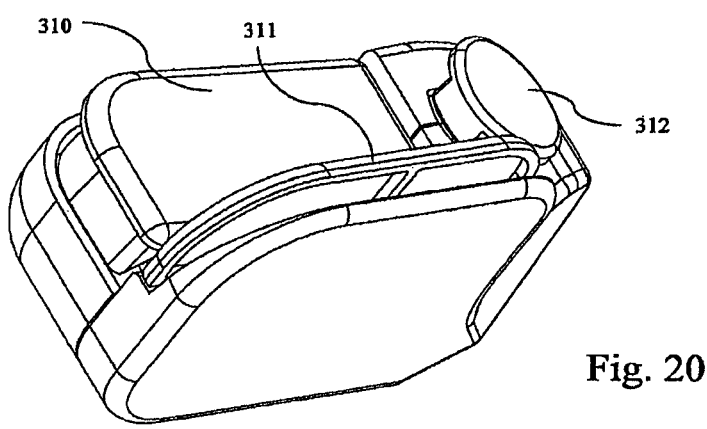
FIG. 20 illustrates an exemplary embodiment of a thumb digit array from a left perspective with a medial button positioned on the outside of the thumb rather than on the inside of the thumb.

In exemplary embodiments one or more interface buttons may be assigned a modal role, whereby said modal button primarily modulates the events triggered by other buttons. For example, in an embodiment wherein an interface has one button for each of the digits (see FIG. 26A for example), the thumb button may be assigned a modal role whereby the finger buttons, while the thumb button remains unactuated, may be able to trigger events 1 to 4. While the thumb button is actuated, the finger buttons may be able to trigger events 5 to 8. Such an embodiment may allow all the pitches of a C major scale to be played on an interface with only five buttons. Similarly, in an embodiment where an interface had two buttons per finger and at least one button for the thumb (see FIGS. 26B, 27B, 27D, 15, 16, and 17 for example), a musical mode (e.g. C major) may be assigned to the finger buttons, whereby actuating said thumb button may cause any finger-triggered note to be one semitone lower (or higher) than would be the case if the thumb button were unactuated. Such an embodiment would allow any musical mode played on an interface with only nine buttons. Such a "modal configuration" may be utilized for a variety of exemplary embodiments including interfaces with different amounts of buttons and different button configurations. Exemplary embodiments of the interface may include a different number of digit buttons and/or a different arrangement of those buttons. For example, some embodiments may include only medial buttons (finger digit array: 411; thumb digit array: 311) and proximal buttons (finger digit array: 416; thumb digit array: 312), with no distal buttons (finger digit array: 410; thumb digit array: 310). An example of this arrangement for a finger digit array is illustrated in FIG. 15. Some embodiments may include only distal buttons and proximal buttons, with no medial buttons (see e.g., FIG. 16 and FIG. 18). Some embodiments may include only distal buttons and medial buttons, with no proximal buttons (see e.g., FIG. 17 and FIG. 19). Exemplary embodiments may include a thumb digit array with a medial button on the outside of thumb rather than on the inside of the thumb (see e.g., FIG. 20).

Exemplary embodiments that use digit button arrangements similar to those illustrated in FIG. 15, FIG. 16, FIG. 17, FIG. 18, or FIG. 19 may include 8 or 7 digit buttons, and this number of buttons may be sufficient to allow a user to play a diatonic scale (e.g., C4, D4, E4, F4, G4, A4, B4, C5) from the tonic note to the tonic note one octave above (8 digit buttons) or from the tonic note to one note below the octave-higher tonic note (7 digit buttons).

In exemplary embodiments, more than three digit buttons per digit may be provided on the interface. Such additional digit buttons may be positioned to be actuated through sideways movement of the digit, or extension of the digit. Some embodiments may not include a thumb digit array 118 (see e.g., FIG. 21). In exemplary embodiments that do not include a thumb digit array, the thumb may be given the task of keeping the interface in contact with the hand, via an appropriate structure against which the thumb may grip or press. Exemplary embodiments may not include digit arrays for other digits. For example, as illustrated in FIG. 22, some embodiments may not include a digit array for the little finger. Other exemplary embodiments may not include one or more digit arrays for other digits.

Figure 21:
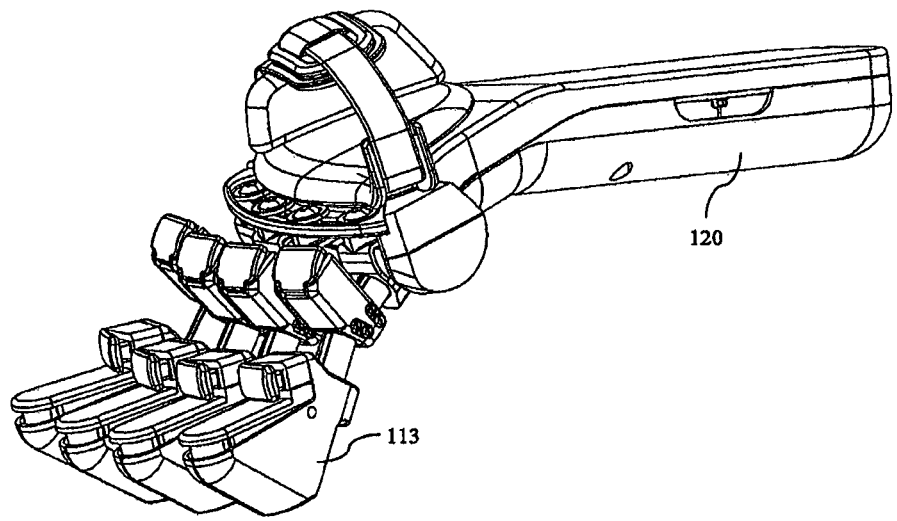
FIG. 21 illustrates an exemplary embodiment of an interface from a front left perspective without a thumb digit array.
Figure 22:
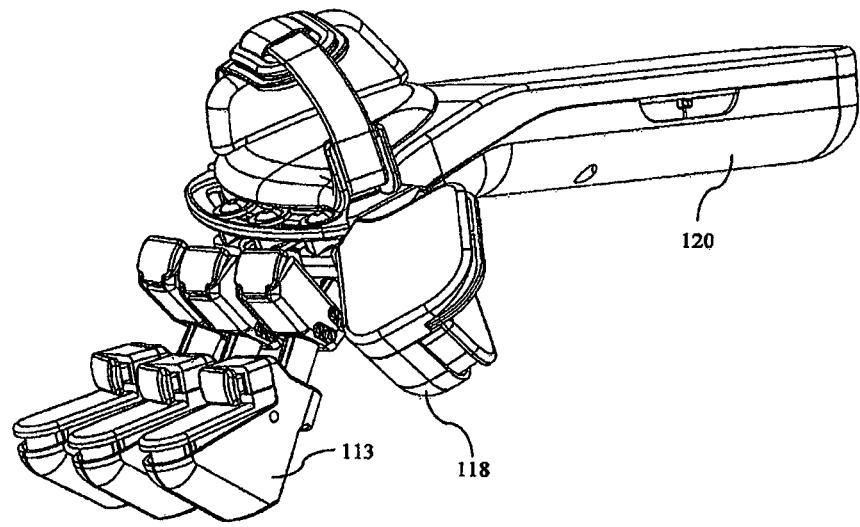
FIG. 22 illustrates an exemplary embodiment of an interface from a front left perspective without a little finger digit array.

Exemplary embodiments similar to those illustrated in FIG. 21 and FIG. 22 may include 12, or 13 digit buttons. Exemplary embodiments with 13 or 12 buttons may be sufficient to allow the user to play a chromatic scale from the tonic note to the tonic note an octave higher (13 buttons) or from the tonic note to the note one below the octave-higher tonic note (12 buttons).

Figures 26A, 26B:
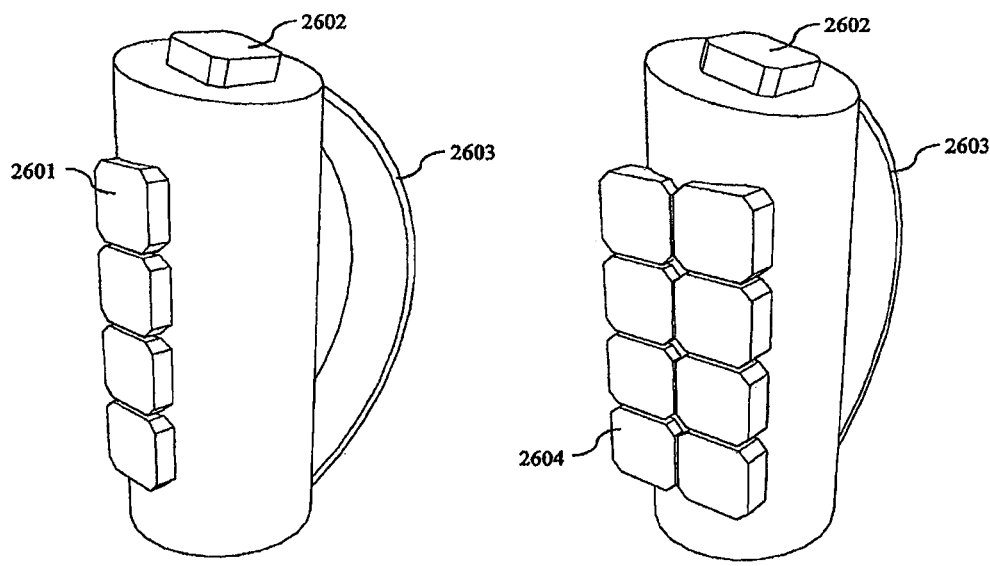
FIG. 26A and FIG. 26B illustrate an exemplary embodiment of an interface with five or nine buttons only, but which may contain the same electronics as interfaces described elsewhere in this specification, from a front left perspective.

Exemplary embodiments that include fewer digit buttons may utilize a different overall form. For example, as illustrated in FIGS. 26A and 26B exemplary embodiments may utilize a form that the user's hand and fingers can more readily wrap around. Such embodiments may include no buttons or some buttons for the digits of the user's hand, including the thumb. For example, as illustrated in FIG. 26A exemplary embodiments may include four digit buttons 2601 to be operated by the user's fingers, and one digit button 2602 to be operated by the user's thumb. As illustrated in FIG. 26B, exemplary embodiments may include eight digit buttons 2604 to be operated by the user's fingers, and one digit button 2602 to be operated by the user's thumb. Exemplary embodiments similar to that illustrated in FIG. 26A may include digit buttons to be operated by the fingers, and no digit button to be operated by the thumb, thereby having 4 digit buttons in total. Exemplary embodiments similar to that illustrated in FIG. 26A may include digit buttons to be operated by the index, middle and ring fingers, and no digit button to be operated by the thumb, thereby having 3 digit buttons in total. Exemplary embodiments similar to that illustrated in FIG. 26A may include 5 digit buttons in total, and this number of buttons may be sufficient to allow a user to select commonly used harmonic pitch intervals. Exemplary embodiments similar to that illustrated in FIG. 26B may include digit buttons to be operated by the fingers, and no digit button to be operated by the thumb, thereby having 8 digit buttons in total. Exemplary embodiments similar to that illustrated in FIG. 26B may include 8 or 7 digit buttons, and this number of buttons may be sufficient to allow a user to play a diatonic scale from the tonic note to the tonic note one octave above (e.g., C major: C4, D4, E4, F4, G4, A4, B4, and C5 assigned to 8 digit buttons) or from the tonic note to one note below the octave-higher tonic note (e.g., C major: C4, D4, E4, F4, G4, A4, and B4 assigned to 7 digit buttons).

Exemplary embodiments may use similar hand-attachment mechanisms to those mentioned in descriptions of other embodiments. For example, as illustrated in FIGS. 26A and 26B a hand strap 2603 may be employed, whereby the user's palm may rest against the interface and the strap may run across the back of the hand. These hand-attachment mechanisms may be configured to provide an adjustable their fit to the user's hand. Additionally, the hand-attachment mechanism at either end of the interface may be able to swing around the long axis of the interface. In other words, if a hand strap where utilized, the strap may be rotated from its attachment points at either end of the interface, thus allowing the strap to rotate closer to, or away from, the digit buttons 2601 or 2604. This would allow the angle of the faces of the buttons relative to the user's fingers to be changed. A benefit of this adjustment mechanism may be that users with different sized hands would be able to choose the most comfortable and effective locations on their fingers with which to make contact with the buttons.

Exemplary embodiments may include some, none, or all of the motion, orientation, and/or position sensors mentioned in descriptions of other embodiments. For example, embodiments may include an acceleration sensor 814 with one or more axes and/or an angular rate sensor 815 with one or more axes. In another example, some embodiments may lack axes in the roll plane for the acceleration 814 and angular rate sensors 815, or may lack a magnetic field sensor 816 entirely. Exemplary embodiments may employ other forms of motion tracking. For example, active or passive infrared markers may be attached to the interface and tracked by an external stationary infrared camera. In another exemplary embodiment, the interface may be tracked with a time-of-flight camera. In another exemplary embodiment, the interface may include components that emit an ultrasonic signal and the spatial location of the signal may be tracked by an external stationary ultrasonic receiver array. In another exemplary embodiment, the interface may include components that emit a magnetic field and the spatial location of the emitter may be tracked by an external stationary magnetic field detector, or the detector may be attached to the interface and the emitter may be external and stationary. Exemplary embodiments may have other additional sensors included in the interface, like a GPS receiver, or a receiver for higher-resolution positioning signals.

Digit buttons with more detailed measurement capabilities may be used in exemplary embodiments. For example, the digit buttons of the finger and thumb digit arrays may be equipped with sensors that feature velocity and/or after touch sensitivities, similar to the keys found on many MIDI piano keyboards. Some embodiments may include buttons that have multiple axes of actuation, thereby producing additional independent streams of data output from the interface. For example, buttons may be included that can be actuated up, down, forwards, backwards, left, and right, or only some of these directions. Standard electromechanical sensor designs understood by those skilled in the art may be used for these purposes, and changes to the data processing and communications apparatus of the interface may be made to accommodate this additional data.

Figure 27A:
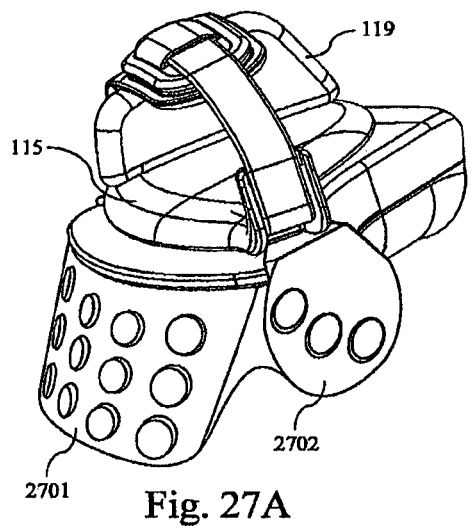
FIG. 27A, FIG. 27B, FIG. 27C, FIG. 27D, and FIG. 27E illustrate exemplary embodiments of an interface from a front left perspective.

Exemplary embodiments may include digit buttons that are designed to be actuated largely exclusively by the end segments (distal phalanges) of the digits. Such embodiments may have the advantage of needing less or no adjustability mechanisms to maintain usability among users with different hand sizes. For example, as illustrated in FIG. 27A some embodiments may include three rows of digit buttons 2701 comprising four digit buttons per row. Each of these twelve digit buttons may be designed to be actuated by the end segment of one of the user's four fingers. In order to reach the digit buttons in one of these three rows with the end segment of a finger the user may need to flex or extend that finger. Exemplary embodiments may include three digit buttons 2702 designed to be actuated by the end segment of the user's thumb. In order to individually actuate one of these three thumb digit buttons the user may be required to either abduct or adduct their thumb relative to the hand.

Figure 27B:
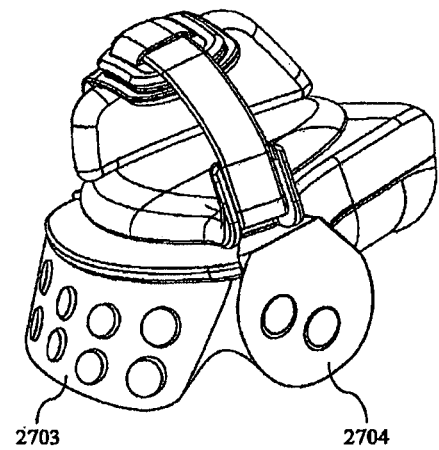

In exemplary embodiments as illustrated in FIG. 27B some embodiments may include two rows of digit buttons 2703 comprising four digit buttons per row. Furthermore, certain embodiments may include two digit buttons 2704 designed to be actuated by the user's thumb.

Figure 27C:
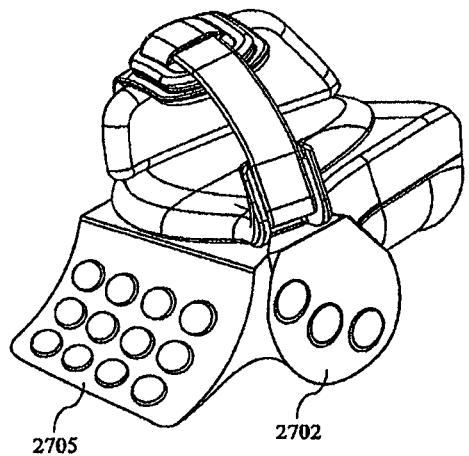
Figure 27D:
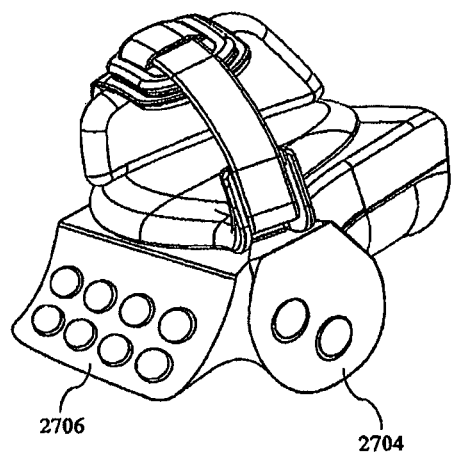

Exemplary embodiments may have finger digit buttons mounted on a curved surface. In such embodiments the angle of a button's digit contact surface may be dependent on that button's position on the curved surface. For example, as illustrated in FIG. 27C some embodiments may include three rows of digit buttons 2705 comprising four digit buttons per row. An advantage of having finger digit buttons mounted on a curved surface may be that it reduces the extent of flexion or extension of the fingers required to reach each of the finger digit buttons. In another similar example, as illustrated in FIG. 27D exemplary embodiments may include two rows of digit buttons 2706 on a curved surface comprising four digit buttons per row.

Exemplary embodiments similar to those illustrated in FIG. 27A and FIG. 27C may include 12, 13, 14, or 15 digit buttons. Exemplary embodiments with 13 or 12 buttons may allow the user to play a chromatic scale from the tonic note to the tonic note an octave higher (13 buttons) or from the tonic note to the note one below the octave-higher tonic note (12 buttons). Exemplary embodiments with 15 or 14 buttons may also be used to play chromatic scales, but may also allow the user to play 2 octaves of a diatonic scale (without requiring the use of an octave selection feature) from the tonic note to the tonic note 2 octaves higher (15 buttons) or from the tonic note to the note one below the 2-octave-higher tonic note (14 buttons).

Exemplary embodiments similar to that illustrated in FIG. 27B and FIG. 27D may include 8 or 7 digit buttons, and this number of buttons may be sufficient to allow a user to play a diatonic scale (e.g., C4, D4, E4, F4, G4, A4, B4, C5) from the tonic note to the tonic note one octave above (8 digit buttons) or from the tonic note to one note below the octave-higher tonic note (7 digit buttons).

Unlike those illustrated in FIGS. 27A, 27B, 27C, and 27D, exemplary embodiments may include rows of digit buttons that are non-straight in their horizontal arrangement. In such embodiments the distance of a digit button from the palm enclosure 115 may be proportional to the relative length of the digit which that button is designed to be actuated by. For example, the digit buttons that are designed to be actuated by the little finger may be on average positioned closer to the palm enclosure than the digit buttons that are designed to be actuated by the middle finger.

Figure 27E:
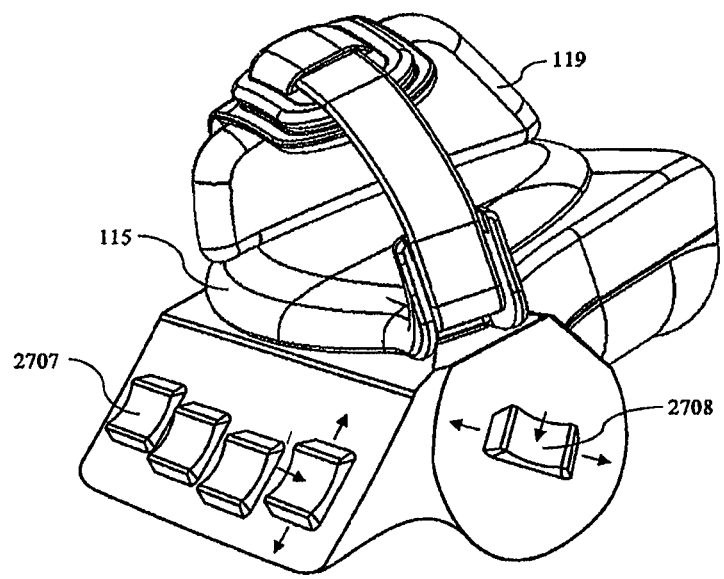

As illustrated in FIG. 27E, exemplary embodiments may include digit buttons 2707 that have at least three directions of actuation. These digit buttons may be designed to be actuated by the end segments of the digits (distal phalanges) and the directions of actuation may be: retraction (pulling the digit button towards the palm of the hand), extension (pushing the digit button away from the palm of the hand), and pressing (pushing the digit button down into the enclosure it is mounted on). A three-direction digit button 2708 may also be included for the thumb, to be actuated by the end segment of the thumb (distal phalanx). This thumb button may have the actuation directions of adduction (pulling the digit button towards the main body of the interface), abduction (pushing the digit button away from the main body of the interface), and pressing (pushing the digit button down into the enclosure it is mounted on). Alternatively, exemplary embodiments may include digit buttons 2707 that have at least two directions of actuation (push and pull).

Five of the three-direction buttons would allow the user to produce at least fifteen discrete output signals from the buttons. Embodiments of this type may include adjustability whereby the base location that each button is actuated from can be adjusted. Such adjustability may assist in allowing an embodiment to maintain usability among users with different hand sizes and finger lengths. For example, the finger digit buttons 2707 may be adjustable in their distance from the palm of the user's hand (i.e., forwards and backwards). The thumb digit button 2708 may also have the capacity to have its base position distance from the proximal segments of the thumb altered.

Exemplary embodiments may incorporate different forms of adjustment. For example, an adjustable component may be built into the thumb digit array 118 (see e.g., FIG. 3) whereby the distance between the proximal button 312 and the section that includes the distal and medial buttons (310 and 311) can be altered by the user. Alternatively, a mechanism may be included that allows the position and/or angle of the entire thumb digit array relative to the palm enclosure to be adjusted.

Figure 25:
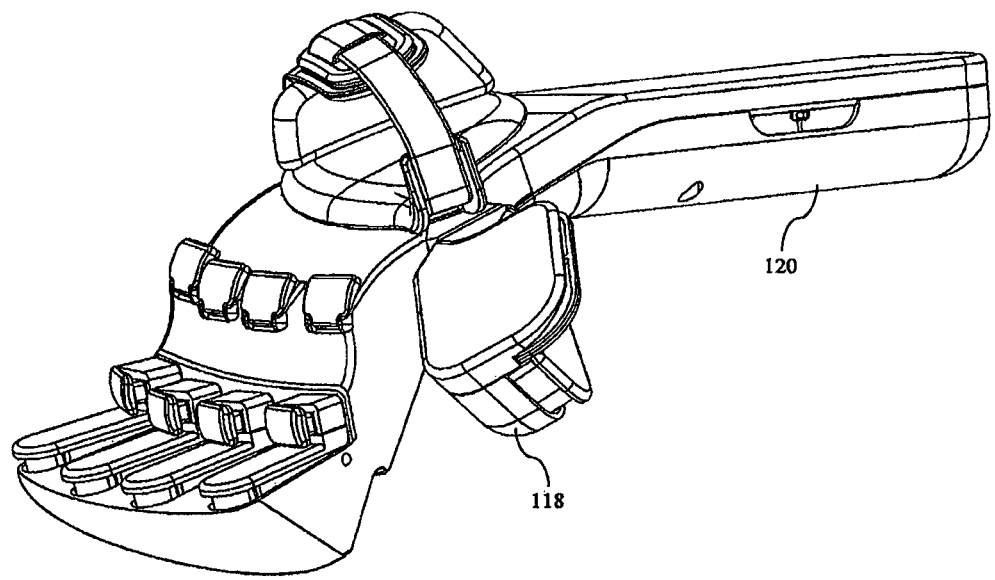
FIG. 25 illustrates an exemplary embodiment of an interface from a front left perspective wherein the digit array positions are fixed relative to each other.

In exemplary embodiments the ranges of adjustment mechanisms mentioned in the above description may be increased or reduced, or various types of adjustment may be eliminated entirely. For example, some embodiments may have no separation between the finger digit arrays (see e.g., FIG. 25), where some or all the digit buttons for the fingers are positioned on one or more enclosures. Some embodiments may be produced in different sizes to fit different-sized hands. Certain embodiments may use a modular design, where the rear enclosure 120 (see e.g., FIG. 1), including its contents, may be detachable from the rest of the interface. In exemplary embodiments this detachable rear enclosure may be compatible with a range of front sections of the interface (palm enclosure 115 and the finger and thumb digit buttons, etc.) designed to fit different sized hands. In such embodiments the rear enclosure may use conventional methods to form a secure structural and electronic connection with these front sections.

With regard to the finger and thumb digit arrays (110, 111, 112, 113, and 118), in exemplary embodiments these may be made in different sizes, and/or with or without some or all of the adjustability mechanisms described for the finger digit arrays in other embodiments. In exemplary embodiments, these different-sized digit arrays may be interchangeable and swapped in and out of the interface to provide a better fit for an individual user. For example, in exemplary embodiments, the finger digit arrays may be swapped in/out at their connection to the digit array track 114. This would assist not only in accommodating a large range of hand sizes, but also the size differences between the fingers of an individual hand. In such exemplary embodiments, conventional connectors may be used to attach the sensor wiring of the digit buttons to other parts of the interface's electronics.

Figure 14B:
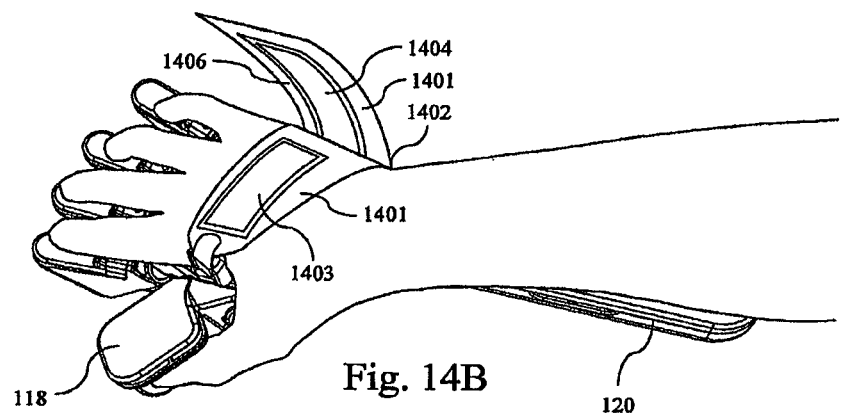
FIG. 14B, FIG. 14C, and FIG. 14D illustrate an exemplary embodiment of an interface from an upper perspective that includes an attachment mechanism comprising material that stretches over the hand, is threaded under a buckle, and attaches back on to the material on the back of the hand or wrist.

FIG. 14A illustrates an exemplary embodiment as shown in FIGS. 1, 2, and 3 whereby an interface is fastened to a user's right hand using the palm clasp 116 and hand strap 117 mechanism. In exemplary embodiments alternative methods of fastening the interface to the hand may be used. As illustrated in FIGS. 14B and 14D, a strap 1401 may be included that extends from the thumb side of the palm enclosure over the user's hand. The strap may consist of material that is elastic in character. On the opposite side of palm enclosure from the thumb side the strap may thread under a loop 1402 or buckle trim or equivalent structure (not shown in image). As illustrated in FIGS. 14B and 14D, the end portion 1406 of the strap 1401 may then thread back over the user's hand to attach to the outer surface of the preceding section of the strap 1401 running over the top of the user's hand.

Figure 14C:
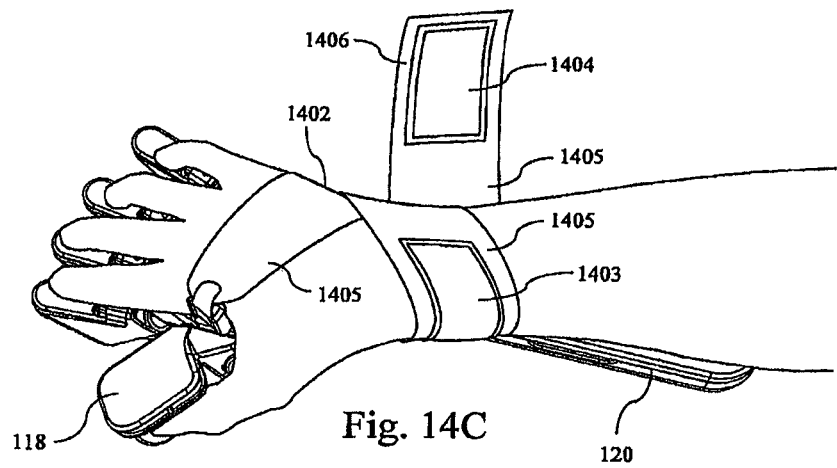
Figure 14D:
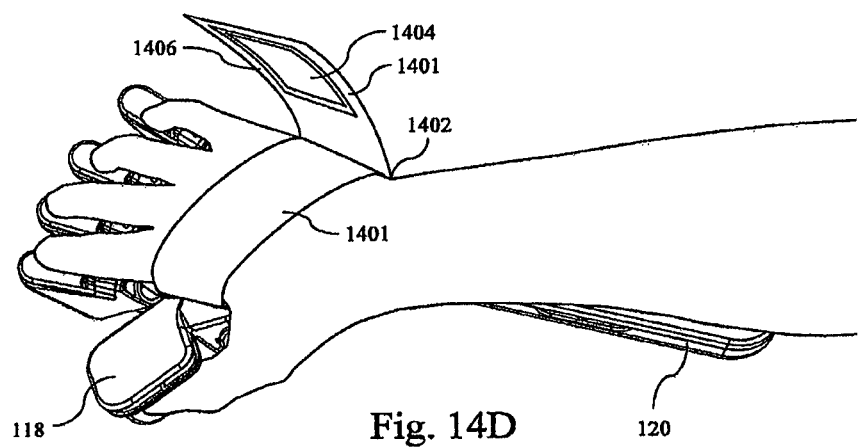

As illustrated in FIG. 14C exemplary embodiments may utilize a longer strap 1405 that threads under the loop 1402 and then extends to, and wraps around, the user's wrist (starting on the thumb side and then travelling under the wrist to the opposite side and then over the top of the wrist). The end portion 1406 of the strap 1405 may then wrap over the outer surface of the preceding section of the strap on the wrist and attach to this strap surface. Attachment of the end of the strap to the surface of the preceding section of strap (e.g., on the top of the hand or around the wrist) may be made using a hook and loop, press stud, side release buckle, or button mechanism, or any equivalent mechanism. FIGS. 14B, 14C, and 14D illustrate the inclusion of a hook and loop mechanism, with the hook surface 1403 on the "outside" of the strap and the loop surface 1404 on the "inside" of the strap. By using an adjustable attachment method the site where the strap attaches to itself can be varied, thereby accommodating different sized hands and user preferences for tightness of fit. The strap 1405 may consist of material that is elastic in character. For the sake of illustration, in FIGS. 14B, 14C, and 14D the end of the strap is shown extended upwards and not attached to the preceding section of strap (as it would be during normal use).

As illustrated in FIG. 14D, exemplary embodiments may include a hand strap 1401 that attaches at a lower point on the thumb side of the interface and contacts the side of the index finger knuckle and surrounding area, thereby providing a different attachment fit to the hand. In exemplary embodiments the strap may be comprised of material that can act as an attachment partner in a hook and loop mechanism. For example, some or all of the outer surface of the strap 1401 wrapped over the user's hand may include loop components and a section of material 1404 on the end portion 1406 of the strap may provide the hook components.

Figure 14E:
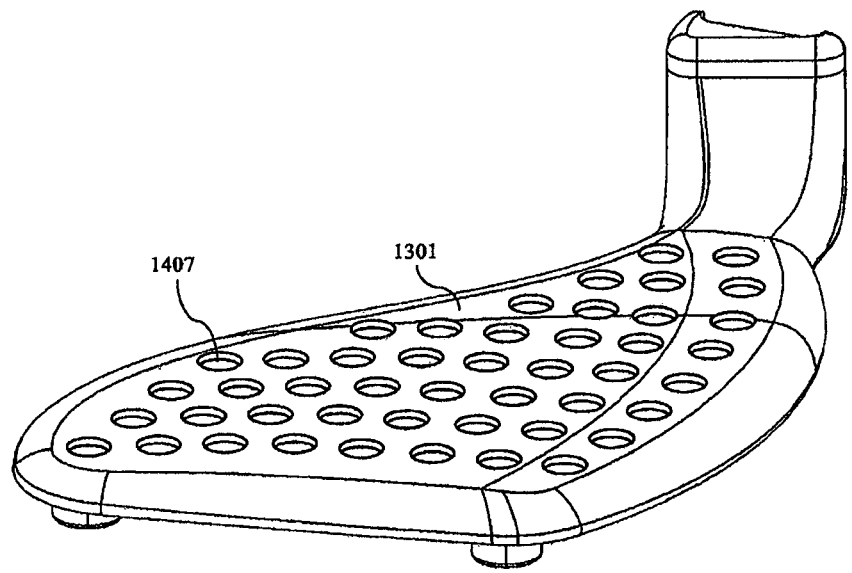
FIG. 14E illustrates an exemplary embodiment of an interface from right perspective in which the upper surface of the palm enclosure is shown in isolation and includes air ventilation holes.

Exemplary embodiments may include mechanisms that reduce the accumulation of sweat on the user's hand when using the device. As illustrated in FIG. 14E, exemplary embodiments may include ventilation holes 1407 that run through the upper surface of the palm enclosure 1301 (illustrated here in isolation from all the other components of the interface). In conjunction with other ventilation openings (that allow air to pass underneath the ventilation holes 1407) the accumulation of sweat on the palm of the user when their hand is attached to the interface may be reduced. Other mechanisms for reducing sweat accumulation may be utilized, including covering the upper surface of the palm enclosure 1301 with a moisture-wicking fabric.

Exemplary embodiments may utilize different electronics in the interface. For example, the data processing functions performed by the processor 817 (see e.g., FIG. 8) and/or the digit button sensor relay 812 may be performed by a processor component added to the external wireless link 819 and/or additional software installed on the recipient device 820 (in the instance where that device is a computer and/or processor of some type). In such exemplary embodiments the data sent from the interface may be in a less processed state, but one that may allow some or all the necessary processing to take place at these subsequent points in the data chain. Embodiments of this kind may have the advantage of reducing the interface's power consumption and making changes to the data-processing algorithms more convenient for the user.

Figure 13A:
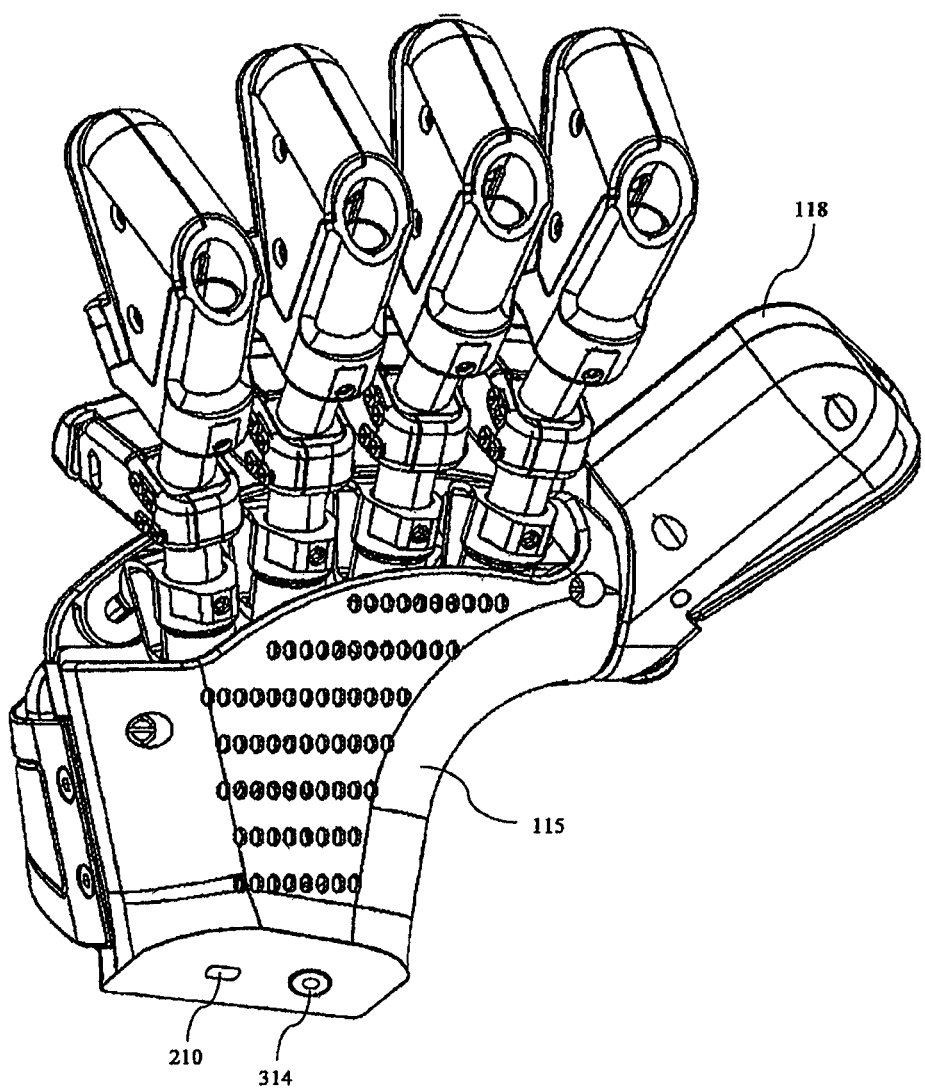
FIG. 13A illustrates an exemplary embodiment of an interface from a lower perspective in which electronics from the rear enclosure are placed in the palm enclosure and the rear enclosure is absent.
Figure 13B:
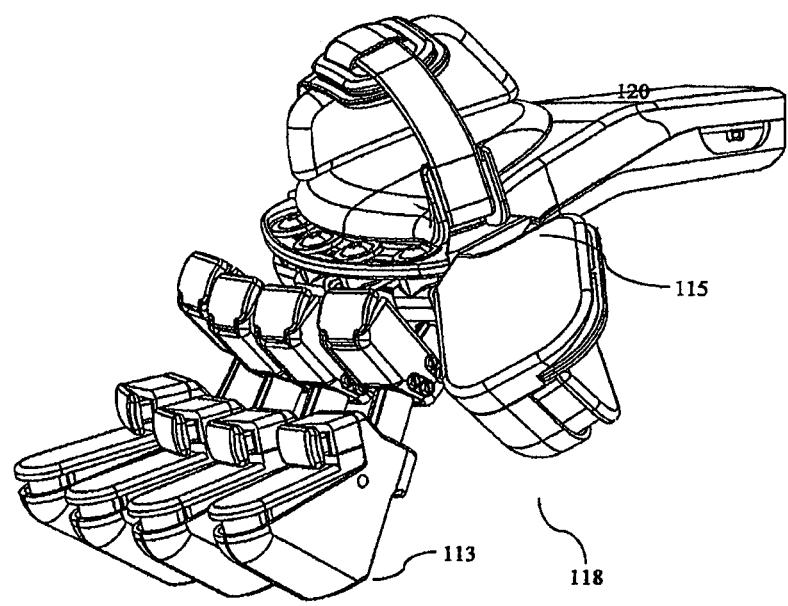
FIG. 13B illustrates an exemplary embodiment of an interface from a front left perspective in which the rear enclosure is reduced in size.

In exemplary embodiments the electronics housed in the rear enclosure 120 (see e.g., FIG. 1) may be moved to the palm enclosure 115, and the rear enclosure may be reduced in size or eliminated. An illustration of an embodiment that does not include a rear enclosure is shown in FIG. 13A. An illustration of an embodiment that includes a relatively short and thin rear enclosure 120 is shown in FIG. 13B. In exemplary embodiments of this kind, the counterweight effect of the rear enclosure may be lessened, but these embodiments may be useful for applications where the physical presence of a rear enclosure is undesirable and/or unnecessary.

Figure 13C:
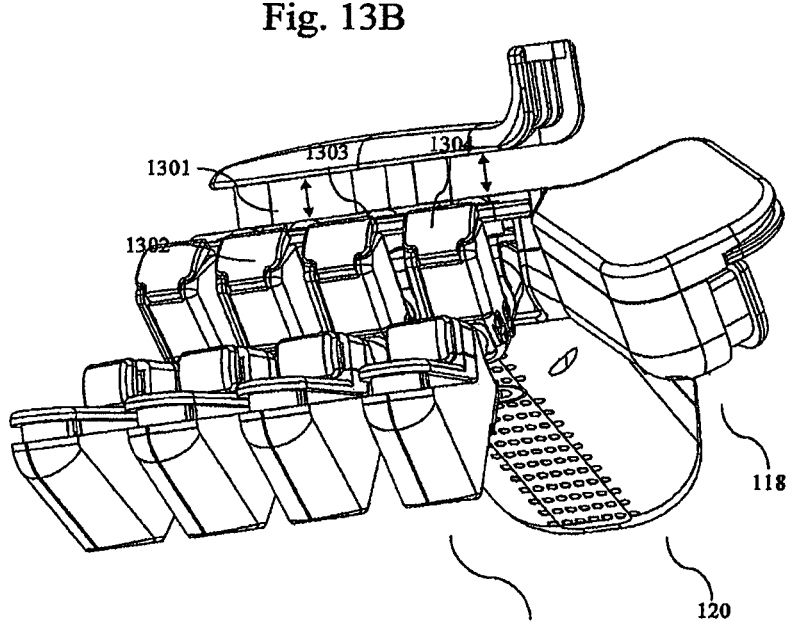
FIG. 13C illustrates an exemplary embodiment of an interface from a lower front left perspective in which the height of upper surface of the palm enclosure is adjustable.

Exemplary embodiments may include mechanisms that allow the contact surface for the user's palm to have its location and/or orientation relative to the rest of the interface to be adjusted. An exemplary embodiment of this kind is illustrated in FIG. 13C, where components that wrap around the user's hand (e.g. the palm clasp 116, hand strap 117, and hand clasp spacer 119) are not illustrated in the figure for the sake of clarity. In this embodiment the upper surface of the palm enclosure 115 (see FIG. 13B) may have multiple degrees of movement freedom relative to the lower portion of the palm enclosure. For example, a mobile upper surface 1301 of the palm enclosure may be able to be raised or lowered relative to the lower portion of the palm enclosure, supported by projections that slide in and out of indentations within the lower portion of the palm enclosure. As illustrated in FIG. 13C, a front-right rod 1302, a rear rod 1303, and a front-left rod 1304 may be attached to the mobile upper surface 1301 and may slide in and out of cylinders that form part of the structure of the lower portion of the palm enclosure. The mobile upper surface may be raised or lowered by turning bolts that pass through the rods into the lower portion of the palm enclosure 115 (the bolts being accessed through holes on top of the mobile upper surface). Alternatively the rods of the mobile upper surface may slide freely within the cylinders and then be fixed in place through a locking system where horizontal pins within the lower portion of the palm enclosure 115 are inserted into one of many holes running along the length of the rods. Other adjustment mechanisms may also be used, for example, multiple mobile upper surfaces of different rod lengths may be available to the user and chosen to be fitted to the device depending on which length provides the best fit. In each of these examples the components that wrap around the hand (e.g. the palm clasp 116, hand strap 117, or alternative hand strap 1401) may attach to the mobile upper surface 1301, the lower portion of the palm enclosure 115, or a combination of the two.

Exemplary embodiments may have a reduced number of axes of measurement among their motion, orientation, and/or position sensors.

Figure 23:
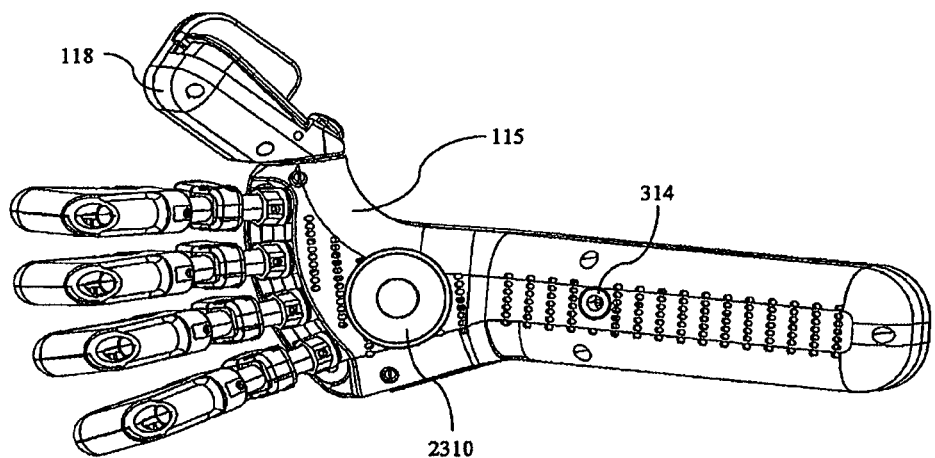
FIG. 23 illustrates an exemplary embodiment from a lower perspective of an interface including a speaker under the palm allowing sound production of audio synthesized on the interface.
Figure 24:
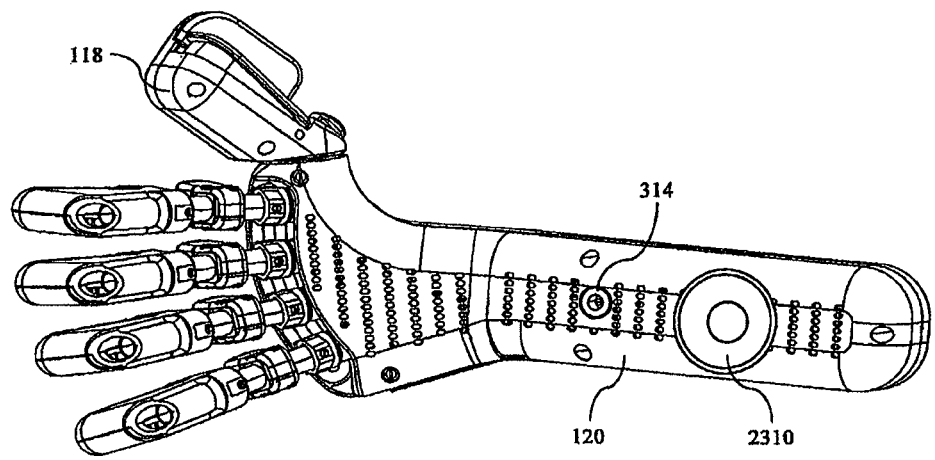
FIG. 24 illustrates an exemplary embodiment of an interface from a lower perspective including a speaker on the rear enclosure allowing sound production of audio synthesized on the interface.

Exemplary embodiments may include audio synthesis/production components within the interface itself. In embodiments of this kind the interface may be able to produce audible musical sounds with little or no assistance from other devices. As illustrated in FIG. 23, a speaker 2310 or other sound producing component may be located on the palm enclosure. Alternatively, as illustrated in FIG. 24 a speaker 2310 or other sound producing component may be located on the rear enclosure, or in any other suitable position on the interface. Exemplary embodiments may include audio synthesis components, but require an external amplification device (e.g., a guitar amplifier) to be made audible.

Exemplary embodiments may include a system within the interface that provides haptic feedback to the user. In such embodiments one or more vibration motors may be included within the palm enclosure 115 (see e.g., FIG. 1) and information may be provided to the user through their activation. This information may be generated on board the interface by its processing components (e.g., the processor 817, see FIG. 8) or other sources (e.g., the recipient device 820, or a processing component added to the external wireless link 819, etc.).

In exemplary embodiments, an interface may be used to manipulate the aural and/or visual elements of a video, or other types of visual and/or audio content. Exemplary embodiments may involve an interface being used to manipulate the aural and/or visual elements of a music video. In exemplary embodiments, game characteristics may be used whereby achieving specific outcomes through use of the interface is rewarded by one or more measures of achievement (e.g., points). A variety of interfaces may be used to play game-like embodiments including the exemplary interfaces explicitly described herein. For example, the exemplary embodiments may be configured to function with exemplary interfaces similar to those illustrated in FIG. 1, FIG. 25, FIG. 26A, FIG. 26B, or FIG. 27A, B, C, D, or E. Exemplary embodiments may be configured to provide a game suitable to the specific capabilities of one or more interfaces. Exemplary embodiments may include the use of interface orientations, positions, and/or motions to provide one or more substantially continuous values, and/or digit buttons to provide one or more discrete values.

In exemplary embodiments other interfaces that provide suitable input to the system may be used. Appropriate input may include input that can provide one or more discrete input values (for triggering individual pitches or notes, for example) and/or one or more substantially continuous values (e.g., a number that may take values between 0 and 100, and can perform the same role as, for example, data derived from a sensor component that measures angular rotation rate or orientation around a vertical axis). For example, moving or orienting a motion, orientation, and/or position sensitive mobile device (like a cell phone, PDA, hand-held video game device, or tablet computer, etc.) may provide one or more substantially continuous values suitable for use in exemplary embodiments. In addition, moving a finger across a touch sensitive screen may also provide one or more substantially continuous values, while contacting specific points on said touch screen may elicit discrete output events. Furthermore, some or all of the system of exemplary embodiments described herein may be implemented on a mobile computing device (e.g., cell phone, PDA, hand-held video game device, or tablet computer, etc.), video game platform (e.g., the Microsoft Xbox, Sony Playstation, or Nintendo Wii, etc.) or other computer, either in association with, or independent from, the exemplary interfaces described herein.

Exemplary embodiments may involve the manipulation of audio or musical audio only, while others may involve the manipulation of video only. Possible sources of pre-recorded video include live action video (e.g., a music video), computer-generated video, or animated video. In exemplary embodiments computer graphics may be used in conjunction with or instead of pre-recorded video. In exemplary embodiments some or all the audio may be synthesized in real-time, rather than some or all of the audio relying on pre-made recordings.

In exemplary embodiments that use a music video as raw material, some or all of the components of the video's audio may be configured to be manipulated by the user. In exemplary embodiments, some or all of the elements of a video's visual component also may be configured to be manipulated by the user.

Exemplary embodiments may include the benefit of providing the user with an enhanced experience of engagement with musical audio or visual images or both due to the user's sense of involvement or "agency" in the timing and rate of the aural and visual elements of the embodiment (e.g., a game).

Figures 28A, 28B:
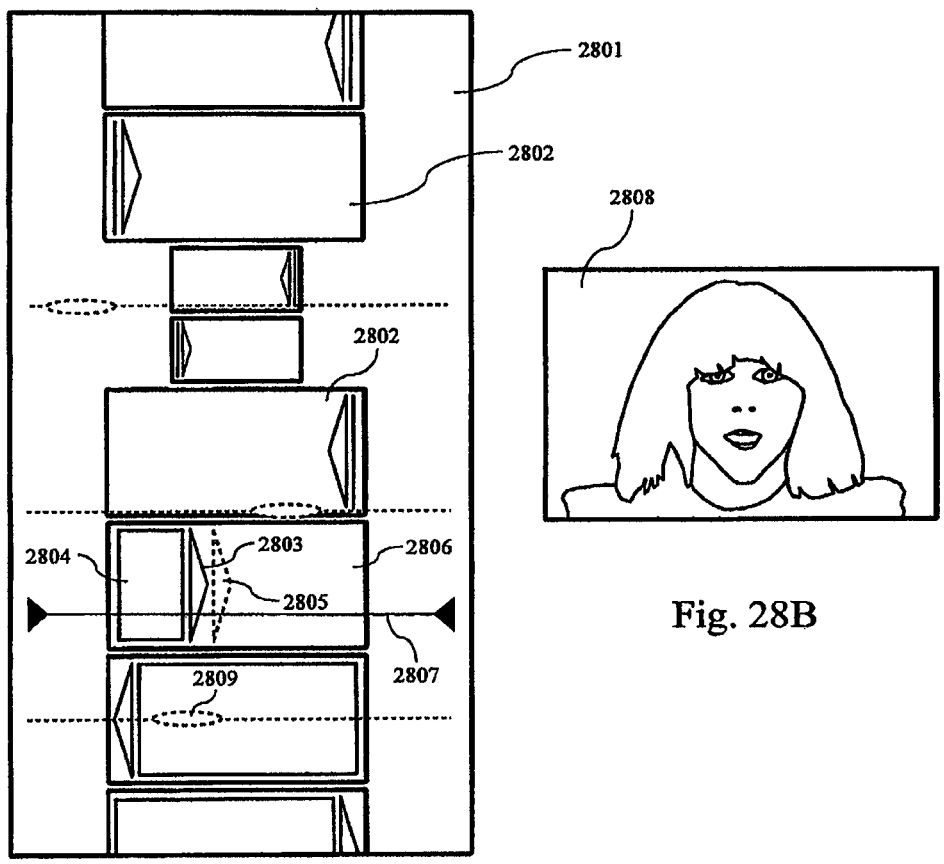
FIG. 28A and FIG. 28B illustrates an exemplary embodiment of a gaming functionality achievable with exemplary embodiments of the methods, devices, and systems described herein.

In exemplary embodiments visual elements may be presented to a user as indicators for how to achieve a game objective. FIG. 28 illustrates some of the visual elements that may be presented to a user while playing exemplary embodiments. For example, a variety of instructive visual elements may be presented to the user in a display panel. Within this panel multiple "section blocks" 2802 of different sizes may also be presented. These blocks may be set to correspond to specific sections in the audio or video samples or both. In some exemplary embodiments these sample sections and their corresponding section blocks may be consecutive. In other words, playing through each sample section one after another would advance smoothly through the entire sample. An example of audio that might be configured for control via an interface is a singer's voice singing a song, and a section block may be set to correspond to one musical bar of that singing (i.e., in the case of a song with a time signature of 4/4, one bar would consist of four beats occurring at a rate determined by the tempo of the song, often expressed in beats per minute). A smaller block may be set to correspond to a shorter section, for example, one half of a bar of singing. In exemplary embodiments, audio that is configured to be controlled by an interface (e.g., a singer's voice) may be referred to as a "control audio sample". Since exemplary embodiments can also be configured such that an interface may be used to control video alone or in conjunction with audio, for the purposes of the description below the term "control audio sample" may be considered synonymous with the term "control video sample". As described above and illustrated in FIG. 30B, in exemplary embodiments a control audio sample 3020 may be divided up into multiple sample sections 3019 of varying sizes. As described above, visual elements termed "section blocks" 3018 may be created that possess timings and durations proportional to their corresponding sample sections.

To allow the user to anticipate future events in the game and to show when each section block has its own "turn" at manipulation, in some exemplary embodiments the section blocks 2802 may move towards and pass through a "play line" 2807. For example, the section blocks may move together (arranged in sequence one after the other) at a constant speed from the top to the bottom of the visual instruction display. In exemplary embodiments the play line position may be fixed throughout the duration of the game, and may be set at any position in the visual instructions display. A section block may pass through the play line 2807 as the section in the control audio sample to which it corresponds is made audible to the user, and the location of the play line on this section block may represent the play back position of the section block's corresponding control audio sample section. In this description the section block passing through the play line is referred to as being the "active" section block and is numbered in FIG. 28 as 2806.

As described above, in exemplary embodiments the user may operate an interface to control an audio sample, the visual of a video sample, or both. For example, rotation of an interface around its vertical (yaw) axis back and forth may be used to advance an audio sample (termed the "control audio sample") forward in time. Alternatively, other axes of rotation or trajectories of movement may be used for this purpose. In exemplary embodiments the system may be configured to achieve an auditory effect whereby the listener perceives that the control audio sample remains audible even if it is not being advanced in time. An auditory effect may also be implemented such that variations in the rate or direction of the control audio sample's playback from the normal rate and direction do not cause changes in the pitch of the control audio sample. The audio processing methods that are capable of producing such effects are presented later in this description. In exemplary embodiments, other audio or video samples may be played back at a normal constant rate during the game and not subject to control via an interface. For example, if the control audio sample is a lead vocal track associated with a song featuring other musical sounds or instruments, these other musical sounds or instruments may be played back at a normal constant rate during the game and not change in response to actions performed on an interface. These non-manipulated audio components may be referred to as the "backing music" or the "constant audio sample". Where the audio sample components that will and will not be manipulated as part of an exemplary embodiment belong to the same song, the two types of audio sample may be provided to an exemplary embodiment as separate samples (e.g., as a vocal sample and a backing music sample). Alternatively, if the audio components are provided as a single audio sample or a single audio sample associated with a video file, audio pre-processing may be used to separate the required audio components into two separate samples prior to the user engaging in the game.

In exemplary embodiments there may be an "ideal" rate of vertical axis rotation that exists such that, if performed by the user, may advance the control audio sample in time (or "in sync") with the constant audio sample. There may also be an ideal time associated with each section of the control audio sample at which initiating movement of the interface contributes to the control audio sample being correctly synced with the constant audio sample. The closer the user comes to achieving the ideal timing and ideal rate, the more the control audio sample will sound as it does in the context of the original complete audio sample (e.g., where the control and constant audio samples are combined).

In exemplary embodiments, for the section of the control audio sample corresponding to a section block, in order to progress the playback of the control audio sample the user may be required to rotate the interface around its vertical axis in a specific direction. For example, in FIG. 28 the "active" section block 2806 may indicate to the user that they are required to rotate the interface from left to right around the vertical axis (e.g., with a clockwise motion of the forearm running approximately parallel to the ground) in order to advance the playback of the control audio sample. As illustrated in FIG. 28 a visual indicator 2803 inside the active section block 2806 may provide this direction information by pointing in the required rotation direction. In exemplary embodiments the vertical axis rotation may be measured by the interface's angular rate sensor. Compound movement (including for example rotational and translational movement) of the interface would therefore provide usable input to the system as long as that movement included vertical axis rotation. Exemplary embodiments may utilize other or additional types of interface motion and/or orientation for controlling a game, and may utilize measurements coming from other sensor types associated with an interface.

In exemplary embodiments, the user may be required to begin rotating the interface approximately when the lower edge of a section block 2802 reaches the play line 2807. Achieving this movement timing, along with achieving the ideal rate of vertical axis rotation, would cause a control audio sample to be correctly synced with a constant audio sample. In exemplary embodiments where the section blocks move at a constant rate, by anticipating approximately when the bottom edge of the "next" section block will reach the play line the user may be able to improve the timing of when they initiate their movement of an interface. A visual indication of the ideal rate of movement may be formed by the combination of the height of the active section block 2806 and the speed with which the active section block is travelling downwards through the play line. By anticipating approximately when the top edge of the active section block will reach the play line the user may be able to improve their use of an interface in approximating the ideal rate of vertical axis rotation. In exemplary embodiments one ongoing game objective may be that the user has progressed through the entire segment of the control audio sample assigned to the active section block by the time the top edge of the active section block reaches the play line.

In exemplary embodiments, additional visual indicators may be used to guide the user's actions. While the active section block 2806 passes through the play line 2807 and the user rotates an interface around its vertical axis in the direction specified by the direction indicator 2803, the direction indicator may itself move in the specified direction at a rate proportional to the rate of the interface's vertical axis rotation. An additional visual indicator may be used, for example, a rectangle 2804 that begins as a line and then expands behind and in concert with the moving direction indicator, at a rate proportional to the rate of the interface's rotation. When the section of the control audio sample corresponding to the active section block is reached due to movement of the interface, the direction indicator 2803 and section advancement indicator may be programmed to cease their respective movement and expansion. When this point is reached, exemplary embodiments may be configured such that no further advancement through the control audio sample is possible until the next section block becomes active. Furthermore, advancement may also not be possible unless the interface is moved in the direction specified by the next active section block's direction indicator. Exemplary embodiments may also be configured to not allow the control audio sample (or the visual indicators) to advance in the direction opposite to the direction specified by the active section block's direction indicator. In other words, in such embodiments this would effectively mean that the control audio sample would not be able to be played backwards.

In exemplary embodiments, if the user has not advanced through the entire section of control audio sample (corresponding to a section block termed "section block A") prior to the next section block becoming active (termed "section block B"), the system may be configured to advance the control audio sample from its playback position in section block A as the interface is moved in the new direction specified by section block B. If an objective is that a control audio sample and a constant audio sample remain synchronized, the user would need to cause the control audio sample to "catch up" with the constant audio sample by increasing the control audio sample's playback above the ideal rate through an increased rate of movement of the interface. In exemplary embodiments, if the user exceeds a threshold of having reached a playback position that is too far behind the "ideal" playback position (the playback position that would be achieved if control audio sample advancement was occurring at the ideal rate) the system may be configured to continue advancing from the start of the sample section corresponding to the next section block to become "active" (effectively "skipping" a part of the control audio sample).

A further visual indicator of the ideal rate of an interface's vertical axis rotation may be presented to the user, comprising a visual component that may remain perceivable to the user while superimposed on either of the elements 2803 or 2804. For example, an ideal rate indicator 2805 may move at the ideal rate regardless of whether the user is moving the interface. If, as shown in FIG. 28, the ideal rate indicator 2805 is visually similar to the direction indicator 2803 then the user may be aided in achieving the ideal rate by rotating the interface around its vertical axis such that the direction indicator 2804 and the ideal rate indicator 2805 remain superimposed while the ideal rate indicator moves sideways.

In exemplary embodiments each section block may have a direction indicator 2803 pointing in a direction opposite to the direction indicator belonging to the previous section block. If so the user would be able to follow a vertical axis rotation of the interface as specified by a section block with a vertical axis rotation in the opposite direction when the next section block becomes active.

In exemplary embodiments that make use of a video image (the continuous visual component of a video sample), elements of the video image may be made visible to the user and may also be under the user's control. For example, just as the control audio sample has been divided into sections and assigned to separate section blocks, the video image sample may also be divided. The timing and duration of these video sections may be made identical to the control audio sample sections, such that playback advancement of synchronized control audio and video samples may be simultaneously controlled by movement of an interface. Each pair of matching control audio and video samples may also have their control visualized through a single section block and its associated components.

Figure 29A:
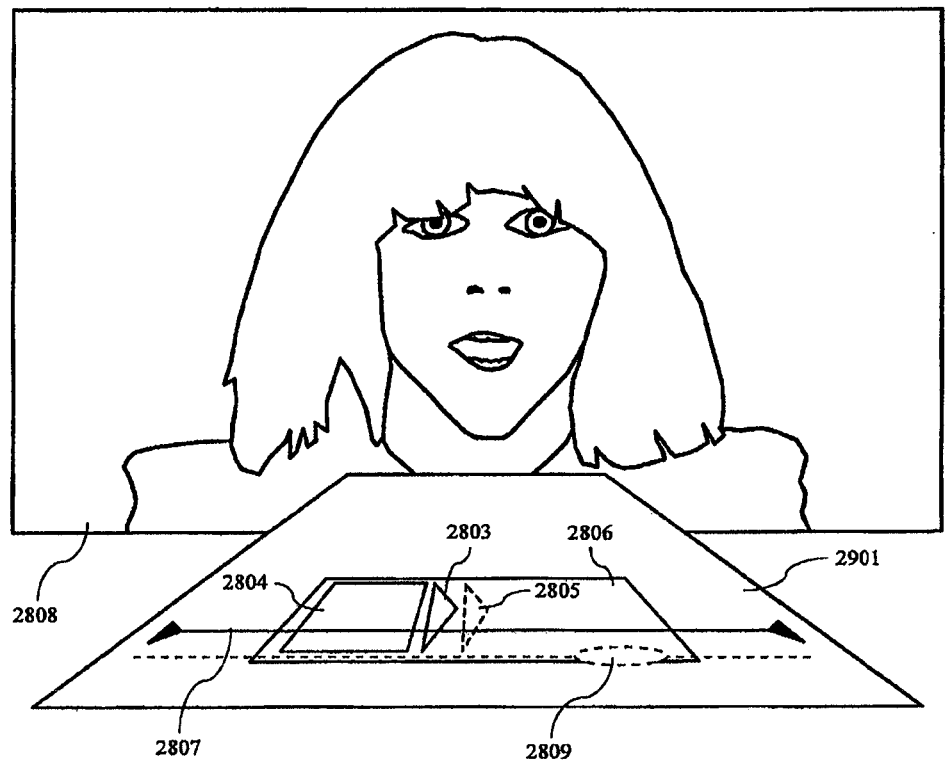
FIG. 29A illustrates an exemplary embodiment of a gaming functionality achievable with exemplary embodiments of the methods, devices, and systems described herein.

In exemplary embodiments the video image 2808 may be displayed in close proximity to or superimposed with the visual instructions display, allowing the user to conveniently receive visual feedback from both sources. For example, the video image 2808 and visual instructions display may be presented on the same visual device (e.g., a TV screen, computer monitor, projected image, etc.). In FIG. 28 the video image 2808 is illustrated as small relative to the visual instructions display 2801, however, in exemplary embodiments the video image 2808 may be large relative to the visual instructions display. The video image 2808 and visual instructions display may be partially or completely superimposed, and the visual instructions display may be overlaid on top of the video image in a position (e.g., on the left hand side) and visual configuration (e.g., partially transparent) that minimizes the visual instructions display's occlusion of the video image. As shown in FIG. 29A, in exemplary embodiments a "perspective view" of the visual instructions display 2901 may be included. This visual instructions display may include the visual components as discussed for FIG. 28, and the moving components may advance from the "back" towards the "front" of the visual instructions display 2901, as if they were coming towards the user. In some embodiments of this kind the video image 2808 and visual instructions display 2901 may be partially or completely superimposed, and the visual instructions display may be overlaid on top of the video image in a position and visual configuration (e.g., partially transparent) that minimizes the visual instructions display's occlusion of the video image.

In exemplary embodiments involving musical audio samples, one of the benefits of the game to the user may be that moving the interface at the correct rate causes the control audio sample to combine pleasantly with the constant audio sample, in a way that sounds enjoyably familiar to a user who knows the song. A correct rate of interface movement may also cause motion within the video image to combine pleasantly with the constant audio sample. Both of these pleasant effects can occur in spite of, or due to, variations in the rate and timing of interface movement from an ideal rate and timing (where the controlled elements progress substantially as they would in the original complete musical audio or video samples).

In exemplary embodiments features of the game may allow the user to achieve game objectives with less reliance on visual instructions and visual feedback. For example, the sample sections corresponding to the section blocks 2802 may each begin at a rhythmically identifiable moment, for example the start of each musical bar or measure. If each sample section lasts for a single bar and each section block requires a direction of interface movement opposite to the previous section block, then the user may anticipate that they may need to change movement direction at the beginning of each bar.

In exemplary embodiments another feature that may reduce reliance on visual instructions and visual feedback is that the rate of interface movement required to produce an ideal rate of sample advancement may be configured to remain constant throughout the game. Thus the user may begin to rely on their own sense of the required rate of movement that is acquired through playing the game. Furthermore, the sound of the control audio sample may also provide helpful feedback for achieving the desired rate of sample advancement. This effect may be enhanced if the user is familiar with how the control audio sample sounds at the ideal advancement rate (i.e., as it sounds in the original complete recording). Audio sounds not originating from the original audio sample may also be used to provide feedback to the user. Similar to audio feedback, if a displayed video sample is being controlled by the user this may also provide feedback to the user that is relevant to achieving the ideal rate of advancement. This effect may be enhanced if the user is familiar with how the video sample looks at the ideal advancement rate (i.e., the normal speed of playback). Additional visual elements may also be added to the video sample to provide useful feedback to the user.

Exemplary embodiments may also utilize digit button presses (i.e., actuation) on an interface as part of playing the game. In exemplary embodiments of this kind, button indicators 2809 may be incorporated into the visual instruction display and may move at the same rate and in the same direction as the section blocks 2802 and their associated visual components. When a button indicator reaches the play line 2807 the user may be required to press a button on the interface that corresponds to the button indicator. In exemplary embodiments the system may be configured in such a way that pressing the wrong digit button, or pressing the right button too soon or too late may result in audio or visual feedback or both indicating the digit button press attempt failed. The system may also be configured such that this failure prevents the control audio sample from being heard for a specific section of time, or cause it to be audibly modulated. Exemplary embodiments may be configured to require specific button presses at any time during operation, thus a button indicator may be aligned with the beginning of a section block, or may be positioned part way through a section block. A variety of visual features may be provided to allow the user to identify which digit button is being signaled by a button indicator as needing to be pressed as part of the game. For example, digit buttons and button indicators may be matched by location (e.g., left to right order, or up-down order), color, or by common identifying marks or symbols.

Exemplary embodiments may use motion, orientation, and/or position sensing to control the pitch of a control audio sample. For example, in exemplary embodiments the interface's orientation around its lateral axis may be used to select from a range of pitch choices specified by the system for each sample section 3019 (see FIG. 30B). The pitch choices available for each sample section may be illustrated for the user in the sections corresponding section block (2802, and 3018 in FIGS. 28 and 30B respectively). For example, the vertical dimension of each block may abstractly represent pitch and rectangular-shaped "pitch blocks" may represent the timing and duration of each required pitch. These pitch blocks may be arranged sequentially across a section block (in an order specified by the section block's direction indicator) and one or more pitch blocks may be available to choose from for each sub-section of the corresponding sample section. In continuation of this example, the lateral axis orientation of the interface may be represented by a visual indicator within a section block, whereby the visual indicator's position in the vertical dimension of the section block may be proportional to the interface's orientation around its lateral axis. With a single pitch block, multiple changes of pitch in the control sample may occur without requiring input from the user.

Figure 29B:
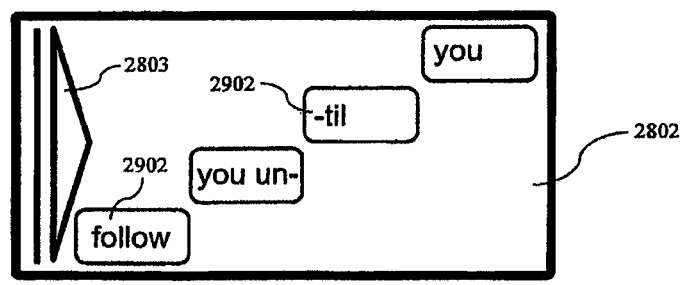
FIG. 29B illustrates an exemplary embodiment of a gaming functionality achievable with exemplary embodiments of the methods, devices, and systems described herein.

Exemplary embodiments may include an alternative form of button indicator termed a "word-button indicator". These word-button indicators may appear within a visual instructions display (e.g., 2801 or 2901). As illustrated in FIG. 29B, these word-button indicators 2902 may appear in association with section blocks 2802, for example, inside or in the vicinity of a section block. Alternatively, in exemplary embodiments the word-button indicators may be presented without substantial association with section blocks. In exemplary embodiments that use a control audio sample that includes sung and/or spoken words, a word-button indicator may be associated with specific control audio sample section corresponding to a sung or spoken word, word fragment, sequence of words or non-lexical vocables (i.e., wordless vocal sounds). As illustrated in FIG. 29B, in exemplary embodiments the text a word-button indicator is associated with may be signaled by visualized text in the vicinity of the word-button indicator. The length (from left to right) of a word-button indicator may be proportional to the duration of the sample section it is associated with.

In exemplary embodiments a word-button indicator may be paired with a digit button on an interface. As illustrated in FIG. 29B, multiple word-button indicators may be associated with a single section block 2802, and each of these word-button indicators may be paired to a different digit button. A variety of visual features may be provided to allow the user to identify which digit button is paired with a word-button indicator. For example, digit buttons and word-button indicators may be matched by location (e.g., left to right order, or up-down order), color, or by common identifying marks or symbols. Actuating a digit button may allow the control audio sample section corresponding to the paired word-button indicator to be progressed through (i.e., made audible) via the interface movements described herein. Re-actuating the same digit button may allow the same control audio sample section to be progressed through again via interface movement. In this way, the user may be provided with the opportunity to progress through control audio sample sections non-sequentially, as well as repeating sections, and avoiding some sections entirely. This functionality may be useful for making game-play more challenging, and/or adding elements of improvisation and creativity to the game-play.

In exemplary embodiments the location and/or specific visual features of a word-button indicator may indicate to the user when (relative to the progress of an ideal rate indicator) said word-button indicator's paired digit button should be pressed as part of the game. For example, these location and/or specific visual features may indicate digit button actuation timings that may contribute to the control audio sample sounding as if it is being played back at the ideal rate. Alternatively, the location and/or specific visual features of word-button indicators may indicate a musically-interesting way to rearrange the playback of a control audio sample section.

Figure 30A:
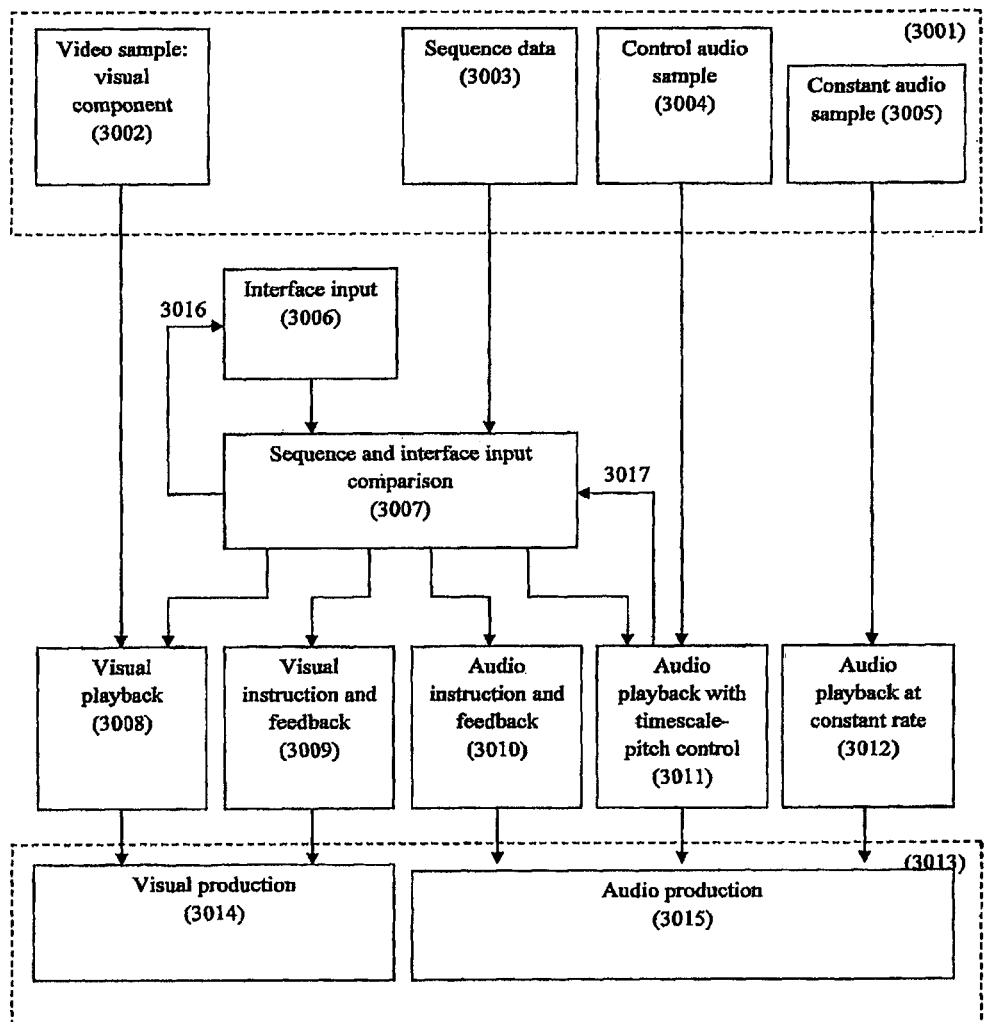
FIG. 30A is an exemplary embodiment of components involved in achieving gaming functionality.
Figure 30B:
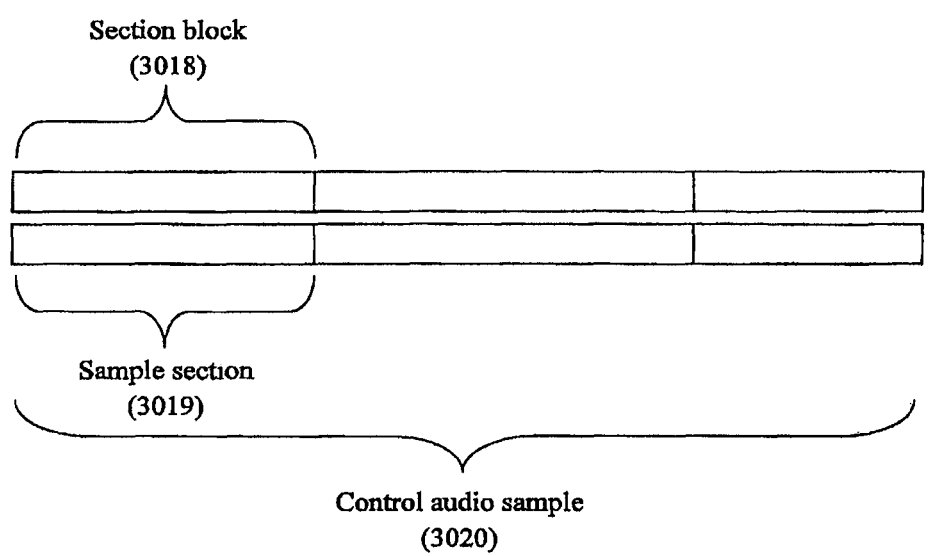
FIG. 30B is an exemplary embodiment of content involved in achieving gaming functionality.

An exemplary embodiment is illustrated in FIG. 30A. The components illustrated in FIG. 30A may be implemented by software or hardware or a combination of both. Some components may be classified as "content" 3001, in that they are materials that may be supplied to an exemplary embodiment for use during its operation. Such content may be "offline" in origin, meaning that the content may be created prior to the user operating the system. Furthermore, the content may be created with or without the involvement of some exemplary component described herein. Included in this content may be a video sample 3002, for example, the visual component of a music video (also referred to above as the video image). Additional content may include sequence data 3003. Sequence data may describe game elements that are intended to act in sync with visual and audio samples. Examples of sequence data include the timing and duration of section blocks relative to visual and audio sample content, the timing of button indicators and the interface inputs they indicate are desirable, as well as an "ideal" rate (or range of rates) of playback for the associated visual and audio sample content.

Other examples of "content" components 3001 may include a control audio sample 3004 and a constant audio sample 3005. During operation of exemplary embodiments, the control audio sample may have the rate and timing of its playback controlled by the user via an interface, while the constant audio sample may be played back at a normal constant speed. In some exemplary embodiments these samples may be associated, along with the video sample 3002, with the same piece of music. For example the control audio sample may be a vocal track from a piece of music, and the constant audio sample may be the "backing instruments" from that same piece of music. Furthermore, the video sample may be the visual component of a music video made to accompany that same piece of music.

In an exemplary embodiment illustrated in FIG. 30A another form of input that may be provided to the system originates from the user via some form of interface 3006. This interface input may include one or more continuous control signals that may direct the timing and rate of visual or audio playback or both, as well as any other feedback elements relating to playback. This interface input may also include discrete control signals capable of controlling a range of individual and independent events. In exemplary embodiments one or more interfaces that are detailed in this description may be employed to provide interface input 3006. In exemplary embodiments the continuous control signals may originate from motion, orientation and/or position sensing included in an interface, and the discrete control signals may originate from the digit buttons of an interface.

The sequence data 3003 and interface input 3006 may be provided to a processing component 3007. The sequence data may specify what and when actions should be performed on the interface by the user, while the interface input may describe what interface actions are actually occurring. Component 3007 may include the "rules" of a game in algorithmic form which allow the sequence data and interface input to be combined and compared, with the results of that comparison to be fed back to the user via subsequent components as visual or aural elements or both. For example, the continuous control signals from an interface may include continuously-updated values that represent rates of some kind and may be "gated" by sequence data. More specifically, if an interface as detailed in this description is acting as the interface for this application, a rate of vertical axis rotation with a directional sign (plus or minus, i.e., clockwise or anticlockwise) may act as a continuous control signal. If rotation occurs at the correct time and in the right direction (as specified by section blocks) the continuous control signals may be allowed to pass on subsequent components in the system. Similarly if an interface as detailed in this description is acting as the interface for this application, digit button actuation that is correctly selected and timed relative to sequence data (i.e., button indicators) may be allowed to trigger events in subsequent components in the system, and may also act as an additional required permission for continuous control signals to be passed on to these components. In exemplary embodiments digit button actuation may also be employed to trigger pitch alterations in the control audio sample.

Comparison of sequence data and interface input may also be used by component 3007 to assess the user's performance, the results of which may be fed back to the user via subsequent components as visual or aural elements or both. In exemplary embodiments where an employed interface has the capacity to provide visual, aural, or haptic feedback to the user, instructions or feedback originating from the "comparison" component 3007 may be provided to the user via these channels 3016.

When permitted by comparison component 3007, the continuous control signal may be passed on to visual and audio playback components 3008 and 3011. These components may be configured to buffer the video sample 3002 and control audio sample 3004 respectively, and may play these samples back at rates and times specified by the comparison component 3007 (through its mediation of interface input). The audio playback component 3011 may employ timescale-pitch control methods to allow the rate of playback to be varied without altering the sample's pitch. In embodiments that allow the user to control the pitch of the control audio sample, timescale-pitch control methods may be employed by component 3011 to shift the pitch of the control audio sample without affecting the sample's playback rate. Aspects of the directed audio playback performed by component 3011 may be fed back 3017 to comparison component 3007 to contribute to an assessment of the user's performance. These aspects may include the rhythmic or melodic qualities of the control audio sample as directed by the user. Alternatively, in exemplary embodiments, rhythmic and melodic features provided by the control audio sample may be extracted "offline", included as part of the sequence data 3003, and compared to interface input 3006 to contribute to a performance assessment performed by the comparison component 3007 (without requiring feedback from playback component 3011).

Similar to playback components 3008 and 3011, audio playback component 3012 may be configured to buffer the constant audio sample 3005. However, playback component 3012 may be configured to play back the constant audio sample at a constant rate, independent of input from an interface.

In exemplary embodiments, the comparison component 3007 may also pass its output on to a visual instruction and feedback generator 3009. This component may generate visual instructions to be provided to the user (e.g., the elements of the visual components display 2801 or 2901— see FIGS. 28 and 29A) as well as feedback on their actions (e.g., the section advancement indicator 2804). Comparison component 3007 may also pass its output on to an audio instruction and feedback generator 3010. This component may generate aural instructions to be provided to the user as well as feedback on their actions (e.g., digit button actuation mistimed relative to a button indicator may result in the sound effect of a vocalist failing to sing correctly).

As illustrated in FIG. 30A, in an exemplary embodiment various elements may be finally made perceivable to one or more users 3013. Visual components 3008 and 3009 may supply video and graphics data to a visual production component 3014 that can make these elements visible (e.g., a TV screen, computer monitor, projected image, etc.) or record them for viewing ata later time, or both. Similarly, audio components 3010, 3011, and 3012 may supply audio sample and sound effect data to an audio production component 3015 that can make these elements audible (e.g., speakers, headphones, etc.) or record them for listening at a later time, or both.

In exemplary embodiments that incorporate digit button presses, pressing a button may cause the pitch of the controlled audio sample to match a pitch assigned to that button. For example, if the control audio sample is of a singer's voice, pressing a digit button may cause the pitch of the singer's voice to be shifted to match the pitch assigned to the pressed button. The more buttons and additional methods of pitch selection that the interface possesses the greater the number of possible pitches the user has to choose from for shifting the pitch of the control audio sample. This pitch controlling function may be of benefit to users who would like the opportunity to improvise with the melody of the control audio sample or would like to recreate the original melody under their control. In such exemplary embodiments, visual guidance may be provided to the user to assist them in achieving specific melodies. Some embodiments of this type may also allow the user to create harmonies with the control audio sample by pressing more than one button at a time.

In exemplary embodiments the performance of the user playing the game may be assessed and this assessment may be provided to the user as feedback. One example of an assessable aspect of user performance includes the accuracy of timing the beginning of a sample-controlling movement of the interface or, in the case of a section block immediately following another section block, the accuracy of the timing in the change in the direction of movement of the interface between those section blocks.

Characteristics of the rate of movement of the interface may also be assessed by exemplary embodiments, including the consistency of the rate and how close the rate value is to that of an ideal value (the rate that is required to reproduce the control audio sample as it sounds in the original complete sample played at normal speed). Exemplary embodiments may also be configured to identify and assess user-generated rhythmic variations in the playback of the control audio sample. For example, high amplitude transients in the control audio sample may be repositioned (by the user's movements of the interface) to occur at new rhythmically-classifiable timings. Through recognizing that these new timings fit into a conventional rhythmic structure (that differs from the audio sample played continuously at the ideal rate) exemplary embodiments may be configured to increase the positivity of their assessment of the user's performance.

The accuracy of button press timings (as specified by button indicators 2809) is another example aspect of user performance exemplary embodiments may assess. Another example is the accuracy with which the user, by pressing the correct buttons at the correct times, reproduces the melody of the original control audio sample. Other embodiments may be configured to use conventional rules of composition to assess a user's improvisation with the pitch of the control audio sample.

In exemplary embodiments it may be desirable to use audio processing methods to produce specific audio effects in response to user actions. For example, an effect may be employed whereby slowing down or speeding up the control audio sample does not alter the control audio sample's pitch. Furthermore, this effect may also allow the control audio sample to be halted entirely, while remaining continuously audible, as if the sound is "frozen" in time.

Techniques for achieving the audio effects referred to above are commonly referred to as "audio timescale-pitch modification" or "audio time stretching". These techniques include two techniques termed "time domain harmonic scaling" and "phase vocoding". These techniques can produce audio from an audio track that matches the perceived pitch of that audio track played at normal speed despite the audio track being played through faster or slower relative to normal speed, or in reverse. Furthermore, these techniques allow the audio track to be halted part way through being played, with a constant sound being produced that is representative of the sound at that audio track position when the audio track is being played through at normal speed.

These audio time stretching techniques can be incorporated into the hardware or software of exemplary embodiments by persons skilled in the art. By processing the control audio sample in the manner described above the listener may perceive the sample's sound as having a quality of consistency regardless of how fast or slow the control audio sample is played through, or whether it is played in reverse, or halted altogether. Described another way, this audio processing contributes to the perception that, within the audio sample, time is being sped up, slowed down, reversed, or halted altogether.

In exemplary embodiments where button presses on an interface are used to control the pitch of a control audio sample (as defined above) the system may be configured to pre-process the control audio sample prior to operation. If the control audio sample is monophonic (for example a human voice) and its pitch varies little throughout its duration it may be desirable to tune the entire sample to a single pitch. If the range of pitches within the control audio sample is large it may be desirable instead to tune the sample to a sequence of constant pitches, with each constant pitch at a frequency centered on the pitch frequencies it is replacing. If the control audio sample is polyphonic the pitch processing may be configured to make each pitch in the polyphony continuous for the duration of the sample. In each case the processed control audio sample is passed on with data specifying which pitch (or pitches) the sample is tuned to and, if the pitch varies, at which sample time positions the pitch changes occur.

In exemplary embodiments that involve manipulation of the pitch of a control audio sample, use of the pre-processing step described above may reduce the computational load of pitch manipulation during operation. The pre-processed control audio sample will have more or completely constant pitch and the pitch value or values will already been known. When a new button press is received the pitch difference between the current pitch of the processed control audio sample and the desired pitch (or pitches) may be calculated. This pitch difference may then be used to shift the current pitch of the audio track to the desired pitch, subject to any pre-set pitch glide effects that may be utilized. Some pitch shifting methods incorporate a technique termed "formant preservation", which is described in more detail elsewhere in this application. Exemplary embodiments may include formant-preserving pitch shifting methods, since these can assist in making shifted pitches sound more "natural" or less "artificial" to a listener. Pitch shifting techniques, including those that incorporate formant preservation, can be incorporated into the hardware or software of exemplary embodiments by persons skilled in the art.

Exemplary embodiments may include systems whereby the user can operate an interface to manipulate one or more audio streams. These audio streams may be pre-recorded, or be captured in real-time via a mechanism designed to assimilate information for the purpose of sound creation and/or sound amplification (e.g., a microphone or a guitar pick-up), or be produced in real-time by analog or digital synthesis. Exemplary embodiments may use one or more of the exemplary interfaces detailed herein. Exemplary embodiments may include the use of interface orientations and/or motions to provide one or more substantially continuous values, and/or digit buttons to provide one or more discrete values.

In exemplary embodiments other interfaces that provide suitable input to the system may be used. Appropriate input may include input that can provide one or more discrete input values (for triggering individual pitches or notes, for example) and/or one or more substantially continuous values (e.g., a number that may take values between 0 and 100, and can perform the same role as, for example, data derived from a sensor component that measures angular rotation rate or orientation around a vertical axis). For example, a MIDI keyboard equipped with a MIDI control wheel may provide discrete output events via the keyboard keys and substantially continuous values via the MIDI control wheel. In another example, moving or orienting a motion, orientation, and/or position sensitive mobile device (like a cell phone, PDA, hand-held video game device, or tablet computer, etc.) may provide one or more substantially continuous values suitable for use in exemplary embodiments. In addition, moving a finger across a touch sensitive screen may also provide one or more substantially continuous values, while contacting specific points on said touch screen may elicit discrete output events. Furthermore, some or all of the system of exemplary embodiments described herein may be implemented on a mobile computing device (e.g., cell phone, PDA, hand-held video game device, or tablet computer, etc.), video game platform (e.g., the Microsoft Xbox, Sony Playstation, or Nintendo Wii, etc.)) or other computer, either in association with, or independent from, the exemplary interfaces described herein.

In exemplary embodiments a user may capture their voice or another's voice via one or more microphones and manipulate the vocal sound via an interface. An example of manipulation may be to alter the pitch of the vocal sound. Exemplary embodiments may make audible or record more than one audio stream. For example, one audio stream may be a vocal sound in a non- or partially-manipulated state (which will be referred to as the "source" audio stream), while another may be a duplicate or substantially duplicate manipulated version of the same vocal sound (which may be referred to as the "duplicate audio stream"). If exemplary embodiments of this type used pitch-manipulation of one or more duplicate audio streams, then the source audio stream may act in concert with the duplicate audio stream(s) to create harmonies. In such a system the pitch of a duplicate audio stream may be controlled by the user via the digit buttons on an interface. Additional mechanisms for pitch selection detailed elsewhere in this description may also be employed. Additional sensor data from an interface may also be used to manipulate the audio streams, for example, controlling the volume of a duplicate audio stream. In addition to the human voice, any other form of audio derived from acoustic oscillation or synthesis may act as a source audio stream.

For source audio streams that are monophonic (i.e., consisting of only one pitch at a time), exemplary embodiments may be configured to produce one duplicate audio stream for each actuated digit button. In such a configuration each digit button may also specify a pitch or pitch change amount the duplicate audio stream it elicits should be shifted to or by. This configuration would allow the creation of multi-part harmonies made up of a source audio stream and one or more differently-pitched duplicate audio streams. Exemplary embodiments may be configured to not make the source audio stream audible.

For audio streams that are polyphonic (i.e., consisting of more than one pitch at a time), the system may be configured to produce one duplicate audio stream for each actuated digit button. Additionally, in exemplary embodiments, the system may be configured to shift some or all the simultaneous pitches in an audio stream by a single value, with this value being specified by actuation of one or more digit buttons. For example, if a source audio stream contained two pitches C4 and E4, then selecting a pitch change value of five semitones higher (e.g., via one or more digit buttons on an interface) may result in a duplicate audio stream having the pitches F4 and A4.

Exemplary embodiments may also be configured to respond to digit button actuation by shifting pitch by an amount relative to the current pitch of an audio stream. This configuration may be referred to as the "relative pitch selection method". Other exemplary embodiments may be configured to respond to digit button actuation by shifting pitch to a specific absolute pitch (that may be referred to as the "target pitch"). This configuration may be referred to as the "absolute pitch selection method". In either configuration the pitch of the source or duplicate audio streams or both may be detected.

In the relative pitch selection method the pitch shift amount and direction specified by digit button actuation may be referred to as an "interval". This interval may be compared to the pitch of the duplicate audio stream (prior to pitch shifting) in order to calculate the target pitch (the pitch that is to be achieved by the pitch shift). In either pitch selection method the pre-shift pitch of the duplicate audio stream may be compared to the target pitch in order to calculate the required pitch shift factor. Using either the relative or absolute pitch selection method, more than one digit button may be actuated at one time, thereby producing multiple duplicate audio streams with each stream being produced with its own pitch (as specified by the corresponding digit button).

The relative pitch selection method may be especially useful for interfaces that incorporate a small number of digit buttons. For example, the most commonly used pitch intervals above the root pitch (the pitch the interval is defined against, commonly referred to as the "root note") are a "3rd", "4th", "5th", "6th", and "unison" (same pitch as the root pitch). These intervals are commonly defined relative to diatonic musical "scales" or "keys" (e.g., major or minor scales). In this example each digit button may be configured to elicit a duplicate audio stream shifted by one of these intervals (while a root pitch is produced by the source audio stream). By utilizing the octave selection methods detailed elsewhere in this description, an interface may be able to produce the pitches associated with these intervals in octaves above or below the root pitch. For example, if the intervals are defined relative to C major, the source audio stream is producing the pitch C4, and the user actuates a digit button corresponding to an interval of a 3rd higher, then a duplicate audio stream of the source audio may be produced that has a pitch of E4. However, if the user actuates a digit button corresponding to an interval of a 3rd, while at the same time selecting a lower octave, then a duplicate audio stream of the source audio may be produced that has a pitch of E3. In exemplary embodiments, an interface similar to that illustrated in FIG. 26A may be used in conjunction with a relative pitch selection method, however, other interface designs may also be used in conjunction with this method. In exemplary embodiments, any combination of intervals may be included to be triggered by any number and arrangement of digit buttons. Furthermore, multiple digit buttons may be actuated at one time, thereby producing multiple duplicate audio streams at different pitches.

For exemplary interfaces with more than five digit buttons the range of intervals available to the user may be larger. For example, an interface with nine digit buttons may be set to elicit intervals including (relative to the root note) a 6th below, a 5th below, a 4th below, a 3rd below, a unison, a 3rd above, a 4th above, a 5th above, and a 6th above. In exemplary embodiments, an interface similar to that illustrated in FIG. 26B may be used in conjunction with a relative pitch selection method, however, other interface designs may also be used in conjunction with this method.

For exemplary embodiments that include interfaces with more than five digit buttons, the use of an absolute pitch selection method (see above) may be beneficial. For example, an interface with seven or more buttons may be able to access the pitches of a diatonic scale (e.g., a major or minor scale). In other words, the system may accept a user's instruction to set the useable collection of pitches to, for example, the pitches in a C natural minor scale (C, D, Eb, F, G, Ab, and Bb). Any number of different scales with different tonic pitches (first pitch of the scale) may be provided for the user to choose from. In this example each of the digit buttons may be set to elicit one of the pitches in the C natural minor scale. Additionally, by utilizing the octave selection methods detailed elsewhere in this description the interface may also be used to choose which octave each pitch should be produced in. As with the relative pitch selection method, in the absolute pitch selection method multiple digit buttons may be actuated at one time, thereby producing multiple duplicate audio streams at different pitches.

In conjunction with the absolute pitch selection method, exemplary interfaces with more than seven digit buttons may have a larger number of pitches assigned to them. For example, if the user chose the scale D major, an interface with eight digit buttons may include the pitches D4, E4, F#4, G4, A4, B4, C#5, and D5. In another example, if the user chose the scale D major, an interface with fifteen digit buttons may include the pitches D4, E4, F#4, G4, A4, B4, C#5, D5, E5, F#5, G5, A5, B5, C#6, and D6. An example of an arrangement similar to this is shown in the bottom panel of FIG. 12.

Exemplary embodiments that include interfaces with twelve or more digit buttons may be configured to use the absolute pitch selection method in conjunction with a chromatic arrangement of pitch assignments on the digit buttons. For example, each of the digit buttons may be set to elicit one of the pitches C4, Db4, D4, Eb4, E4, F4, Gb4, G4, Ab4, A4, Bb4, or B4. Exemplary interfaces with more than twelve digit buttons may include a greater range of pitches. For example, an interface with fifteen digit buttons may use the arrangement C4, Db4, D4, Eb4, E4, F4, Gb4, G4, Ab4, A4, Bb4, B4, C5, Db5, and D5. An example of this kind of arrangement is shown in the top panel of FIG. 12. By utilizing the octave selection methods detailed elsewhere in this description, the interface may also be used to choose which octave each pitch should be produced in.

For exemplary embodiments that utilize the absolute method of pitch selection, pitches may be assigned to the digit buttons, and the system may provide the user with the option of varying the assignment of pitches to the digit buttons.

Exemplary embodiments may include pitch correction on either the source or duplicate audio streams or both. For example, embodiments of this kind may be configured to correct any pitch that lies too far between the pitches of a chromatic scale, a correction sometimes referred to as "pitch quantization". Such "off-center" pitches are sometimes described by listeners as being "sharp" or "flat" and may be undesirable in a musical context. In exemplary embodiments, if an audio stream included a tone with a pitch corresponding to a fundamental frequency of 445 Hz, the system may be set up to shift the frequency of this tone to 440 Hz (the frequency of pitch A4). This is because 445 Hz is closer to 440 Hz than 466 Hz (the frequency of pitch A#4). Because the relationship between a change in pitch frequency and perceived pitch is non-linear, the term "closer" is used here in reference to perceived pitch.

Exemplary embodiments may be configured to perform pitch correction on a source audio stream, either before it becomes a duplicate audio stream or before it is made audible or recorded. Exemplary embodiments may be configured to perform pitch correction on one or more duplicate audio streams only. Pitch correction of a duplicate audio stream may be desirable if it has "inherited" "sharp" or "flat" pitched sounds from its source audio stream. Pitch correction of duplicate audio streams may be integrated into the pitch shifting functionality described thus far, whereby the pitch shifting involved in pitch correction and reaching the target pitch is performed in the same processing step. For example, if the source audio stream is producing a tone with a pitch corresponding to a frequency of 445 Hz (a "sharp" A4 pitch) and the user directs the system (via an interface) to produce a corresponding duplicate audio stream that is shifted up by one octave, pitch correction may be utilized whereby the target pitch frequency is calculated to be 880 Hz rather than 890 Hz (a "sharp" A5 pitch).

Exemplary embodiments may prevent certain pitches from being produced at all, a feature that will be referred to as "pitch scale filtering". For example, the user may choose to constrain some or all pitches produced by an exemplary embodiment to those found in C major, or D minor, or any other musical scale. This constraint may be especially useful in exemplary embodiments where a relative pitch selection method is used, where each digit button on an interface may be used to elicit a specific interval.

An example of the pitch scale filtering described above would be where the user is provided with a choice of tonic pitch and musical scale, (e.g., major, minor, and so on) and this scale may be used to filter the pitches that can be produced by the filtered audio stream. In such a configuration, pitches that are not present in the chosen scale may be shifted to the closest pitch within that scale. In other words, if the user chose the scale C major, then the set of "permitted" pitches would be C, D, E, F, G, A, and B (in any octave). If an audio stream contained the pitch D# this pitch may be shifted to either D or E. As described for the pitch correction method above, the direction of the shift may be determined by the frequency of the pitch in the audio stream. For example, if the frequency of the pitch were closer (in the sense of perceived pitch) to the pitch center of D than E then the audio stream's pitch may be shifted to D.

In exemplary embodiments the pitch scale filtering method may be configured to select target pitches according to intervals specified by a diatonic scale. An example of such a configuration, which also incorporates the relative pitch selection method, will be described below. First the user may choose to employ a specific musical scale for use with the pitch scale filter, for example, C major (comprising the pitches C, D, E, F, G, A, and B). In this example a source audio stream may be producing a C-pitched tone and the user may have, via the interface, specified that a duplicate audio stream should be produced at a pitch a "3rd" higher than the tone in the source audio stream. Within the scale of C major a 3rd higher than C is the pitch of E, therefore E would become the target pitch. However, if the pitch of the source audio stream changed to D, within the scale of C major a 3rd higher than D is F. Thus F would become the target pitch. Such interval-based rules for selecting target pitches can be used in conjunction with a variety of scale types and with a variety of tonic pitches. Any number of context-specific rules can be included in the pitch scale filter's configuration, allowing it to create musically-appropriate harmonic pitch intervals for a variety of musical scales and for a variety of interval commands elicited by digit buttons on an interface.

Exemplary embodiments that use a pitch scale filter similar to that described above may restrict the types of intervals that can be created by the system. For example, the pitches C and E form a "major 3rd" (four semitones), while the pitches D and F form a "minor 3rd" (three semitones). The system may allow the user to specify that certain intervals, like a minor 3rd, are not permitted. In this example the system may be configured to silence the duplicate audio stream as long as shifting its pitch would cause a minor 3rd interval harmony (D and F) to be created.

Exemplary embodiments may utilize additional output data from an interface. For example, the system may be configured to use measurements from an angular rate sensor to control aspects of manipulation of one or more duplicate audio streams. One example of this manipulation may be to control the volume of one or more duplicate audio streams with the rate of an interface's vertical (yaw) axis rotation (where the user's forearm is approximately parallel to the ground plane and the clockwise or anticlockwise movement of the forearm also runs approximately parallel to the ground plane). A compound movement of an interface (e.g., that includes rotational and translational movement) would therefore provide usable control signals as long as that compound movement included vertical axis rotation. In a configuration of this kind, increasing the rate of vertical axis rotation may increase the volume (possibly from a non-audible starting point) of one or more duplicate audio streams.

Exemplary embodiments may utilize other or additional types of interface movement/orientation as control input, and may utilize measurements coming from other sensor types. For example, with the user's forearm approximately parallel to the ground, the "roll" angle of an interface (as controlled by, in the neutral operating position, forearm rotation and measured by an acceleration sensor 814) may be used to control the volume of additional duplicate audio streams. In this example, if the relative pitch selection method (see above) was in use and a duplicate audio stream at an interval of a 3rd above was elicited by the user, then rolling the interface such that the thumb is moved to face upwards may cause an additional duplicate audio stream to be made audible at a pitch that is a 3rd below the pitch of the source audio stream.

Exemplary embodiments may utilize interface-based portamento control and/or vibrato control to modulate the pitch of one or more duplicate audio streams, in a manner similar to that described elsewhere in this specification. Exemplary embodiments may utilize interface-based contextual control and directional control including oscillation rate control effects employing frequency filters and/or volume gates, in a manner similar to that described elsewhere in this specification. As would be understood by a person skilled in the art, a large variety of additional alternative audio effects modulating one or more duplicate audio streams may be configured to be controlled via an interface, and this should not be considered a complete list.

Exemplary embodiments described thus far may utilize real-time pitch detection, that is, the estimation of the pitch or fundamental frequency of an audio signal as it is perceived by a listener. The term "real-time" is used here in the sense that the audio stream processing is taking place approximately as the stream is being recorded or played back. Numerous methods are available for performing real-time pitch detection and can be implemented by persons skilled in the art.

Exemplary embodiments described herein may employ real-time pitch shifting. In the case of an absolute pitch selection method, as a new digit button actuation event is received the pitch difference between the corresponding target pitch and pitch of the duplicate audio stream (prior to shifting) may be calculated. This difference may then be used to calculate the required pitch shift factor.

In the case of a relative pitch selection method, as a new digit button actuation event is received the pitch of the duplicate audio stream (prior to shifting) and the selected interval may be used to calculate the target pitch. Alternatively, pitch shifting may be achieved by using a fixed shift factor specific to each interval. However, calculating the post-shift pitch may be useful in conjunction with pitch scale filtering for determining if a post-shift pitch would fall within the permitted pitch set. This may ensure that only pitches "permitted" by the pitch scale filter may be produced by pitch shifting. After filtering, the resulting target pitch may be used in calculating the required pitch shift factor.

For both the absolute and relative methods of pitch selection, once the pitch shift factor has been finalized it may then be used to shift the current pitch of a duplicate audio stream, subject to any pre-set pitch glide effects that may be employed by the system. Pitch correction may be performed before, after, or as part of the main pitch shifting process.

Some pitch shifting methods incorporate a technique termed "formant preservation" which is described in more detail elsewhere in this application. Exemplary embodiments may include formant-preserving pitch shifting methods, since these can assist in making shifted pitches sound more "natural" or less "artificial" to a listener. Real-time pitch shifting techniques, including those that incorporate formant preservation, can be incorporated into the hardware or software of exemplary embodiments by persons skilled in the art.

Figure 31:
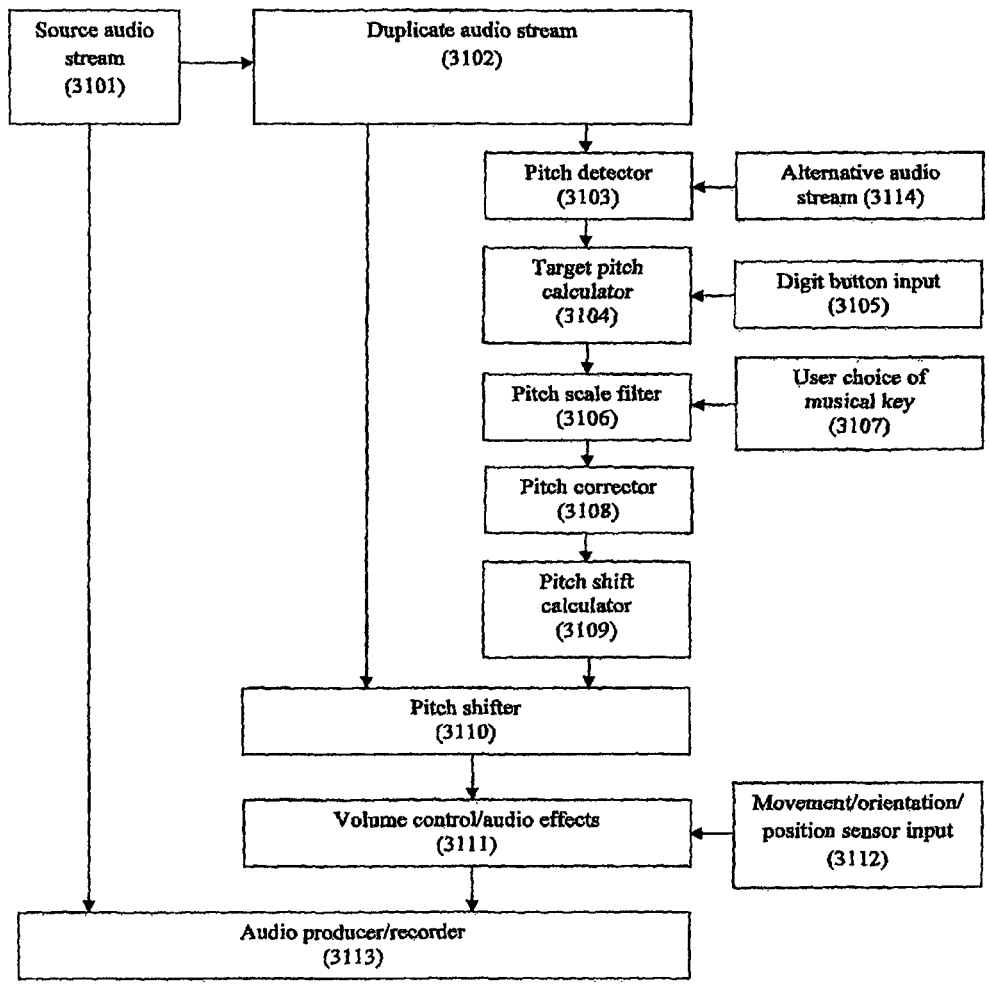
FIG. 31 illustrates an exemplary embodiment of components involved in achieving audio control functionality.

A diagram representing the processing components involved in exemplary embodiments is shown in FIG. 31. A source audio stream 3101 may be reproduced as a duplicate audio stream 3102. The duplicate audio stream's pitch (or pitches) may be estimated by a pitch detector 3103 and this "pre-shift" pitch estimate may then be passed on to a target pitch calculator 3104. In exemplary embodiments that utilize a relative pitch selection method, input from the digit buttons 3105 may be combined with the pitch estimate to determine the target pitch. The target pitch (or pitches) and the pre-shift pitch estimate may then be passed on to a pitch scale filter 3106. The digit button input may also include other information relevant to calculating the target pitch, for example, input from an interface's octave selection mechanism (as detailed elsewhere in this description).

Continuing the description of FIG. 31, a pitch scale filter 3106 may be used to determine if the target pitch belongs to the set of "permitted" pitches (e.g., a scale or key) previously chosen by the user 3107. This choice of musical scale may be made by the user prior to engaging in the audio control process, and may be made via the interface (for example by selecting an option on a video display using the digit buttons) or another user interface included in the system. If the target pitch does belong to the permitted set of pitches it may be passed on unaltered to the next system component (along with the pre-shift pitch estimate). If it does not belong to the set, the pitch scale filter may employ one or more algorithms (see above for description) to decide what the altered target pitch should be. In exemplary embodiments that employ a relative pitch selection method, target pitches may be selected according to interval choices specified by a diatonic scale (see above for description). Once finalized, the target pitch may then be passed on to the next system component (along with a pre-shift pitch estimate).

Continuing the description of FIG. 31, a pitch corrector 3108 may be used to identify a "sharp" or "flat" target pitch and correct its value (sometimes referred to as "pitch quantization"). In exemplary embodiments that utilize an absolute pitch selection method the target pitch calculator 3104, the pitch scale filter 3106, or both, may not be employed. Instead digit button input 3105 and a pre-shift pitch estimate may be provided directly to a pitch corrector 3108. In this case each digit button may correspond to a specific target pitch (subject to any octave selection mechanism). After any required pitch correction the target pitch may be passed on, along with a pre-shift pitch estimate, to a pitch shift calculator 3109. This pitch shift calculator may compare the pre-shift pitch estimate with the target pitch and calculate the shift amount required to make the pitch of the former match that of the latter. This calculated "pitch shift factor" may then be passed on to a pitch shifter 3110 component, which then shifts the duplicate audio stream as directed by the pitch shift factor. The duplicate audio stream may then be subjected to additional modulation 3111 (e.g., volume control) as directed by sensor input from an interface 3112. Finally, both source and duplicate audio streams may be made audible (or recorded for future use), subject to any additional effects (e.g., compression, reverb, etc.), by an audio producer/recorder component 3113.

In exemplary embodiments of the system illustrated in FIG. 31, the pitch detector 3103 may receive an audio signal via components separate to those that provide an audio signal to the pitch shifter 3110. This alternative audio stream 3114 may originate from the same source (e.g. a singer's voice) but the method of transducing the source into a usable signal may be different. For example, the alternative audio stream may be generated through signals obtained from one or more contact microphones (or any other device that measures vibration through direct contact) worn on the singer's body. For example, a contact microphone (also referred as a piezoelectric microphone) may be attached to a singer's neck, chest, or head (e.g. in contact with bone inside the outer ear). These contact microphone signals may undergo amplification and frequency filtering prior to being supplied to the pitch detector 3103. In this exemplary embodiment the pitch detector may not require input from the duplicate audio stream 3102 because the signal for measuring the pitch of the sound source (e.g. a singer's voice) may be supplied by the alternative audio stream 3114. However, while the calculation at stage 3109 of the required pitch shift may be based on signals from the alternative audio stream, the actual audio that would undergo pitch shifting may be that of the duplicate audio stream. The advantage of this exemplary embodiment may be that the alternative audio stream 3114 carries much less signal from sounds extraneous to that of the desired sound source (e.g. unwanted sounds emanating from other musical instruments), due to the low sensitivity of the alternative transduction method (e.g. contact microphone) to airborne vibration. This 'cleaner' signal may allow a more accurate measurement of the pitch of the desired sound source by the pitch detector 3103.

Figure 32:
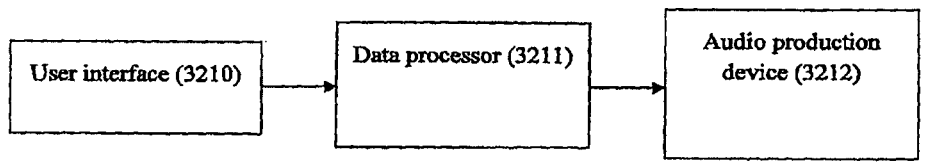
FIG. 32 illustrates an exemplary embodiment of components involved in achieving gradated pitch control functionality.

Exemplary embodiments may allow the user to exert substantially gradated, as well as discrete, control over the pitches of sounds. As shown in FIG. 32, exemplary embodiments may comprise three components. The first component may be a user interface 3210, through which the user may create control signals that are used to direct the audio effects. Exemplary embodiments may use one or more of the exemplary interfaces described herein. Exemplary embodiments may include the use of interface orientations and/or motions to provide one or more substantially continuous values, and/or digit buttons to provide one or more discrete values.

In exemplary embodiments other interfaces that provide suitable input to the system may be used. Appropriate input may include input that can provide one or more discrete input values (for triggering individual pitches or notes, for example) and/or one or more substantially continuous values (e.g., a number that may take values between 0 and 100, and can perform the same role as, for example, data derived from a sensor component that measures angular rotation rate or orientation around a vertical axis). In another example, a MIDI keyboard equipped with a MIDI control wheel may provide discrete output events via the keyboard keys and substantially continuous values via the MIDI control wheel. In another example, moving or orienting a motion, orientation, and/or position sensitive mobile device (like a cell phone, PDA, hand-held video game device, or tablet computer, etc.) may provide one or more substantially continuous values suitable for use in exemplary embodiments. In addition, moving a finger across a touch sensitive screen may also provide one or more substantially continuous values, while contacting specific points on said touch screen may elicit discrete output events. Furthermore, some or all of the system of exemplary embodiments described herein may be implemented on a mobile computing device (e.g., cell phone, PDA, hand-held video game device, or tablet computer, etc.), video game platform (e.g., the Microsoft Xbox, Sony Playstation, or Nintendo Wii, etc.) or other computer, either in association with, or independent from, the exemplary interfaces described herein.

The second component in exemplary embodiments may be a data processor 3211 which may receive control signals from the user interface, convert these control signals into audio data, and pass on the processed information to the audio production device 3212. The audio production device may either make the audio data perceivable to the user and/or their audience via conventional methods, or may record these data for later use. Methods for presenting the audio information may include audio speakers, headphones, etc. The data processor 3211 may also employ components for receiving commands from the user that modify its overall operation, providing the option to turn a specific modulatory sound effect on or off, for example.

The following is a summary of an audio effect achieved by some exemplary embodiments, which may be to allow the user to trigger specific musical sounds and to control the pitch of these sounds in a gradated manner. The user interface may employ components to measure its orientation and movement within multiple axes in space. Exemplary embodiments may use an interface's orientation or rotation around the vertical (yaw) axis to control said gradated pitch shifting of a musical sound (however, orientation in either the pitch or roll axes may be used for this purpose instead). A data processor 3211 (see FIG. 32) may be configured to produce a variety of different musical sound data to be modulated by the pitch shift mechanism (and then made audible by the audio production device 3212). For example, exemplary embodiments may include the capacity to produce musical sounds that have the sound qualities of an electric slide guitar.

In exemplary embodiments a user interface may be employed by the user to activate ("trigger") and/or deactivate the musical sound generated by the data processor 3211 (see FIG. 32) at specific pitches (audio frequencies). For example, digit buttons on an interface may be operated by a user's digits to activate and deactivate said sounds. When two pitches (or "notes") are sequentially-triggered, only the first triggered note may produce a sound. However, when the orientation of the interface around the vertical (yaw) axis is changed continuously in either direction (while both of the notes on the interface may remain activated), the pitch of the sound may shift gradually from the pitch of the first triggered note to the pitch of the second triggered note. The yaw orientation at the moment the second note was triggered may be termed the "start point" of the total rotation required to reach the second note's pitch ("end point"). The total rotation (in either direction from the start point) around the yaw axis that may be required to reach the pitch of the second note may be configured to be proportional to the pitch difference between the first and second notes. The total required rotation may also be subject to a pre-set value chosen by the user to scale the required rotation to suit their preference.

For simplified use, the user may be able to specify that once the required extent of rotation (to shift from the first to the second note) has been reached the pitch will remain at the pitch of the second note despite continued rotation, unless the user rotates back towards the start point (the yaw orientation at the time the first note was triggered), thereby shifting the pitch back to that of the first note. If the user rotates the interface back from reaching the pitch of the second note (the end point) towards the start point, the system may be configured such that rotating past the start point will not shift the pitch further beyond that of the first triggered note.

The user may be given the option of allowing additional effects to occur once the pitch of the second note is reached. For example, once this end point is reached a tremolo effect that is controlled by the velocity of rotation around the pitch axis may be automatically activated. As would be apparent to a person skilled in the art, a large number of different audio effects may be assigned to the various control signals of the user interface, providing the user with a greater range of control over the produced musical sounds.

Once the pitch of the second note is reached the user may un-actuate the first note on the interface (while keeping the second note active) and trigger a third note. Rotation around the yaw axis in either direction may then gradually shift from the pitch of the second note to that of the third note. Obviously this process may be carried on ad infinitum, starting with the second note being un-actuated and a fourth note being triggered and so on. In exemplary embodiments the user may have access to a configuration whereby actuating a digit button on an interface may trigger more than one sound, each with its own pitch. These pitches may have harmonic interval relationships and rotation around the yaw axis may cause the harmonic set of "first" pitches to shift in unison to reach a harmonic set of "second" pitches.

In exemplary embodiments where both left- and right-handed interfaces are used by a user at the same time, the pitch shifting described above may be controlled via a comparison of the motion and/or orientation of the two interfaces. For example, actuation of a button on one interface may select the first note (start point) and actuation of a button on the other interface may select the second note (end point). If the user begins by holding the two interfaces at different orientations (e.g., on the lateral or vertical axes), then reducing the orientation difference between them may be configured to gradually shift the pitch of the start note to that of the end note. Alternatively, increasing the orientation difference between the two interfaces may be configured to gradually shift the pitch of the start note to that of the end note.

In a similar exemplary embodiment to that described above a "portamento effect" may be achieved that does not require more than one digit button to be actuated simultaneously. In this example, the start note and end note of the pitch shift may be continually redefined based on the order in which digit buttons are actuated. For any digit button actuation that occurs after the first actuation in a session of use, the pitch of the musical sound that is elicited may correspond to the pitch assigned to the previously-actuated digit button. By then rotating the interface around its vertical (yaw) axis either left or right the pitch of the elicited sound may gradually shift to the pitch assigned to the currently-actuated digit button, with said pitch shift occurring at a rate proportional to the rate of rotation. To illustrate this with an example, if the distal thumb button is assigned a pitch of C and the distal index finger button is assigned a pitch of D (and also assuming that at least one digit button actuation has already occurred), then actuating the distal thumb button may elicit a musical sound with the pitch of the previously actuated digit button. By then rotating the interface left or right around the vertical axis while maintaining actuation of the distal thumb button the pitch of the musical sound may gradually shift to C. Once the pitch of C has been reached the system may be configured to prevent further pitch shifting to occur as a consequence of continued vertical axis rotation in the same, or both, directions. Regardless of whether the distal thumb button is de-actuated or not, actuating the distal index finger button may then elicit a musical sound with a pitch of C, and then rotating the interface left or right around the vertical axis, while maintaining actuation of the distal index finger button, the pitch of the musical sound may gradually shift to D. This process may be continued indefinitely, allowing the user to play musical sounds with a portamento effect. In this exemplary embodiment the system may also be configured to modulate the activation and/or speed of such a portamento effect via one or more other control parameters. For example, rotating the interface beyond a certain angle around the longitudinal (roll) axis may activate the portamento effect, and rotating beyond this angle may modulate the proportionality between the rate of rotation around the vertical (yaw) axis and the rate of the pitch slide (e.g. rotating further beyond the roll axis threshold may decrease the rate of the pitch slide relative to the vertical axis rotation rate).

Exemplary embodiments described herein may employ real-time pitch shifting. The method by which pitch shifting is achieved may depend of the nature of the audio to be shifted. For example, if the audio is the product of hardware or software synthesis, pitch shifting may be achieved by changing actual synthesis parameters (i.e., whereby the interface is used to control the pitch or pitches at which the audio is synthesized in an ongoing process). In another example, if the audio is derived from recorded audio samples then real-time pitch shifting methods may be employed. Some pitch shifting methods, including those that employ "formant preservation", are described in more detail elsewhere in this application, and can be incorporated into the hardware or software of exemplary embodiments by persons skilled in the art.

The data processing required for the functions described above may be performed by the data processor 3211 (see FIG. 32). In exemplary embodiments of this invention the data processor may be a personal computer that communicates with the user interface either wirelessly or via a cable connection. The required data processing and audio data generation described here are achievable by conventional methods that may be implemented in software, hardware, or a combination of the two, and are hence achievable by persons skilled in the art.

In exemplary embodiments the orientation, motion, or position of an interface may be used to control other aspects of sound in addition to pitch. For example, orientation or motion around the yaw, pitch, or roll axes may be assigned to modulatory sound effects. The velocity of rotation around the yaw axis, for example, may be assigned to modulate the musical sound with a "wah-wah" effect, similar to the effects processing that takes place in "wah-wah" effects pedals (controlled by motion of the player's foot) used to process electric guitar signals. In this example, the larger the rotation velocity the stronger the wah-wah effect may be configured to become.

Figure 33:
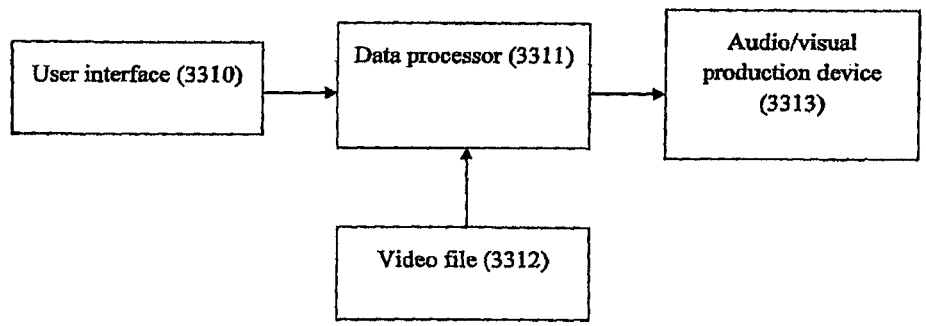
FIG. 33 illustrates an exemplary embodiment of components involved in manipulating audio and/or visual content.

Exemplary embodiments may allow the user to control recorded or synthesized audio; or the visual component of recorded video or synthesized visual data; or both. As illustrated in FIG. 33, exemplary embodiments may comprise four components. One of these components may be a user interface 3310, through which the user creates control signals that may be used to direct audio and/or visual effects generated by the system. Exemplary embodiments may use one or more of the exemplary interfaces detailed elsewhere in this description. Exemplary embodiments may include the use of interface orientations and/or motions to provide one or more substantially continuous values, and/or digit buttons to provide one or more discrete values.

In exemplary embodiments other interfaces that provide suitable input to the system may be used. Appropriate input may include input that can provide one or more discrete input values (for triggering individual pitches or notes, for example) and/or one or more substantially continuous values (e.g., a number that may take values between 0 and 100, and can perform the same role as, for example, data derived from a sensor component that measures angular rotation rate or orientation around a vertical axis). For example, a MIDI keyboard equipped with a MIDI control wheel may provide discrete output events via the keyboard keys and substantially continuous values via the MIDI control wheel. In another example, moving or orienting a motion, orientation, and/or position sensitive mobile device (like a cell phone, PDA, hand-held video game device, or tablet computer, etc.) may provide one or more substantially continuous values suitable for use in exemplary embodiments. In addition, moving a finger across a touch sensitive screen may also provide one or more substantially continuous values, while contacting specific points on said touch screen may elicit discrete output events. Furthermore, some or all of the system of exemplary embodiments described herein may be implemented on a mobile computing device (e.g., cell phone, PDA, hand-held video game device, or tablet computer, etc.), video game platform (e.g., the Microsoft Xbox, Sony Playstation, or Nintendo Wii, etc.) or other computer, either in association with, or independent from, the exemplary interfaces described herein.

In exemplary embodiments an additional component may be a data processor 3311 which may receive audio and visual information from a video sample 3312 and control signals from an interface. The data processor may process the information from these two sources and pass on the processed information to an audio/visual production device 3313. In exemplary embodiments the data processor 3311 may be a personal computer that communicates with the interface either wirelessly or via a cable connection or equivalent method. The audio/visual production device may make the audio and/or visual video information perceivable to the user and/or their audience via conventional methods, or record this information for later use. Methods for presenting the video information may include a television, or computer screen, or light projector, etc. Methods for presenting the audio information include audio speakers, or headphones, etc. The data processor 3311 may also possess the capacity to receive commands from the user that modify its overall operation, providing the option to turn a specific modulatory sound effect on or off, for example.

The following illustrates an audio/visual effect achieved by exemplary embodiments. The interface may possess the capacity to measure its orientation and movement within multiple axes in space. In exemplary embodiments the interface's orientation around the yaw axis (or "vertical axis") may be used to control the video sample's "track position" (however, orientation in either the pitch or roll axes may be used for this purpose instead). The term "track position" refers the part or point in a sample that is currently being made audible or "played" and for the visual and audio components of a video sample a track position value may refer to a matching position in the two components. In the yaw control example, by moving between two pre-selected limits within the yaw rotation range of the interface, the video track position may be progressed gradually from beginning to end for the visual and/or audio components of the video. For example, if a video sample has 25 frames per second with a duration of 6 seconds, it will contain 150 frames in total. If the interface's control range for yaw rotation is pre-set by the user to be north to north-east, then rotating the interface from north to north-east would gradually switch through the video frames 0 to 150 (i.e., from 0 seconds to 6 seconds). Conversely, rotating the interface from north-east to north would gradually switch through the video frames 150 to 0. Thus the user may choose to move in either direction through the video and at any rate. This interface-based control means they may also pause at any frame within the video, and change direction of movement through the video at any frame. The audio component of a video sample may also have its playback controlled in the same way, in sync with the visual component. In the example above, the system may be configured such that moving beyond the two pre-selected limits within the yaw rotation range of the interface (i.e., from north towards north-west or from north-east towards east) may have no further effect on the visual and audio components of the video. Exemplary embodiments that use the interface's orientation around the yaw axis to control a video sample's track position may do so using measurements from one or more angular rate sensors or one or more magnetic field sensors or a combination of the measurements from the two sensor types. In exemplary embodiments where one or more angular rate sensors are used in the absence of magnetic field sensing, track position control may be based on angular distance travelled rather than estimating absolute yaw values (e.g., north, south, etc.). In other words, estimates of relative yaw orientation may be used. In exemplary embodiments angular rate and magnetic field sensing estimates of absolute yaw orientation may be used.

Exemplary embodiments may employ audio processing methods that achieve audio that is substantially pitch-constant and continuously-audible regardless of the rate (from zero up) at which the audio track is played through. The usefulness of such outcome is as follows: The visual component of a video sample, in comparison to an audio component, may remain relatively perceptually-consistent for an observer regardless of the rate at which the video is played through. Halting progress at a particular track position may render the image motionless, and this image may be perceived to have consistency with the moving images that appeared when the video was being played through (either backwards or forwards). The audio component of the video (termed "audio track"), however, may become far less perceptually-consistent when the rate at which the video is played through changes from normal speed. First and foremost, audio tracks require being "played though" (i.e., progressed either forwards or backwards) to allow the modulating pressure waves that are perceived as audible sound to be produced at all. In addition, the rate at which an audio track is played through may also affect the perceived pitch of the audio. Techniques for overcoming the dependence of audibility and pitch on audio playback rate are described below.

Techniques for achieving the audio effects of pitch-constancy and continuous-audibility are often described as "audio timescale-pitch modification" or "audio time stretching". These techniques include two methods termed "time domain harmonic scaling" and "phase vocoding". These techniques can produce audio that matches the pitch (sound frequency) of an audio track played at normal speed despite the audio track being played through faster or slower relative to normal speed, and/or in reverse. These techniques may also be used to shift the pitch (or pitches) of an audio track by a chosen amount. Furthermore, these techniques allow an audio track to be halted part way through being played, with a constant sound being produced that is representative of the sound at that track position when the audio track is being played through at normal speed. Pitch shifting methods may incorporate a technique termed "formant preservation". Formants are prominent frequency regions produced by the resonances in an instrument or vocal tract's structure that has a strong influence on the timbre of its sound. If the pitch of an audio track is shifted, formants will be moved thereby producing an altered quality of sound that a listener may consider very different from the original. For the audio timescale-pitch modification techniques mentioned above corresponding methods are available for changing the formants to compensate for the side effects of the pitch shifting and thereby "preserve" the formants. Exemplary embodiments may include formant-preserving methods as part of their audio timescale-pitch modification. Audio timescale-pitch modification may be implemented in hardware and/or software by persons skilled in the art. In exemplary embodiments the audio timescale-pitch modification may be performed by the data processor.

By processing the audio track of a video using timescale-pitch modification a listener may perceive the audio component of the video as having a quality of consistency (as possessed intrinsically by the visual component) despite changes in the rate or video playback, or whether it is played in reverse, or halted altogether. Described another way, this audio processing may contribute to the perception that, within the events of the video, time is being sped up, slowed down, reversed, or halted altogether. In the subsequent description the audio timescale-pitch modification will be referred to as the "time stretch algorithm".

In exemplary embodiments an interface 3310 (see FIG. 33) may also provide a user with the opportunity to control when they would like the audio track of the video sample to be made audible and the pitch at which they would like this audio to be made audible. For example, if the employed interface includes one or more digit buttons, exemplary embodiments may be configured such that the audio of the video may only be audible when one or more digit buttons are actuated. The pitch (or pitches) of the audio may be specified by the user's choice of which digit button (or buttons) to actuate. Thus, while simultaneously controlling the rate (from zero up) and direction the visual and/or audio components of the video are played through, the user may also be given control over when the audio track of the video is audible and at what pitch. This may allow, for example, the user to create melodies using the sound from the video's audio track. Furthermore, exemplary embodiments may allow more than one stream of audio to be activated at one time and at different pitches. In this configuration the user may actuate more than one digit button at a time, thereby initiating multiple streams of the audio track to be produced at the pitches specified by the actuated digit buttons. This feature may allow, for example, the user to create pitch harmonies.

By way of example, if a video sample used with an exemplary embodiment was of an individual singing one or more words, the user may be able to control the rate and direction in which those words were sung. Using the example control parameters described above, rotating the interface from north to north-east (with the audio activated) may produce synchronized visual and audio video components of said individual singing the phrase at a rate proportional to the speed of the rotation from north to north-east. Conversely, rotating from north-east to north may produce synchronized visual and audio video components of said individual singing the phrase backwards at a rate proportional to the speed of the rotation from north-east to north. The user may also be able to pause at any track position, during a vowel sound for example, and a sound that is representative of the vowel at that track position may continue to be produced (along with the halted visual image at that track position). In exemplary embodiments that employ an interface that can initiate audio streams (e.g., via one or more digit buttons) the user may have control over when the audio track is audible (i.e., when at least one audio stream is active). In exemplary embodiments that employ an interface that can specify the pitch of initiated audio streams (e.g., via one or more digit buttons) the user may have control the pitch (or pitches) that this audio is played at. In "singer" video example, these pitch and track position controls provided by the interface may contribute to the perception that the user is controlling (in terms of phrasing and pitch) how the individual in the video is singing the phrase. Of course, any video material may be used by exemplary embodiments to create interesting visual and audio effects using methods similar to those described above.

In exemplary embodiments the user may also be given the opportunity to pre-set a "pitch glide" value that may modulate the pitch of audio streams initiated via an interface. For example, if an audio stream is triggered soon after a previously triggered audio stream has been deactivated (or, if only one audio stream is permitted at a time, prior to deactivation), the pitch of the newly-triggered audio stream may shift (either up or down) from the pitch of the previous audio stream to the designated pitch of the newly-triggered audio stream. By choosing the pitch glide value the user may determine over what duration this shift takes place. In exemplary embodiments the user may also be given the opportunity to pre-set the "attack" and/or "decay" aspects of the audio stream triggering, whereby the user may choose how rapidly the audio volume rises after triggering (attack) and/or how rapidly the audio volume diminishes after an audio stream is deactivated (decay).

In exemplary embodiments a variety of additional effects may be configured to be controlled via data generated from an interface 3310 (see FIG. 33). For example, a tremolo effect applied to an audio stream may be configured to be controlled by the rotational velocity of the interface around its lateral axis (i.e., the "pitch" angle of the interface). As another example, the brightness of the video image may be configured to be reduced while no audio streams are active. As an additional example, the volume of the audio may be configured to be reduced when the video is being played in a reverse direction, as opposed to when it is being played in a forward direction. Alternatively, the volume of the audio may be configured to be controlled by an axis of rotation on the interface, for example, the longitudinal axis (i.e., the "roll" angle of the interface). Exemplary embodiments may utilize interface-based portamento control and/or vibrato control to modulate the pitch of the audio track of a video sample in a manner similar to that described elsewhere in this specification. Exemplary embodiments may utilize interface-based contextual control and directional control including oscillation rate control effects employing frequency filters and/or volume gates, in a manner similar to that described elsewhere in this specification. As would be understood by a person skilled in the art, a large variety of additional alternative audio and visual effects may be configured to be controlled via an interface, and this should not be considered a complete list.

Exemplary embodiments may use the data processor 3311 (see FIG. 33) to execute an algorithm as described in the following text and in FIG. 34. Two preliminary procedures 3410 (see FIG. 34) may be performed prior to initiating an ongoing real-time procedure 3414. These steps may include extracting an audio track from a video sample 3411 and modifying the pitch of this audio track 3412. To simplify processing in the real-time procedure the pitch of the audio track may be modified such that its pitch is set to a single pitch for the duration of the audio track, or to multiple consecutive constant pitches that change at defined track positions. If the audio is monophonic (for example a human voice) and its pitch varies little during the audio track, it may be desirable to tune the entire sample to a single pitch. If the pitch varies significantly it may be desirable instead to tune the audio track to multiple consecutive pitches. If the audio track is polyphonic the pitch processing may be configured to make each pitch in the polyphony continuous for the duration of the audio track. In each case the processed audio sample may be passed on with data specifying which pitch (or pitches) the audio track is tuned to and, if the pitch varies, at which track positions the pitch changes occur. Numerous methods are available for performing pitch detection including those that analyze audio signals in the frequency- or time-domain, and can be implemented by persons skilled in the art.

Figure 34:
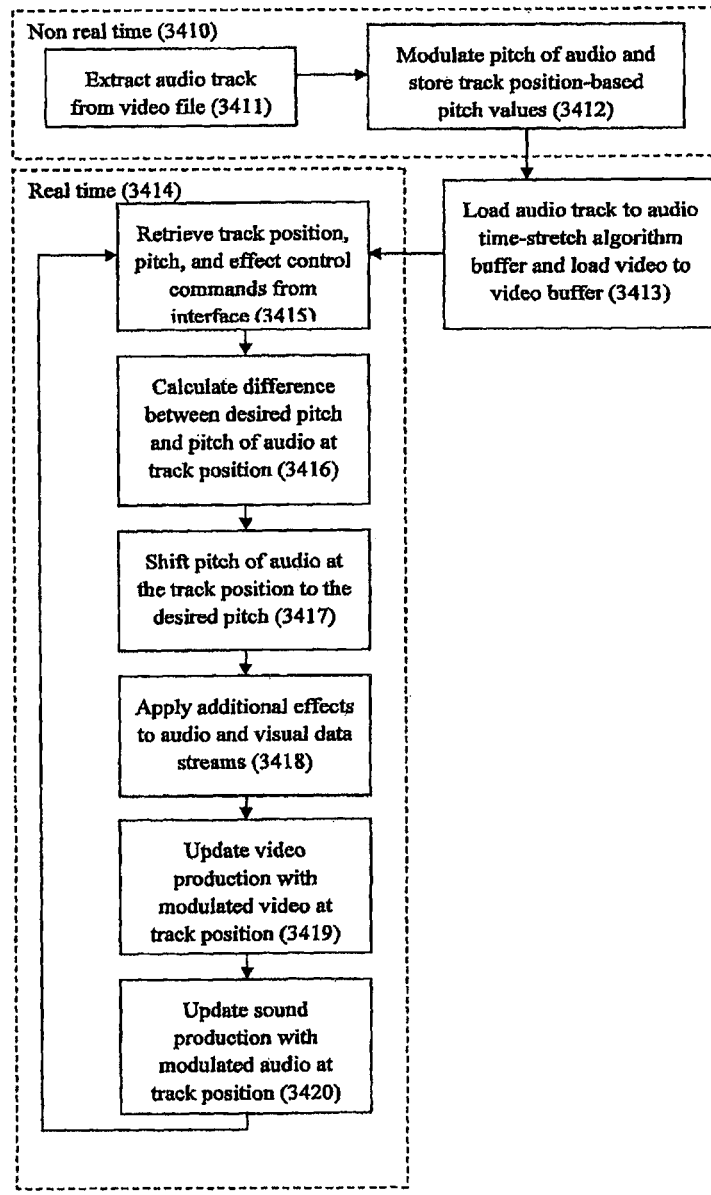
FIG. 34 illustrates an exemplary embodiment of algorithms involved in manipulating audio and/or visual content.

As shown in FIG. 34 the next step 3413 in the algorithm may be to load the pitch shifted audio track into a time-stretch algorithm buffer (along with the audio track's pitch info) and load the visual component of the video sample into the video buffer. In exemplary embodiments the triggered audio streams may be the only audible sound produced by the system, and the original audio track in the video sample may not be made audible. In the real-time procedure 3414 the first performed step may be to retrieve the current commands from the interface 3415. These commands may include updates on audio stream activation, pitch selection, track position, and additional effects. Due to processing in step 3412 pitch of the pre-processed audio track may be known for some or all track positions. If a new audio stream activation command was received in step 3415, then the pitch difference between the known current pitch of the audio track and the pitch (or pitches) specified by the interface may be calculated 3416. This pitch difference may then be used to shift the current pitch of the audio track to the desired pitch 3417, potentially subject to any pre-set pitch glide effect. As a consequence of the time-stretch algorithm's processing, even if the user pauses at a specific track position, triggering an audio stream via the user interface may produce a sound that is "representative" of the sound at that track position (i.e., substantially similar to the sound of the audio track at that position when it is being played through at normal speed, aside from a chosen shift in pitch).

The next step in the real-time procedure 3414 (see FIG. 34) may be to apply additional effects to the current audio and visual video data 3418 in accordance with the current commands received from the user interface in step 3415. In this step the pre-set rise or decay in volume of active or recently deactivated audio streams may be taken into account when calculating the required audio volume level (or levels in the case of simultaneously active audio streams). Finally the updated visual and audio video data may be transferred to the audio/visual production device 3313 (see FIG. 33) to be made visible and audible (steps 3419 and 3420).

In exemplary embodiments a MIDI keyboard equipped with a MIDI control wheel may act as the interface in the system. Audio stream/pitch commands may be elicited via the keyboard keys and track position may be controlled via the MIDI control wheel. In exemplary embodiments the visual component may be omitted such that only the audio streams are produced and made audible and/or recorded. In exemplary embodiments the audio component may be omitted such that only the visual component is made visible and/or recorded.

In exemplary embodiments, the interface may be used to rapidly select between individual audio or video samples, and/or select between positions within an audio or video sample. For example, rotation of the interface around its vertical axis may be configured to advance (either forward or backwards) through a sample's duration and the digit buttons may allow the user to select which sample is to undergo said advancement. In this example the distal thumb button may be configured to select audio sample A, the distal index finger button to select audio sample B, the distal middle finger button select audio sample C, and so on. In this example the beginning point of advancement for a sample may reset to the beginning of the sample each time its corresponding digit button is actuated. Rotating the interface either left or right around the vertical axis may be configured to cause the audio sample to advance forwards through the sample's duration. A variety of other configurations are also possible including rightwards rotation advancing the sample forwards and leftwards rotation backwards through the sample. Furthermore, other axes of rotational or translational motion may be used to control sample advancement. In exemplary embodiments the rate of advancement may be proportional to the rate of motion, whereby the perceived pitch of an audio sample would be lower if the motion were slower and higher if the motion were faster. In the case of video samples the perceived pace of events within a video sample would be slower if the motion were slower and faster if the motion were faster. Exemplary embodiments of the kinds described above would allow the user to produce audio and visual effects similar to 'turntabilism' hardware and software, but with the advantages of combining rapid sample selection and advancement into a single interface that can be operated with one hand and has strong live performance appeal.

Exemplary embodiments may utilize interface-based contextual control and directional control effects to modulate the selected samples, including oscillation rate-control effects employing frequency filters and/or volume gates, in a manner similar to that described elsewhere in this specification. As would be understood by a person skilled in the art, a large variety of additional alternative effects modulating selected samples may be configured to be controlled via an interface, and this should not be considered a complete list.

Example 1

A hand operated input device comprising: a plurality of activation means configured to be activated by the digits of the user; and an output means for outputting a series of currently active activation means;

The hand operated input device wherein said device includes at least one sensor means for measuring a current motion, position, or orientation value of the input device, and that can pass these measurements on to said output means.

The hand operated input device wherein attachment means secure the device to the user's hand.

The hand operated input device wherein the device is designed to remain in close contact with the hand during operation.

The hand operated input device wherein, when the device is in a fixed position relative to the user's hand, said device includes at least one activation means capable of being actuated by contact with a surface of one of the user's digits and at least one more activation means capable of being actuated by contact with a different surface of the same digit.

The hand operated input device wherein, when the device is in a fixed position relative to the user's hand, said device includes a first activation means capable of being actuated by contact with a first surface of one of the user's digits, a second activation means capable of being actuated by contact with a second different surface of the same digit, and a third activation means capable of being actuated by contact with a third different surface of the same digit.

The hand operated input device wherein, when the device is in a fixed position relative to the user's hand, said device includes at least one activation means capable of being actuated by contact with the distal phalanx of one of the user's digits and at least one more activation means capable of being actuated by contact with a segment of the same digit other than its distal phalanx.

The hand operated input device wherein the output of said sensor means modulates the outcomes controlled by said activation means.

The hand operated input device wherein the output of said activation means modulates the outcomes controlled by said sensor means.

The hand operated input device wherein the activation means are mapped to sounds comprised of different pitches.

The hand operated input device wherein the activation means are mapped to audio or video samples, or different time points within audio or video samples.

The hand operated input device wherein combined actuation of activation means increases the number of output states that can be produced beyond the number of activation means.

The hand operated input device wherein the actuation of specific activation means modulates the output of other actuation means, whereby the number of output states that can be produced is increased beyond the number of activation means.

The hand operated input device wherein the activation means are located on a plurality of module means, each module means being configured for access by a single user digit;

The hand operated input device wherein the number of activation means per finger is at least 2 and there is one or no activation means for the thumb.

The hand operated input device wherein the number of activation means per digit is at least 1.

The hand operated input device wherein the number of activation means per digit is at least 2.

The hand operated input device wherein the number of activation means per digit is at least 3.

The hand operated input device wherein the digits include the fingers and thumb of a user.

The hand operated input device wherein said sensor means include at least one angular rate sensor measuring the rate of angular rotation of the device around the lateral, longitudinal, or vertical axis of the device.

The hand operated input device wherein said sensor means include at least one orientation sensor measuring the orientation of the device around the lateral, longitudinal, or vertical axis of the device.

The hand operated input device wherein said sensor means measure the orientation of the device around the lateral, longitudinal, and vertical axes of the device.

The hand operated input device wherein said sensor means measure the orientation of the device around the lateral and longitudinal axes of the device.

The hand operated input device wherein the sensor means measure at least one position value of the device.

The hand operated input device wherein the sensor means measure at least one translational motion value of the device.

The hand operated input device wherein said device further includes an elongated portion counterbalancing the weight of the activation means when in use by a user.

The hand operated input device wherein the position of one or more activation means is adjustable.

The hand operated input device wherein the distance of one or more activation means from the user's palm is adjustable.

The hand operated input device wherein the lateral position of one or more activation means relative to the user's palm is adjustable.

The hand operated input device wherein the position of one or more said modules means is adjustable.

The hand operated input device wherein said attachment means are adjustable.

The hand operated input device wherein the distance of the device's contact surface for the user's attached hand relative to the rest of the device is adjustable.

The hand operated input device wherein the device's contact surface for the user's attached hand includes ventilation means.

The hand operated input device wherein the activation means are formed from switch means.

The hand operated input device wherein said output means includes a wireless transmission means for wireless transmission of the output.

The hand operated device wherein each of the activation means can be actuated either individually or in combination with other activation means.

The hand operated device wherein at least one axis of the orientation of the device is mapped to output the octave of a sound's perceived pitch.

The hand operated device wherein one or more rates of rotational or translational motion of the device are mapped as control parameters for audio or visual effects.

The hand operated device wherein orientation or position of the device is mapped as a control parameter for audio or visual effects.

The hand operated input device wherein the direction of rotational or translational motion of the device acts as a method for selecting specific audio or visual outcomes.

The hand operated input device wherein at least one measurement of rotational motion, translational motion, orientation, or position of the device acts to modulate audio or visual outcomes controlled by another measurement of rotational motion, translational motion, orientation, or position.

The hand operated device as wherein one or more axis of the orientation of the device is mapped to a series of zones.

The hand operated device wherein the device is used to interact with a video game.

The hand operated device wherein the device is used to control a lighting system.

The hand operated device wherein the device is used to remotely control a robot or vehicle.

The hand operated device wherein the device provides haptic feedback to the user.

The hand operated device wherein the device sends input to audio or visual processing software on a computer.

The hand operated device wherein the device is used to modify at least one of an audio signal and a video signal.

The hand operated device wherein the sensor means comprises at least one of an accelerometer that measures static acceleration, an accelerometer that measures dynamic acceleration, a gyroscope that measures rotational motion, or a magnetometer that measures magnetic fields.

The hand operated device wherein the position of the device is estimated based on the interaction between a signal emitter and a signal receiver, one of which is located in the device and the other of which is physically separate to the device.

The hand operated device wherein sounds controlled by the device can be modulated by a portamento effect controlled by the sequence of actuation of activation means and/or motion, orientation, or position of the device.

The hand operated device wherein sounds controlled by the device can be modulated by a vibrato effect controlled by motion, orientation, or position of the device after the actuation of activation means.

The hand operated device wherein sounds controlled by the device can be modulated by a tempo-synced oscillation rate-based effect controlled by the orientation or position of the device and/or directions of motion of the device.

The hand operated device wherein one or more rates of rotational or translational motion of the device modulates a sound in an similar way to which bowing velocity modulates the sound of a stringed instrument or breath velocity modulates the sound of a wind instrument.

The hand operated device wherein activation means are mapped to letters or numbers and motion, position, or orientation modulates this mapping.

The hand operated input device wherein the device includes an arrangement of activation points subdivided into sets assigned to each digit, the number of sets being at least four.

The hand operated input device wherein the device includes an arrangement of activation points subdivided into sets assigned to each digit, the number of sets being at least three.

Example 2

A hand operated input device comprising: a plurality of activation points configured to be activated by the digits of the user; at least one sensor means for measuring a current motion, position, or orientation value of the input device; and a output means connected to the activation points and the sensor means for outputting a series of currently active activation points and at least one of the motion, position, or orientation values of the input device.

The hand operated device wherein movement of the device controls the rate of playback of an audio sample (the "control audio sample").

The hand operated device wherein the control audio sample is a person's sung or spoken voice.

The hand operated device wherein the control audio sample is a sound that can be controlled for musical effect.

The hand operated device wherein the pitch and audibility of the control audio sample is independent of its rate of playback.

The hand operated device wherein control over a visual video component sample associated with the control audio sample is simultaneously exerted via the input device.

The hand operated device wherein one or more distinct audio samples is simultaneously played back at a constant rate that is not controlled via the input device.

The hand operated device wherein actuation of activation points is used to control the pitch of the control audio sample.

The hand operated device wherein actuation of activation points is used to gate the audibility of the control audio sample.

The hand operated device wherein actuation of activation points is used to select between control audio samples or playback start points within control audio samples.

The hand operated device wherein an axis of orientation of the device is used to control the pitch of the control audio sample.

The hand operated device wherein visual and/or audio elements provide instructions and feedback on exerting said controls via the device.

The hand operated device wherein sequential sections of the control audio sample require specific directions of interface movement for playback, and these directions are visually indicated.

The hand operated device wherein visual and/or audio elements provide feedback on a user's performance of control thereby imbuing a game-like quality to the task.

Example 3

An entertainment system comprising: a user input device providing a series of user-controlled input data streams comprising substantially continuous input values and substantially discrete input values; and an output component connected to said user input data streams; wherein said output component outputs said input data streams for playback control of an audio sample (the "control audio sample").

The system wherein user-controlled substantially continuous input data control the rate of playback of an audio sample.

The system wherein the control audio sample is a person's sung or spoken voice.

The system wherein the control audio sample is a sound that can be controlled for musical effect.

The system wherein the pitch and audibility of the control audio sample is independent of its rate of playback.

The system wherein control over a visual video component sample associated with the control audio sample is simultaneously exerted by user-controlled substantially continuous input data.

The system wherein one or more distinct audio samples is simultaneously played back at a constant rate that is not controlled by the user.

The system wherein user-controlled discrete input values are used to gate playback of sections of the control audio sample, and/or to control the pitch of the control audio sample.

The system wherein user-controlled discrete input values are used to control the pitch of the control audio sample.

The system wherein user-controlled discrete input values are used to gate the audibility of the control audio sample.

The system wherein user-controlled discrete input values are used to select between control audio samples or playback start points within control audio samples.

The system wherein visual and/or audio elements provide instructions and feedback on exerting said controls.

The system wherein control of one or more sequential sections of the control audio sample requires a direction-specific user action, with the required direction indicated visually.

The system wherein visual and/or audio elements provide feedback on a user's performance of control thereby imbuing a game-like quality to the task.

Example 4

A hand operated input device comprising: a plurality of activation points configured to be activated by the digits of the user; at least one sensor means for measuring a current motion, position, or orientation value of the input device; and a output means interconnected to the activation points and the sensor means for outputting a series of currently active activation points and at least one motion, position, or orientation value of the input device; wherein movement of the device modulates one or more duplicate audio streams derived from an audio source (e.g., a voice recorded by a microphone).

The hand operated device wherein the activation points and/or device movement is used to control the volume of one or more duplicate audio streams.

The hand operated device wherein the activation points are used to control the pitch of one or more duplicate audio streams.

The hand operated device wherein the audio source and one or more duplicate audio streams are made audible (and/or recordable) at the same time to produce harmony.

The hand operated device wherein only one or more duplicate audio streams are made audible (and/or recordable).

The hand operated device wherein motion, orientation, or position of the device is used to control the volume and/or other audio qualities of one or more duplicate audio streams.

The hand operated device wherein the pitch of one or more duplicate audio streams is selected by a musical pitch interval relative to the pitch of the audio source, whereby each specific pitch interval is triggered by a specific activation point.

The hand operated device wherein the pitch of one or more duplicate audio streams is selected as a specific pitch, whereby each specific pitch is triggered by a specific activation point.

The hand operated device wherein the pitch of one or more duplicate audio streams and/or the source audio is quantized.

The hand operated device wherein supplementary transduction of the audio source is achieved using a contact microphone and the resulting signal is analyzed to detect one or more pitches within the audio source.

The hand operated device wherein the pitch of one or more duplicate audio streams can be modulated by a portamento effect controlled by the sequence of actuation of activation points and/or motion, orientation, or position of the device.

The hand operated device wherein the pitch of one or more duplicate audio streams can be modulated by a vibrato effect controlled by the motion, orientation, or position of the device after actuation of an activation point.

The hand operated device wherein sounds controlled by the device can be modulated by a tempo-synchronised oscillation rate effect controlled by the orientation or position of the device and/or directions of motion of the device.

Example 5

An entertainment system comprising: a user input device providing a series of user-controlled input data streams comprising substantially continuous input values and substantially discrete input values; and an output component interconnected to said user input data streams; wherein said output component outputs said input data streams for modulation of one or more duplicate audio streams derived from an audio source (e.g., a voice recorded by a microphone).

The system wherein said user-controlled input data controls the volume and/or other parameters of one or more duplicate audio streams.

The system wherein user-controlled discrete input values are used to control the pitch of one or more duplicate audio streams.

The system wherein the audio source and one or more duplicate audio streams are made audible (and/or recordable) at the same time to produce harmony.

The system wherein user-controlled substantially continuous input data control the volume and/or other audio qualities of one or more duplicate audio streams.

The system wherein the pitch of one or more duplicate audio streams is selected by a musical pitch interval relative to the pitch of the audio source, whereby each specific pitch interval is triggered by a specific user-controlled discrete input value.

The system wherein the pitch of one or more duplicate audio streams is selected as a specific pitch, whereby each specific pitch is triggered by a specific user-controlled discrete input value.

The system wherein the pitch of one or more duplicate audio streams and/or the source audio is quantized.

The system wherein supplementary transduction of the audio source is achieved using a contact microphone and the resulting signal is analyzed to detect one or more pitches within the audio source.

The system wherein the pitch of one or more duplicate audio streams can be modulated by a portamento effect controlled by the sequence of user-controlled discrete input values and/or user-controlled substantially continuous input data.

The system wherein the pitch of one or more duplicate audio streams can be modulated by a vibrato effect that responds to specific combinations of user-controlled discrete values and substantially continuous input data.

The system wherein the sound of one or more duplicate audio streams can be modulated by a tempo-synced oscillation rate-based effect that responds to user-controlled substantially continuous input data.

Example 6

A hand operated input device comprising: a plurality of activation points configured to be activated by the digits of the user; at least one sensor for measuring a current motion, position, or orientation value of the input device; and an output means interconnected to the activation points and the sensor for outputting a series of currently active activation points and at least one motion, position, or orientation value of the input device; wherein movement of the device controls the substantially gradated change in the pitch of a sound between a start pitch and an end pitch.

The hand operated device wherein activation points are used to select said start pitch and end pitch.

The hand operated device wherein, after selection of the start and end pitches, motion of the device controls the substantially gradated change in the pitch of a sound between the start pitch and the end pitch.

The hand operated device wherein a user may operate left and right-handed versions of the hand operated device simultaneously and differences in at least the relative motion, position, or orientation of the two devices is used to control the substantially gradated change in the pitch of a sound between a start pitch and an end pitch.

Example 7

An entertainment system comprising: a user input device providing a series of user-controlled input data streams comprising substantially continuous input values and substantially discrete input values; and an output component interconnected to said input data streams; wherein said output component outputs said input data streams for controlling the substantially gradated change in the pitch of a sound between a start pitch and an end pitch.

The system wherein substantially discrete input values are used to select a start pitch and an end pitch.

The system wherein substantially continuous input values are used to control the substantially gradated change in the pitch of a sound between a start pitch and an end pitch.

Example 8

A hand operated input device comprising: a plurality of activation points configured to be activated by the digits of the user; at least one sensor for measuring a current motion, position, or orientation value of the input device; and an output means interconnected to the activation points and the sensor for outputting a series of currently active activation points and at least one of the motion, position, or orientation values of the input device; wherein movement of the device controls the playback of an audio sample and/or an associated visual video component sample.

The hand operated device wherein the audio sample is pre-processed to partially or completely reduce its pitch variability, after which the pitch or pitches of the audio sample is detected at one or more points in the duration of the audio sample.

The hand operated device wherein control over a visual video component sample associated with the audio sample is simultaneously exerted via the input device.

The hand operated device wherein the pitch and audibility of the audio sample is independent of its rate of playback.

The hand operated device wherein the audio and/or an associated visual video component sample can be played forwards and backwards at any rate.

The hand operated device wherein activation point inputs are used to gate the audibility and control the pitch of the audio sample.

The hand operated device wherein motion, position, and/or orientation values of the input device; and/or activation points of the input device, control additional modulation of the audio sample.

The hand operated device wherein motion, position, and/or orientation values of the input device; and/or activation points of the input device, control additional modulation of the visual video component sample.

The hand operated device wherein the pitch of the audio sample can be modulated by a portamento effect controlled by the sequence of actuation of activation points and/or motion, orientation, or position of the device.

The hand operated device wherein the pitch of the audio sample can be modulated by a vibrato effect controlled by motion, orientation, or position of the device after actuation of one or more activation points.

The hand operated device wherein the sound of the audio sample can be modulated by a tempo-synced oscillation rate effect controlled by the orientation or position of the device and/or directions of motion of the device.

Example 9

An entertainment system comprising: a user input device providing a series of user-controlled input data streams comprising substantially continuous input values and substantially discrete input values; and an output component interconnected to said user input data streams; wherein said output component outputs said input data streams for controlling the playback of an audio and/or an associated visual video component sample.

The system wherein the audio sample is pre-processed to partially or completely reduce its pitch variability, after which the pitch or pitches of the audio sample is detected at one or more points in the duration of the audio sample.

The system wherein control over a visual video component sample associated with the audio sample is simultaneously exerted via the substantially continuous input values.

The system wherein the pitch and audibility of the audio sample is independent of its rate of playback.

The system wherein the audio and/or an associated visual video component sample can be played forwards and backwards at any rate.

The system wherein the substantially discrete input values are used to gate the audibility and control the pitch of the audio sample.

The system wherein the substantially continuous input values and/or the substantially discrete input values control additional modulation of the audio sample.

The system wherein the substantially continuous input values and/or the substantially discrete input values control additional modulation of the visual video component sample.

The system wherein the pitch of the audio sample can be modulated by a portamento effect controlled by the sequence of user-controlled discrete input values and/or user-controlled substantially continuous input data.

The system wherein the pitch of the audio sample can be modulated by a vibrato effect that responds to specific combinations of user-controlled discrete values and substantially continuous input data.

The system wherein the audio sample can be modulated by a tempo-synced oscillation rate effect that responds to user-controlled substantially continuous input data.

Example 10

An entertainment system comprising: a user input device providing a series of user controlled input data streams derived from a current device movement or orientation; and an output component interconnected to said user input device, said output component outputting musical sound audio data with substantially gradated pitch control depending on said data streams of the user input device.

The system wherein the input device comprises: a plurality of activation points configured to be activated by the digits of the user; at least one sensor component for measuring a current motion, position, or orientation value of the hand of a user; and a processing means interconnected to the activation points and the sensor component for outputting a series of currently active activation points and at least one of the motion, position, or orientation values of the input device.

The music entertainment system wherein the start and end pitches of said substantially gradated pitch control depend on current discrete data events initiated by the user via controls provided by the user interface.

Example 11

A method of producing an interactive musical sound, the method including the steps of: (a) providing a user input device providing a series of user-controlled input data streams derived from a current device movement, position, or orientation; (b) processing said user input device data, to output musical sound audio data with substantially gradated pitch control depending on said data streams of the user input device.

The method wherein the start and end pitches of said substantially gradated pitch control depend on current discrete data events initiated by the user via controls provided by the user interface.

Example 12

An entertainment system comprising: a user input device providing a series of user-controlled input data streams derived from a current device movement, position, or orientation; a video stream having both audio and associated video information; and a processor interconnected to said user input device and said video stream, said processor outputting video at a specific position in the video stream, dependent on said movement, position, or orientation data streams of the user input device, and a current audio output derived from audio at said specific position in the video steam.

The system wherein the user input device comprises: a plurality of activation points configured to be activated by the digits of the user; at least one sensor component for measuring a current motion, position, or orientation value of the interface device; and an output component interconnected to the activation points and the position sensors for outputting a series of currently active activation points and at least one of the motion, position, or orientation values of the input device.

The system wherein current audio output derived from audio at said specific position in the video stream is pitched in accordance with current discrete data events initiated by the user via controls provided by the user interface.

Example 13

A method of producing an interactive video image, the method including the steps of: (a) providing a user input device providing a series of user-controlled input data streams derived from a current device movement, position, or orientation; (b) providing a video stream having both audio and associated video information; and (c) processing said video stream, to output video at a specific position in said video stream, dependent on said movement, position, or orientation data streams of the user input device, and to output audio derived from audio at said specific position in the video stream.

The method wherein current audio output derived from audio at said specific position in the video stream is pitched in accordance with current discrete data events initiated by the user via controls provided by the user interface.

Example 14

A hand operated input device comprising: a plurality of activation points configured to be activated by the digits of the user; at least one sensor means for measuring a current motion, position, or orientation value of the input device; and a output means interconnected to the activation points and the sensor means for outputting a series of currently active activation points and at least one of the motion, position, or orientation values of the input device.

The hand operated input device wherein the activation points are located on a plurality of module means, each module being configured for access by a single user digit;

The hand operated input device wherein each of the plurality of modules comprises at least one activation point capable of being modulated by a distal portion of a digit, a medial portion of a digit, or a proximal portion of a digit.

The hand operated input device wherein the activation points are mapped to musical notes.

The hand operated input device wherein the number of activation points per finger is at least 2.

The hand operated input device wherein the number of activation point per finger is at least 3.

The hand operated input device wherein the digits include fingers of a user and the thumb.

The hand operated input device wherein the sensors include at least one angular rate sensor sensing the rate of angular rotation of the device.

The hand operated input device wherein said sensor outputs a roll, pitch, and yaw indicator of the device.

The hand operated input device wherein said sensor means output a roll and pitch indicator of the device.

The hand operated input device wherein the sensor means measure at least one position value of the device.

The hand operated input device wherein the sensor means measure at least one movement value of the device.

The hand operated input device wherein said device further includes an elongated portion counterbalancing the weight of the activation points when in use by a user.

The hand operated input device wherein the positions of the activation points are adjustable for one or more digits.

The hand operated input device wherein the activation points are formed from electromechanical switches.

The hand operated input device wherein said processing means is interconnected to a wireless transmission means for wireless transmission of the output.

The hand operated device wherein each of the activation points can be actuated either individually or in combination with other activation points.

The hand operated device wherein at least one axis of the orientation of the device is mapped to output the octave of a note's pitch.

The hand operated device wherein a rate of rotational motion of the device is mapped as a control parameter.

The hand operated device wherein one or more axes of the orientation of the device is mapped to a series of zones.

The hand operated device wherein the device is used to interact with a video game.

The hand operated device wherein the device is used to modify at least one of an audio signal and a video signal.

The hand operated device wherein the positioning sensor comprises at least one of an accelerometer that measures static acceleration, an accelerometer that measures dynamic acceleration, a gyroscope that measures rotational motion, or a magnetometer that measures magnetic fields.

The hand operated input device wherein the device is designed to remain in close contact with the hand during movement The hand operated input device wherein the device incorporates measurement of controller motion using a gyroscope and/or accelerometer The hand operated input device wherein the device includes an arrangement of activation points subdivided into sets assigned to each digit, the number of sets being at least four.

The hand operated input device wherein the device includes an arrangement of activation points subdivided into sets assigned to each digit, the number of sets being at least three.

Example 15

A method for manipulating audio/visual content, the method comprising:

providing a plurality of activation points on an input device configured to be activated by the digits of the user; providing at least one sensor for measuring a current motion, position, or orientation value said input device; and outputting a series of currently active activation points and at least one of the motion, position, or orientation values of said input device.

The method wherein, when the input device is in a fixed position relative to the user's hand, said input device includes at least one activation point capable of being actuated by contact with the distal phalanx of one of the user's digits and at least one more activation point capable of being actuated by contact with a segment of the same digit other than its distal phalanx.

The method wherein the activation points are mapped to musical notes.

The method further comprising transmitting the output data.

The method wherein each of the activation points can be actuated either individually or in combination with other activation points.

The method wherein the method is used to interact with a video game.

Example 16

A hand operated input device comprising: a plurality of activation means configured to be activated by the digits of the user; at least one sensor means for measuring a current motion, position, or orientation value of the input device; and a output means interconnected to the activation points and the sensor means for outputting a series of currently active activation points and at least one motion, position, or orientation value of the input device.

The hand operated input device wherein the activation means are mapped to audio or video samples, or different time points within audio or video samples.

The hand operated device wherein movement of the device controls the rate of playback of audio or video samples from the time points selected by actuation of the activation means.

The hand operated device wherein any angular rotation around the vertical axis of the device advances the playback of the selected audio or video sample forwards at a rate proportional to the rotation.

The hand operated device wherein one direction of angular rotation around the vertical axis of the device advances the playback of the selected audio or video sample forwards at a rate proportional to the rotation, while the other direction advances the playback of the selected audio or video sample backwards at a rate proportional to the rotation.

In the description of exemplary embodiments of this disclosure, various features are sometimes grouped together in a single embodiment, figure or description thereof for the purpose of streamlining the disclosure and aiding in the understanding of one or more of the various disclosed aspects. This method of disclosure, however, is not to be interpreted as reflecting an intention that the claimed inventions requires more features than are expressly recited in each claim. Rather, as the following claims reflect, inventive aspects may lie in less than all features of a single foregoing disclosed embodiment. Thus, the claims following the Detailed Description are hereby expressly incorporated into this Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a way of carrying out the function performed by the element for the purpose of carrying out the disclosed inventions.

In the claims below and the description herein, the terms comprising, comprised of or which comprises are open terms that mean including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Although the present disclosure makes particular reference to exemplary embodiments thereof, variations and modifications can be effected within the spirit and scope of the following claims.

What is claimed is:

1. An interface comprising:
   a hand operated input device with a plurality of activation points associated with a corresponding plurality of digits belonging to a user's hand, whereby, during use, each of said plurality of digits is associated with at least one of said plurality of activation points, each of the plurality of activation points being located on one or more structures that distance each activation point from the surface of the hand and that also position each activation point to measure actuation by a single corresponding digit such that actuation involves a change in the proximity of said digit to the activation point;
   at least one sensor for measuring a current rotational motion, translational motion, position, or orientation value of the input device; and
   an output component interconnected to the activation points and said sensor for outputting activation point data and at least one rotational motion, translational motion, position, or orientation value of the input device.

2. The interface as claimed in claim 1 wherein the input device comprises components that, while the hand is stationary or moving in one or more spatial dimensions, assist in maintaining a physical association between the input device and the hand.

3. The interface as claimed in claim 2 wherein said components extend around the back of the said hand.

4. The interface as claimed in claim 1 wherein at least one activation point measures a range of digit proximity, digit-actuated pressure, or digit-actuated mechanical movement, or a combination of these.

5. The interface as claimed in claim 4 wherein haptic feedback, audio feedback, visual feedback, or a combination of these, is provided to the user indicating that one or more thresholds within said range have been reached or when one or more simulated limits of a virtual entity have been reached.

6. The interface as claimed in claim 1 wherein one or more activation points measure actuation by more than one of the phalanges of at least one digit, thereby approximating the angles between said phalanges, or between said phalanges and the hand, or both.

7. The interface as claimed in claim 1 wherein the input device's position is estimated using information comprising signals received by the input device from at least one separate emitter device, or signals emitted by the input device and received by at least one separate receiver device such that the signals facilitate the estimation of the position of the input device relative to the emitter or receiver, or the signals facilitate the estimation of the position of the emitter or receiver relative to the input device.

8. The interface as claimed in claim 7 wherein signals received from said emitter or receiver device are combined with the output of said sensor for measuring a current rotational motion, translational motion, position, or orientation value of the input device.

9. The interface as claimed in claim 1 wherein, when the input device is gripped by or otherwise physically associated with the user's hand, at least two activation points are positioned to be exclusively actuated by a single digit.

10. The interface as claimed in claim 1 wherein at least one activation point is able to measure the distance of one or more digits from said activation point, detect whether one or more digits are in contact with said activation point, measure physical actuation of a button-like mechanism, or a combination of these.

11. The interface as claimed in claim 10 wherein at least one activation point comprises a capacitance sensor that measures the distance of one or more digits from said activation point, a capacitance sensor that detects whether one or more digits are in contact with said activation point, a capacitance sensor that is combined with a button-like mechanism, or a combination of these.

12. The interface as claimed in claim 1 wherein, while the hand is stationary or moving in one or more spatial dimensions, a physical association between the input device and the user's hand is maintained by the grasping action of at least one digit of the hand, or by the grasping action of at least one digit and at least one non-digit area of the hand.

13. The interface as claimed in claim 1 wherein output from the interface or input to the interface is made perceivable visually, aurally, haptically, or a combination of these, via devices integrated with or separate to the interface.

14. The interface as claimed in claim 1 wherein said output component is interconnected to a wireless or cabled communication means for transmission of at least one of the output of the input device to one or more separate devices, or data from one or more separate devices to the input device.

15. The interface as claimed in claim 1 wherein user actions measured by the input device are used as inputs to at least one of a visual avatar, personification, or character via at least one of a television, computer screen, mobile computer screen, projection device, wearable viewing device, or light display.

16. The interface as claimed in claim 1 wherein at least one activation point can measure physical actuation upwards, downwards, forwards, backwards, left, or right, or some combination of these.

17. The interface as claimed in claim 1 wherein during operation the user utilizes an input device in their right hand and an input device in their left hand, wherein the right and left input devices are substantially mirror-images of each other in their physical construction.

18. The interface as claimed in claim 1 wherein the input device is used to interact with a video game.

19. The interface as claimed in claim 1 wherein said sensor comprises at least one of an accelerometer that measures static acceleration, an accelerometer that measures dynamic acceleration, a gyroscope that measures rotational motion, magnetometer that measures magnetic fields, or a position sensor that measures position.

20. The interface as claimed in claim 1 wherein the estimates of a spatial position of the input device utilize data from one or more cameras receiving light signals from one or more infrared emitters or reflectors located on the interface.

* * * * *